April 6, 1965 G. H. BALDING Re. 25,756

VISUAL CUE GENERATOR

Original Filed April 11, 1958 12 Sheets-Sheet 1

INVENTOR
GEORGE H. BALDING

BY Brown Jackson Boettcher & Dunner
ATTORNEY

VISUAL CUE GENERATOR

Original Filed April 11, 1958 12 Sheets-Sheet 2

INVENTOR
GEORGE H. BALDING

BY Brown Jackson Boettcher & Dienner
ATTORNEY

VISUAL CUE GENERATOR

Original Filed April 11, 1958 12 Sheets-Sheet 3

INVENTOR.
GEORGE H. BALDING
BY
Brown Jackson Boettcher Dunner
ATT'YS

TERRAIN GENERATOR 171

FLIGHT PATH GENERATOR 160

INVENTOR.
GEORGE H. BALDING
BY Brown Jackson Boettcher & Dunner
ATT'YS

April 6, 1965 G. H. BALDING Re. 25,756

VISUAL CUE GENERATOR

Original Filed April 11, 1958 12 Sheets-Sheet 5

INVENTOR.
GEORGE H. BALDING
BY Brown Jackson Boettcher & Dienner
ATT'YS

VISUAL CUE GENERATOR

Original Filed April 11, 1958 12 Sheets-Sheet 6

INVENTOR.
GEORGE H. BALDING
BY Brown Jackson Boettcher & Dunner
ATT'YS

VISUAL CUE GENERATOR

Original Filed April 11, 1958 12 Sheets-Sheet 7

VISUAL CUE GENERATOR

Original Filed April 11, 1958 12 Sheets-Sheet 8

INVENTOR.
GEORGE H. BALDING
BY Brown Jackson Boettcher & Dunner
ATT'YS

VISUAL CUE GENERATOR

Original Filed April 11, 1958 12 Sheets-Sheet 9

INVENTOR.
GEORGE H. BALDING
BY Brown Jackson Boettcher & Dienner
ATT'YS

VISUAL CUE GENERATOR

Original Filed April 11, 1958 12 Sheets-Sheet 10

INVENTOR.
GEORGE H. BALDING
BY Brown Jackson Boettcher & Dunner
ATT'YS

TERRAIN GENERATOR 171

INVENTOR.
GEORGE H. BALDING
BY Brown Jackson Boettcher & Dienner
ATT'YS

VISUAL CUE GENERATOR

Original Filed April 11, 1958 12 Sheets-Sheet 12

COLOR PRESENTATION 650

CLOUD GENERATOR 617

SKY TEXTURE GENERATOR 640

INVENTOR.
GEORGE H. BALDING
BY Brown Jackson Boettcher & Dienner
ATT'YS

United States Patent Office

Re. 25,756
Reissued Apr. 6, 1965

25,756
VISUAL CUE GENERATOR

George H. Balding, Los Altos, Calif., assignor, by mesne assignments, to Kaiser Aerospace & Electronics Corporation, Oakland, Calif., a corporation of Nevada Original No. 3,093,822, dated June 11, 1963, Ser. No. 728,019, Apr. 11, 1958. Application for reissue June 24, 1964, Ser. No. 390,252
111 Claims. (Cl. 343—11)

Matter enclosed in heavy brackets [ ] appears in the original patent but forms no part of this reissue specification; matter printed in italics indicates the additions made by reissue.

The present invention relates to a visual cue generator for providing an integrated display of information relating to the flight condition of an aircraft, and particularly to an all electronic system for generating such display.

With the rapid advancement in the development of aircraft in recent years there has been an increasing need for a visual cue generator apparatus which is capable of providing to the pilot in an integrated manner, the information relating to the flight condition of the aircraft. The instrumentation in existing aircraft installations now known in the art generally comprise a large number of individual meters and indicators which are mounted in tandem or side-by-side relation on an instrument panel for viewing by the pilot. Although the readings on the instruments are relatively simple, the act of scanning, choosing and integrating the numerous bits of information for the purpose of determining the maneuver to be executed by the pilot frequently requires a split second reaction. In the newer, faster flying aircraft now appearing in the field, the time for pilot response has been even further reduced, and the time for integrating the metered information is also decreased. Such factors are of serious concern from the standpoint of the safety of the pilot and the aircraft.

Extensive research studies have indicated that the overall response time of a pilot to a situation consists of the data acceptance time plus the reaction time of the pilot to initiate corrective action. Since the reaction time is the property of the individual pilot, such time cannot be materially decreased once the individual has been selected and trained. The data acceptance time, however, depends upon the number of separate inputs, the time required for the integration thereof, and the nature of the integrated display presented to the pilot. Each of these time factors may be decreased by the provision of integrated instrumentation in a single display unit, and particularly by the provision of an instrumentation which presents such information in a form which is compatible with and related to the same information in the real world.

More specifically, studies have indicated that the basic cues essential to such presentation include cues which display a sky texture, a horizon, and a ground texture, the sky texture and ground texture being readily distinguishable from each other, and the horizon being a distinct and recognizable line. In a preferred display, the texture of the ground is comprised of symbols which vary in size with the altitude of the aircraft and which move across the ground texture to create the illusion of movement of the aircraft relative to the ground. The rate of movement of the symbols is preferably related to the speed of the aircraft, and the positions of the symbols on the display should change with a change in heading of the aircraft. The horizon in straight and level flight should extend laterally across the display, and the position of the horizon on the display should vary relative to the horizontal with movement of the plane about the roll axis of the craft, as for example, in the banking of the plane and the execution of a turn. Further, the position of the horizon should change in an upward or downward direction with changes in pitch of the aircraft, the texture of the ground pattern changing in perspective in accordance with the degree of change of pitch of the aircraft. With the incorporation of these basic visual cues into a common display, the pilot's reaction time to an existing flight condition may be materially decreased.

It is a primary object of the invention, therefore, to provide apparatus which is capable of presenting such visual cues in a single integrated display, and particularly to the provision of a system which generates such cues electronically and effects incorporation of such cues into a single display with equipment which requires a minimum of space and weight whereby the inclusion of the equipment in an aircraft is more readily accomplished.

The study has further indicated that the presentation of additional symbols on the display, and particularly the presentation of a flight path for the guidance of the pilot would prove of further aid to the pilot in the maneuvering of the aircraft. In one conventional system (commercially known as an ILS system), now used in the art to assist the pilot in landing during periods in which visual contact with the ground cannot be made, the system sends out control impulses to the aircraft which are indicative of a preferred approach path, and which are reproduced for the pilot on a meter having a pair of crossed pointers. If the aircraft is on the proper path, the crossed pointers will intercept at the midpoint; and the pilot therefore attempts to maintain the aircraft on the approach path by maintaining the pointers in such relative position. If the plane descends or rises above or below or *moves* to the right or left of the path, the pointers are correspondingly displaced from such relative position. Thus in making approach the pilot must maintain a careful surveillance of the relative position of the two pointers (while simultaneously noting the information on a number of other related meters), and take such corrective action as is necessary with the departure of the plane from the desired flight path. It is apparent that the maintenance of the two cross pointers in an intersecting relation, and the maneuvering of the aircraft in the proper direction responsive to the departure of the needles from such relation, while simultaneously watching a number of the meters is an arrangement which is extremely susceptible to human error. In addition, there is always the danger that the pilot, in attempting to effect a change in the plane's position relative to the guide path responsive to departure of the needles from their intersecting position, will over-compensate in his adjustment of the position and thereby place the aircraft in a dangerous flight condition.

It is an object of the present invention, therefore, to provide a flight path in the display which guides the pilot along the approach path directly to the point of touchdown. One particularly novel path taught herein comprises a flight path which during a normal approach is superpositioned over the ground texture of the display in the direction of the horizon, such flight path being presented in perspective to simulate true world conditions. In one embodiment, the flight path appears as a "highway in the sky" wherein a white ribbon [extended] *extends* from the lower margin of the display in the direction of the horizon, the ribbon path having a center line and a series of cross-grids spaced along the path length in the manner of a conventional highway.

In use, the pilot may follow the center line of the path, or if desired, the path may be assigned to represent two lanes in which case the pilot follows a preassigned one of the lanes. If the aircraft descends below the approach path of the system, the flight path presented on the display is inverted and extends downwardly from the sky portion of the display towards the horizon to provide the illusion of flight below the approach path. If the pilot maneuvers to the right or left of the path, the flight path is adjusted laterally from the middle of the display in a related direction and distance, and the pilot maneuvers the craft in the direction of the path displacement to regain the desired "on-course" position. Thus, during the approach, the pilot is only required to maintain the aircraft on the flight path in the manner in which one drives a vehicle on a highway. Ostensibly, such arrangement eliminates the complicated throught process and integration required in systems in which meter presentations of information are used, and constitutes an important step in the provision of a more safe display system for flight conditions.

In one specific embodiment of the device, a program speed computer provides an input signal into the system indicative of a safe speed along the flight path for existing conditions. Such speed is displayed on the path by symbols spaced at increments therealong. If the proper speed is maintained, the symbols are stationary. If the speed of the aircraft deviates in either direction, the symbols move along the path in a related direction to indicate to the pilot the need for speed adjustment. Thus each condition critical to the safety of the aircraft in a guided landing is integrated into a single display.

The novel flight path of the arrangement is readily adjusted to present a linear path which is related to the normal path of flight of the aircraft, and also to provide a curvilinear path in perspective which indicates a particular path which must be followed in order to reach an intended destination. Thus, in use in conjunction with a radar system, a memory device or a computer, a display of the contour of the terrain which lies in the flight path of the plane may be coupled to the system, and data computer equipment may provide signals to the system to adjust the path to a shape which is indicative of the obstacle-free course for the plane to a desired destination or target.

In one novel arrangement set forth herein, the system is operative to provide a presentation of the terrain contour in the path of the aircraft, and a curved flight path on the display which guides the pilot from his given course around the obstacles detected in such contour, and back to the course which extends to the desired destination. Such equipment, of course, provides an extremely safe operating system for aircraft, and substantially minimizes the possibility of collision with other aircraft, mountain ranges, buildings and other similar types of obstacles.

The provision of such flight path also has particular value in its adaptation for use with military aircraft. That is, modern jet military aircraft operate at a speed which permits a minimum, if any, response time for effecting firing at a second jet aircraft which is approaching the first aircraft at a like speed. Accordingly, by superposing the opposing aircraft as detected by the radar on the display target, and coupling the output of a data computer system to the flight path control equipment, the pilot need merely direct his craft along the flight path, fire at the target which appears thereon at the time indicated, and maneuver the aircraft along the indicated escape course to prevent collision with the target subsequent to firing.

The novel flight path also permits maximum utilization of the operating characteristics of the aircraft. That is, each aircraft has a predetermined operating envelope at which safe operation of the craft at different altitudes and speed may be effected. However, there is presently no known way of indicating to the pilot when the relative speed and altitude safety maximums are being approached other than by training the pilot to "feel" or "sense" such condition. Ostensibly, most pilots will therefore allow a substantial safety margin in flight, and as a result, the aircraft are frequently operated below the limits of their safe performance curves. In the present arrangement, the envelope representative of the operating characteristics of the plane may be coupled into a data computer, and such information continually fed into the flight path being projected on the display device to indicate to the pilot the maximum path which may be flown in any maneuvering position without exceeding the operating capabilities of the aircraft.

According to a feature of the invention, a pulse shaping circuit and a readout circuit are operatively coupled in a novel manner to a mixing circuit to generate cue symbols which include the contour of the shaped pulse or the readout pulse. In this manner, cue symbols having the shapes of ships, aircraft, submarine mines, etc. are readily incorporated into the display.

Further features disclosed in a preferred embodiment of the invention include means for providing a visual cue of adverse weather conditions and terrain contours in conjunction with the flight path, and in one embodiment the system provides the different information cues in different colors. Other similar applications and uses of the novel display system will be evident to parties skilled in the art, and such are considered to be within the scope of the present teaching.

The foregoing objects and features of the invention, and others, which are believed to be new and novel in the art are set forth in the following specification, claims and drawings in which:

Figure 11:
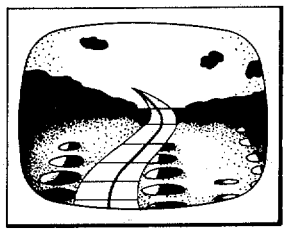
Figure 12:
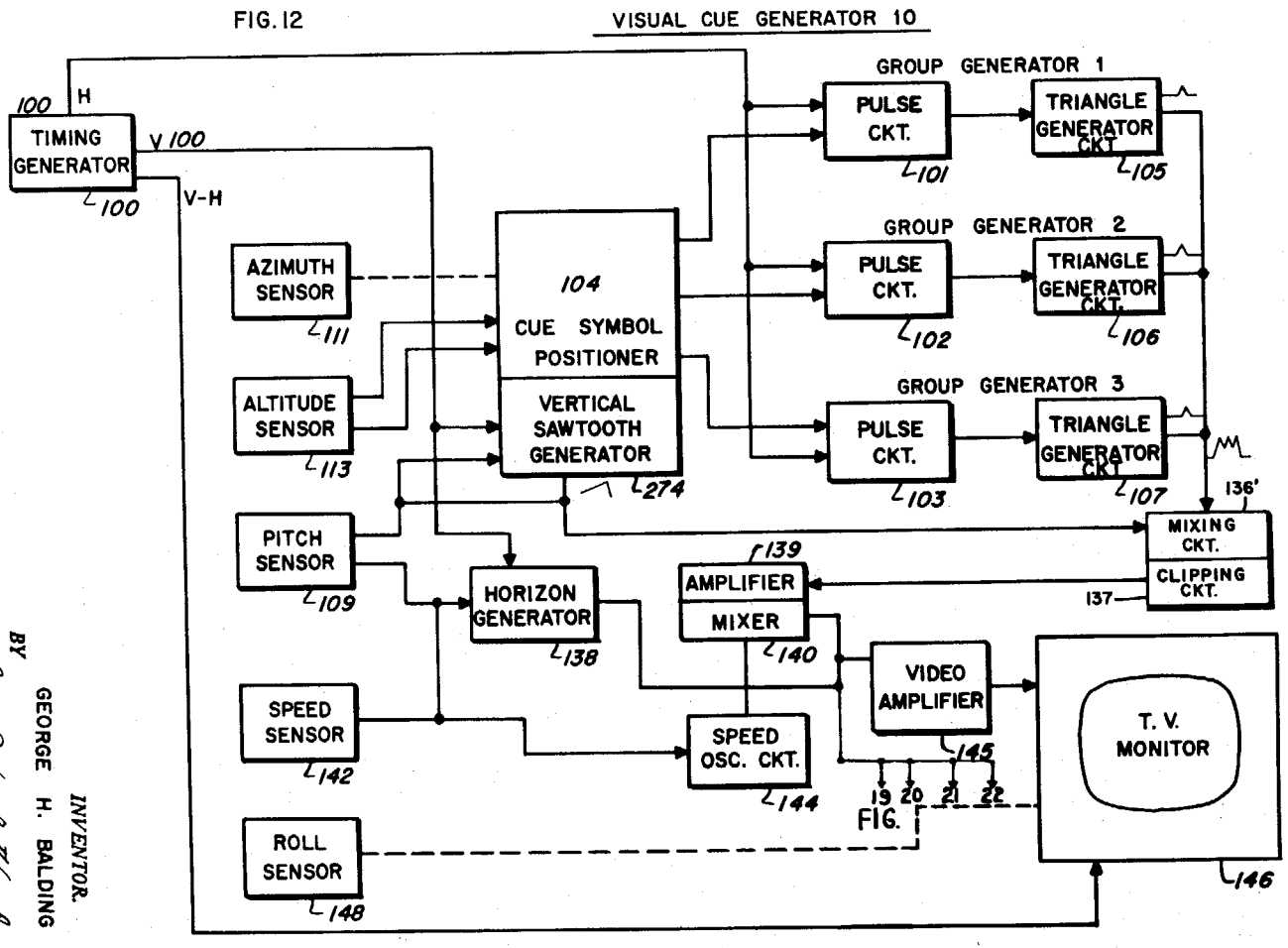
Figure 24:
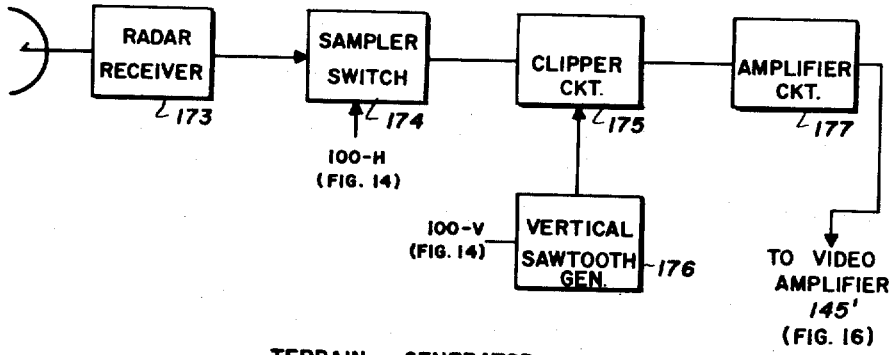
Figure 13:
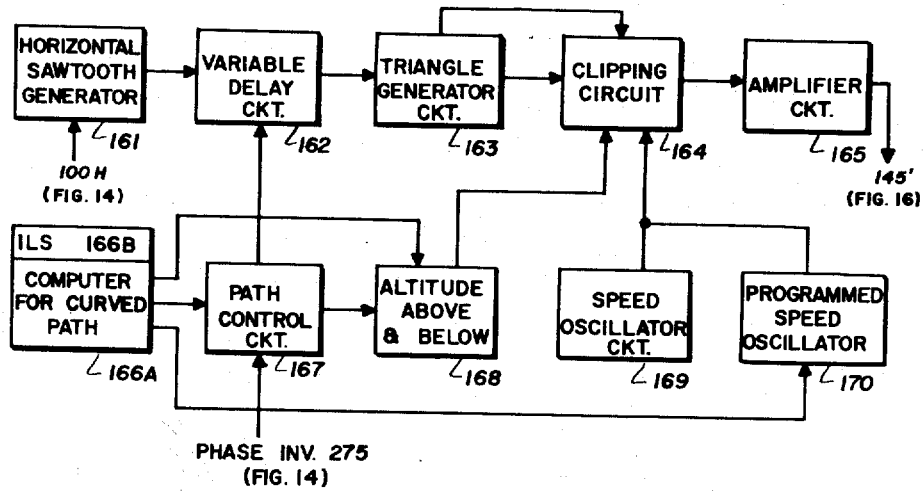
Figure 20:
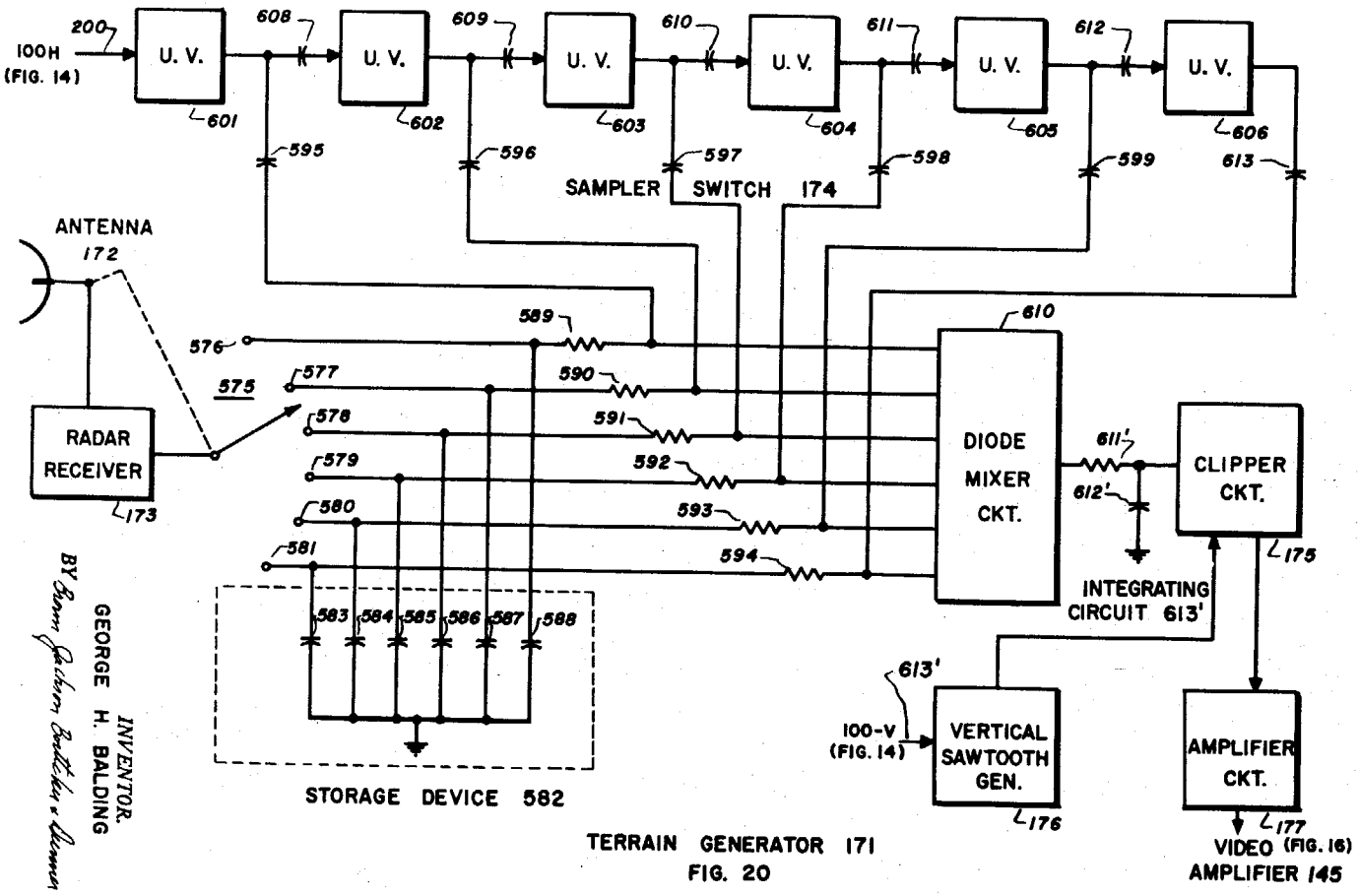
Figure 23:
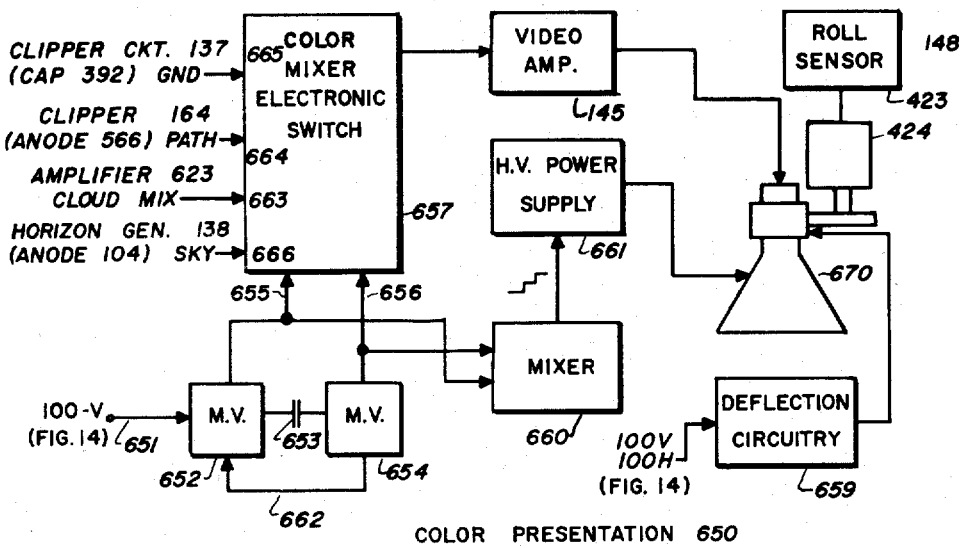
Figure 22:
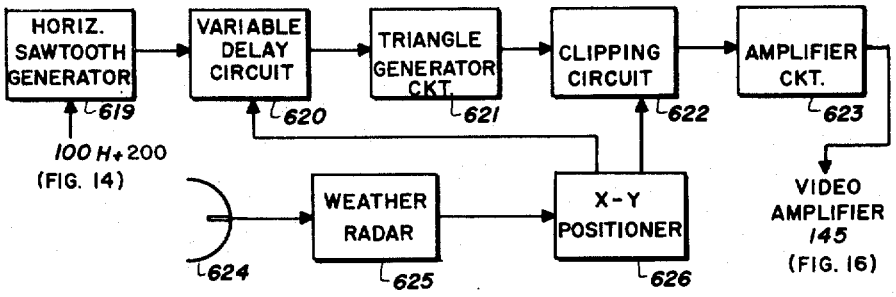
Figure 21:
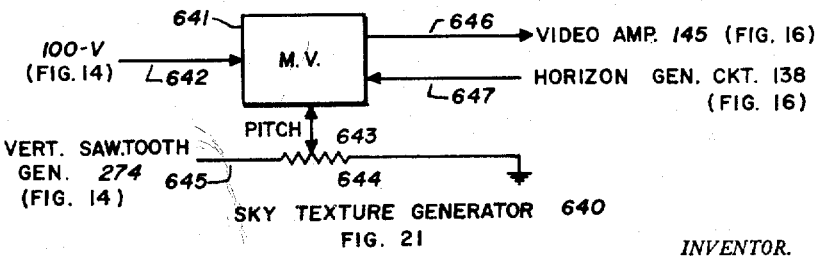

FIGURE 11 sets forth a presentation of a display device including each of the visual cues relating to the aircraft flight condition, as well as the terrain condition and the optimum flight path for such conditions, bad weather clouds, and two lane traffic;

FIGURES 12 and 13 set forth, in block representations, the component parts of the novel visual cue generator system including the flight path generator equipment;

FIGURES 14–19 set forth a specific set of circuits for effecting cue generation of the basic sky horizon and ground cues including cues of speed, pitch, azimuth, altitude, roll; and also the novel flight path including cross grid lines, a center line, and program speed;

FIGURES 20 and 24 set forth schematically a circuit for a terrain cue generator;

FIGURE 21 sets forth a sky texture cue generator;

FIGURE 22 sets forth a circuit for a cloud cue generator;

FIGURE 23 sets forth a system for displaying different ones of the cues in different colors; and FIGURES 25–28 set forth schematic illustrations of cue symbols which may be provided on the display device.

GENERAL DESCRIPTION

System Components

In a preferred embodiment, the novel display generator is adapted to present an integrated display of the basic visual cues relating to the speed, altitude, pitch, roll and azimuth of the aircraft. Such presentation includes a sky pattern, a horizon, and a ground texture to relate the cues to true visual conditions. With reference to FIGURES 1–6, the photographs thereat set forth the manner in which the different cues in the display of one embodiment are changed in size, shape and position to represent changes in the aircraft flight condition.

As there shown the display in level flight basically comprises a sky portion of comparatively light intensity, a sharp black horizon line and a ground portion of varied intensity. The ground portion of the display as it extends from the dark horizon to the bottom of the display is of a successively lighter intensity, and a series of rows of elliptical mounds and holes (three major rows and two minor rows in the present illustration) are superposed on the portion of the display which represents the ground surface. Motion of the aircraft relative to the ground is represented by movement of the symbols across the ground portion of the display, the symbols increasing in size during such movement to provide the illusion of motion. More specifically, small symbols emerge from a point immediately below the horizon and move in the direction of the lower margin of the display, each one expanding in size as it approaches the lower edge of the display. Thus the showings in FIGURES 1–11 are "stop-motion" photographs of an animated display. The emission of the guide circles from the horizon is at a rate which is related to the speed of the aircraft, the guide circles being emitted at a comparatively high frequency as the speed is increased and at a comparatively low frequency as the speed of the plane is decreased.

The altitude of the aircraft is represented by the relative position of the symbols, the symbols being farther apart as the aircraft is closer to the ground, and being closer together as the aircraft is at a higher altitude. Thus, with reference to FIGURE 1 the showing thereat illustrates the smaller symbols which are presented on the display when the aircraft is at a comparatively high altitude, and FIGURE 2 is illustrative of the manner in which the size and number of the holes in the ground pattern are altered to represent a comparatively low altitude of the aircraft.

Figure 3:
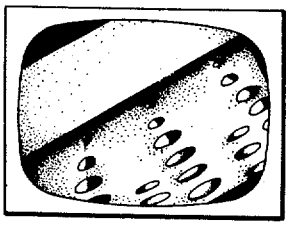
FIGURE 3 is a showing of the presentation of the display device with the airplane executing a bank to the right.

During the maneuvering of the aircraft about its roll axis, as for example banking of the aircraft in the execution of a turn, the horizon line is displaced from the horizontal through an angle which is consistent with the degree of bank of the aircraft. The nature of the change in the horizon line of the presentation on the display during banking of the plane to the right is illustrated in FIGURE 3. The position of the line in other conditions of roll will be obvious therefrom.

Figure 4:
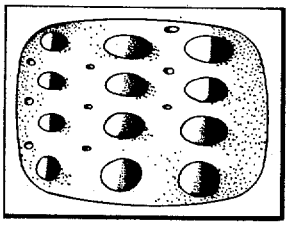
FIGURE 4 is a showing of a presentation of the display device with the aircraft in the attitude of a dive.

In a similar manner, the horizon line must be displaced along the vertical axis responsive to changes in pitch of the aircraft. It is apparent that as the aircraft is maneuvered into a dive of increasingly steeper attitude, the horizon will move progressively towards the top of the display. At such time as the plane is in a true vertical dive, the nature of the presentation on the display device will be as shown in FIGURE 4. As the heading of the aircraft is changed, the sets of circles are displaced laterally across the target display in a direction consistent with the direction of the change so that with the arrival of the plane at a new heading, a row of guide circles extends down the middle of the display in the ground texture.

As disclosed hereinafter, the apparatus may be readily adjusted to provide symbols other than guide circles, such as for example, small diamond-shaped symbols or square shaped symbols which, in the manner of the guide circles, appear to emanate from the horizon and to expand in size as they proceed across the face of the screen in the direction of the lower margin thereof. Such apparatus is also readily adjustable to provide symbols which are not aligned in row formation as shown, whereby a more random ground pattern is obtained.

The basic cues relative to speed, altitude, pitch, azimuth and roll are supplemented in a preferred embodiment by the superpositioning of a flight path on the display to indicate a preferred course of flight to the pilot. The flight path in one embodiment shown in FIGURES 7–11, comprises a ribbon-like path having a center line which extends coextensively down the length of the path and a series of spaced crossline markings which are disposed on the path at successive increments therealong. The cross line markings appear to emanate from the horizon in the manner of the guide circles to thereby provide the illusion of movement over the path in the direction of the horizon. It is noted that in the present embodiment, the guide lines on the path move across the display at a rate which is faster than the rate of movement of the guide circles to thereby simulate closer proximity of the aircraft to the path than to the ground surface. A flight path comprised of a dotted line, a solid line, a series of symbols, etc., may be incorporated in the display without departing from the scope of the invention.

The nature of the flight path superpositioned on the visual cue display will vary in accordance with the information to be portrayed by the flight path. In a system which is adapted, for example, to provide a flight path indicative of the preferred approach path for a landing, the flight path is projected on the display device in the manner shown in FIGURE 7, and the pilot guides the plane along such path. In the event of deviation from such path, the flight path will be angularly shifted to indicate such deviation. The position of the flight path in FIGURE 8, for example, indicates that the aircraft is flying to the left of the guide path, and that the aircraft should be maneuvered to the right for the purpose of one more positioning the aircraft on the flight path.

Figure 7:
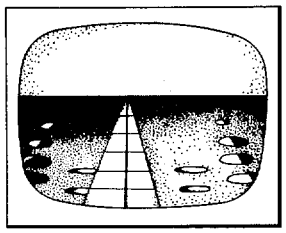
FIGURES 7–10 are illustrations of the novel flight path as superposed in different positions on the basic cue display of the device.
Figure 8:
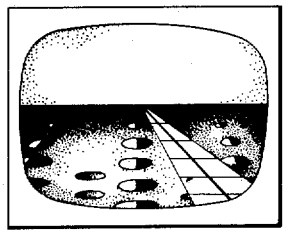

In each of the illustrations of FIGURES 7 and 8 the aircraft is on, or slightly above, the guide path. In the event that the aircraft descends below the guide path, the flight path is inverted in the manner of FIGURE 9 to indicate to the pilot the need for increasing altitude to regain the path indicated by the system.

The center line shown in each of the illustrations 7- may be utilized as the intended line of flight of the path or alternatively may be used to divide the path into two lanes, whereby one lane of traffic would fly along the lane to the right of the centerline, and the second set of traffic would be assigned to use the lane to the left of the centerline. The cross line members which appear in FIGURES 7–9 emerge from the horizon and proceed in the direction of the lower margin of the display at a speed which is, in the illustrated embodiment, of a higher rate than the movement of the holes across the ground texture, to thereby indicate closer proximity of the aircraft to the path than to the ground.

In one embodiment of the device, a second set of information symbols (not shown in FIGURES 9–11) are incorporated in the flight path display for the purpose of providing a guide to the pilot as to the preferred speed of the device for a given situation. In the arrangement described hereinafter, a set of guide circles appear to travel along the center line of the flight path to indicate the most desirable speed of the plane for such condition. In the event that the aircraft is moving faster than the desired speed, the guide circles will move in the direction of the bottom margin of the display. In the event that the plane is moving at a rate slower than the optimum rate in such condition, the guide circles on the center line of the path will move in the direction of the horizon. In the event that the optimum speed is being obtained for such condition, the guide circles will remain stationary.

In certain embodiments it may be desirable to provide a flight path which extends around certain obstacles and which requires a change in altitude. The manner in which the flight path may be adjusted to portray such change in course and altitude is set forth in FIGURE 10. The specific manner in which such arrangement is operable to provide a flight path in an integrated display including terrain contours and undesirable weather conditions is set forth in FIGURE 11, the contour of the terrain be hown above the horizon and the patterns of abnormal eather conditions being shown in the sky texture. The isplay there shown also illustrates the manner in which controlled flight path may be utilized to evade dangerous errains and undesirable weather during flight. Other anners in which such structure may be utilized for the urpose of controlled target attack and other military aneuvers, as well as in other commercial applications, ill be readily apparent to parties skilled in the art.

BASIC CUE GENERATION

The electronic visual cue generator 10 basically comrises an electronic generator set which is operative reponsive to the application of information representative ignals thereto to provide an integrated presentation of uch information on a suitable display device, such as for xample, a cathode ray tube. The more basic cues may nclude aircraft speed, altitude, pitch, roll and azimuth ues which are integrated in and displayed in superposed elation to an electronically produced set of background ues including a sky, horizon and ground pattern.

The electronic generator 10 for providing such basic isplay cues is schematically shown in FIGURE 12, and s there shown, includes a azimuth sensor 111 for providig azimuth representative signals, an altitude sensor 113 or providing altitude representative signals, a pitch sensor 09 for providing pitch representative signals, a speed ensor 142 for providing speed representative signals, and roll sensor 148 for providing roll representative signals.

The sensor devices 109, 111, 113, 142, 148 may comrise conventional aircraft sensing equipment, examples f which were set forth in the copending application which as filed by Aid and Balding on June 30, 1958, and was ssued Serial No. 745,472, and which was assigned to the ssignee of the present application. These and other ypes of sensor devices and systems adapted for use in ircraft equipment are well known in the art and comercially available. In the use of the display unit with imulator equipment, for example, each of the sensor deices may be replaced by a manually adjustable means, uch as a variable potentiometer, having a control knob djustable to different positions to provide different outut potentials indicative of different flight conditions, such s altitude, pitch, etc. Alternatively, data computer or emory equipment may be connected to the potentiomters to adjust the input signals representative of the difrent conditions to different values. Other types of signal enerating equipment for providing signal inputs to the isplay system in its different uses will be apparent.

Generation of the different cues into a common disday is basically controlled by a timing generator 100 FIGURE 12), which is operative to provide horizontal ync pulses at the rate of 15,750 cycles per second and ertical sync pulses at the rate of 60 cycles per second, uch type timing generator being commonly used in comercial television transmitter equipment. The horizontal ync output pulses of the timing pulse generator 100 are oupled to the input side of a set of variable delay pulse ircuits 101, 102, 103, respectively, the number of variable elay pulse circuits being determinative of the number of ets of circle guide paths which are provided in the ground exture of the final display. In the illustrated embodiment he three circuits sets 101–103 provide the illustrated isplay comprised of three major guide rows and two inor guide rows as shown in FIGURES 1–11.

The sensor signal output of sensor devices 109, 111, 13, is coupled over a cue symbol positioner 104 to the ariable delay pulse generators 101–103 to control such nits in the generation of cue signals. More specifically, ach of the variable delay pulse circuits 101–103 is opertive to generate a square pulse, the trailing edges of the quare pulse output of the respective circuits 101–103 eing different in time as determined by the azimuth, itch and altitude sensor signals coupled thereto by the ue symbol positioner 104 and sensor units 109, 111, and

113. That is, as the sensors 109, 111, 113 couple signals of different values to the cue symbol positioner 104 with changes in the azimuth, pitch and altitude of the aircraft, the time difference between the trailing edges of the output of the generator circuits 101–103 is correspondingly varied. As shown in more detail hereinafter, with a change in the azimuth, the signal output of the generator circuits 101–103 is modified in time to adjust the circle guide paths laterally in a direction consistent with the direction and degree of the turn; with a change in altitude the signal output of the generator circuits 101–103 is modified in time to cause the guide circles to move apart or closer together, and simultaneously to adjust the angular relation of the outer guide circle rows relative to the center circle row to thereby vary the perspective pattern on the ground surface; and with a change in pitch, the signal time is adjusted in a similar manner to alter the perspective showing.

The output pulses of the variable delay pulse circuits 101–103 is coupled, respectively, to the input sides of the triangle generators 105–107 which are controlled to operate in response to the trailing edge of each square pulse input thereto, and in such operation to generate a triangular-shaped pulse for coupling over the mixing circuit 136' to the clipping circuit 137. As indicated by the wave form adjacent the input to the mixing circuit 136', and the wave forms adjacent the output sides of triangular generators 106–107, the output triangles of each of the successive stages 105–107 generated during each horizontal line trace of the raster are spaced relative to one another in time, the spacing between the pulses being determinative of the spacing between the rows of guide circles on the display device.

It is apparent from the foregoing description that variation of the time distance between each of the three pulses of the successive pulse generators 101–103 varies the spacing between the guide circle rows on the display screen, and that the perspective representation may be varied by providing an increased time spacing between the signals as successive lines of the raster are scanned. The sensor input signals which indicate a change in altitude and pitch are operative to effect such adjustment of the time spacing between successive signals in successive time scans. Variation of the duration of each pulse of each set of three pulses will manifestly vary the position of the circles on the display, and the signals indicating a change in altitude are coupled to the pulse delay circuits 101–103 to effect such adjustment. The lateral positions of the guide circle rows relative to the vertical edges of the display screen are manifestly determined by the time of initiation of each successive pulse [or pipe] of a waveform of three pulses during each horizontal scan, and signals indicating a change of heading are coupled to the generator 101–103 to effect lateral adjustment of the guide circles in a direction consistent with the direction of the heading change (i.e., right or left). This adjustment of the time of generation of each pulse relative to each horizontal trace, and the duration of each pulse during each successive horizontal trace determines the relative location and size of the guide circles on the display screen, and adjustment of the amplitude of the pulses of each set in turn determines the size of the circles.

The output signals of the pitch sensor 109 are coupled directly to a mixing circuit 136' and clipping circuit 137 and also over the vertical sawtooth generator 274 of the cue symbol positioner 104 to the mixing circuit 136' and clipping circuit 137. The output signal of the vertical sawtooth generator 274 is controlled by the pitch sensor signals and comprises a positive going sawtooth waveform, which is generated at the vertical rate of the raster trace and, which varies in amplitude with a change in pitch to effect a corresponding change in the size of the guide circle. The pitch sensor output signals directly coupled to the mixing circuit 136' adjust the vertical positioning of the first symbol. As shown hereinafter, the output signals of the cue symbol positioner are also operative to adjust the skew angle of the circle rows relative to the center row with a change in pitch to thereby effect a corresponding change in the perspective display. This is done by changing the amplitude of the vertical sawtooth.

The positive going sawtooth waveform output of the vertical sawtooth generator is mixed with the symmetrical triangular waveform output of the generators 105–107 in the mixing circuit 136' for coupling of the clipping circuit 137, the signal output for the mixing circuit 136' comprising a plurality of groups of impulses, each group being comprised of three triangular impulses, the amplitude of the three triangular impulses in each successive group during a raster scan increasing incrementally as the vertical sawtooth changes in value. Thus the width of the guide circle increases as the scan progresses in the manner shown in FIGURES 1–11, and a change in pitch automatically effects a further adjustment of the circle symbol sizes.

The sets of signals are clipped in a clipping circuit 137 and are coupled to an amplifier 139 to provide a signal of an increased amplitude for coupling to a mixer circuit 140, which is controlled in its operation by the output signals of a horizon generator 138 and additionally by the output signals of a speed sensor 142 and a sine wave oscillator unit 144.

Figure 5:
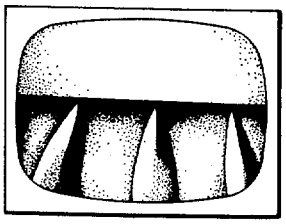
FIGURES 5 and 6 are pictorial representations of the manner in which the path and guide circle patterns are provided in the successive stages of the device.

As shown in more detail hereinafter, if the output of the clipping circuit 137 were coupled directly to the display device, the display would consist of three paths as shown in FIGURE 5. In order to obtain separate symbol elements having relative motion to indicate movement of the aircraft over the ground pattern, the signal output of the amplifier circuit 139 is modulated by the pulses of an oscillator 144, the shape of the oscillator pulses determining the shape of the symbols which form the paths. Thus in the disclosed embodiment, the clipping circuit pulses as modulated by the sine wave shapes result in the generation of circle symbols on the display screen, as shown in FIGURES 1–4 and 6. If a triangle generator were used in lieu of the sine wave generator, the symbols on the display device would be triangular shaped, and if a square wave generator were used, the symbols would be square shaped; etc.

As the speed sensor equipment 142 couples signals of different values to the oscillator 144, the rate of oscillation of the oscillator 144 is correspondingly altered, and as a result thereof the repetition rate of the sine wave signals input to the mixer 140 are correspondingly adjusted to different values. Such change in frequency results in a corresponding adjustment of the rate of movement of the symbols across the display device, and accordingly provides a visual cue of the relative increases and decreases in speed of the aircraft. Adjustment of the output of the oscillator frequency to a value less than a multiple of the frequency of the vertical sweep will cause the symbols to apparently move from the bottom margin of the display in the direction of the horizon to thereby create the illusion of backward flight. Such use has especial application in helicopter installations which are frequently operated in such manner.

The horizon generator 138 is controlled in its operation by the pitch sensor 109, and is synchronized with the system by the vertical sync output pulses of timing generator 100. The horizon generator 138 basically provides a pulse having a sharp leading edge, the time of occurrence of the leading edge in a raster scan determining the location of the horizon line on the display, and, in turn, being controlled by the pitch sensor output. The trailing portion of the output wave of the horizon generator 138 is mixed with the output signals of amplifier 139 and coupled to a video amplifier 145, and the video gun of display device 146.

Roll sensor equipment 148 is operative with rotation of the aircraft about its roll axis to couple signals indicative of the change in roll attitude to control equipment for the deflection yoke of the display device 146, to control same to mechanically effect a corresponding rotational adjustment of the yoke and thereby rotation of the horizon line from the horizontal. Such adjustment may also be effected electronically, if desired.

It is seen from the foregoing description that the novel visual cue generator system provides an integrated display of the cues which set forth the relative pitch, altitude and speed of the aircraft, as well as changes in the roll and heading attitude thereof.

FLIGHT PATH GENERATION

In the preferred embodiment of the disclosure, a flight path is superposed on the display presented to the pilot as a further aid to the provision of safe flight conditions. As shown in FIGURE 13, the flight path generator 160 may include a horizontal sawtooth generator 161 which is controlled in its operation by the horizontal sync output of the television timing pulse generator 100 (FIGURE 12), and which in turn controls a variable delay pulse generator 162 (of the type similar to the variable delay pulse circuit generators 101–103) to control a triangle generator 163 (similar to triangle generators 105–107), in the provision of timed triangle impulses for each horizontal sweep. The output of the triangle generator 163 is fed to a clipping circuit 164 (similar to clipping circuit 137) and over amplifier 165 to the video amplifier 145 (FIGURE 12) of the display device 146. The basic units 161–165 of the flight path generator 160 *in the normal condition of flight, i.e., in the absence of deviation or error signals,* establish a ribbon-like path which, as shown in FIGURE 7, extends from the bottom of the display screen in the direction of the horizon, and in the manner of a perspective showing, appears to converge at a point on the horizon.

Figure 9:
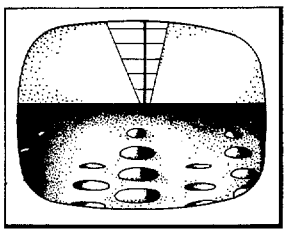
Figure 10:
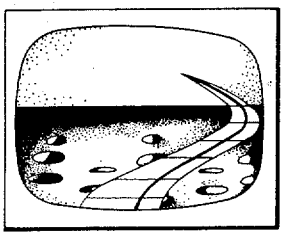

The path may be adjusted to different shapes and to different positions on the screen as shown in FIGURES 8–11. Thus, for example, in the use of equipment with the blind landing installations (ILS), the flight path may be positioned as shown in FIGURE 8 to show deviation of the plane to the left of the proper approach path, and as shown in FIGURE 9 to show deviation of the plane below the proper approach path. As shown in FIGURE 10 the path may be curved to show the proper path to be flown to reach the point of touchdown or some other desired destination.

The equipment for adjusting the shape of the flight path in such manner may include ILS receiver equipment, such as illustrated unit 166B, which is operative to receive the signal output of the ILS transmitting equipment (not shown), and a data computer 166A which is controlled in its operation by such signals. The output signals are fed to the path control equipment 167 which is operative in turn to couple variable value signals to the variable delay pulse circuit 162 to control same to vary the timing of the pulse generated thereby during each horizontal trace of the display device. In this manner, the position of the successive path representing pulses as coupled to the display device effect a corresponding adjustment of the path position. It is apparent that a flight path of any desired shape may be generated in this manner. Ostensibly, the system is also readily adapted for use with other types of sensor equipment, such as for example radar units which are operable to detect enemy targets. In such arrangement an associated data computer is operative to compute a preferred path of attack and retreat, and to feed such path into the path control unit 167. Other similar applications will be apparent to parties skilled in the art.

In certain of these applications it may be desirable to provide an indication to the pilot as to altitude of the aircraft relative to a predetermined guide path. In the use of the system with ILS equipment, for example, the receiver equipment 167 is connected to feed indicator signals to the altitude above and below path equipment 168 which is operative to couple indicating signals to the clipping circuit 164 to provide a flight path on the display which provides such information to the pilot. In the particular embodiment shown herein, the flight path shown on the display device in the event the pilot is on the desired approach path will comprise a ribbon path which extends across the ground texture to convergence at a point on the horizon (FIGURE 7), and as the craft rises to successively higher altitudes relative to the desired path, the flight path on the display device becomes narrower and narrower. As the aircraft descends below the desired path, the flight path is immediately inverted, (FIGURE 9) and extend from the horizon to the direction of the upper margin of the display.

According to the invention, a center line is provided in the flight path so that the approach path is divided into two lanes in the manner of a highway, and traffic can be assigned to the different lanes in accordance with known traffic regulations. In the flight path display on the device, the assigned lane will be aligned with the central set of symbols of the ground texture when the pilot is on course, and [will] *may* be displaced therefrom in the event of maneuvering of the craft from its proper position relative to the assigned lane.

In a further modification of the device, a speed oscillator 169 modulates the output of the clipping circuit 164 at a rate which results in the introduction of cross-grid lines at successively spaced increments along the flight path to show motion to the aircraft over the path, and also to show the difference in speed of the craft relative to the path as related to the speed of the aircraft relative to the ground.

The device may also include a program speed oscillator 170 which is connected to couple a symbol indicating circuit to the clipping circuit 164 for effecting the reproduction of further speed symbols on the flight path. In one preferred embodiment, such signal comprises a series of circle symbols spaced at successive increments along the center line of the flight path, the symbols being maintained motionless during the periods that the speed of the craft is consistent with the programmed or desired speed; and being set into motion in the direction of the lower margin of the picture in the event the craft is operating at a speed in excess of the programmed speed, and in the direction of the horizon in the event that the craft is being operated at a slower speed than the speed which has been programmed. Other symbols may be provided for such purpose by varying the pulse output of the speed oscillator 170 as described heretofore in the matter of the speed oscillator 144.

DESCRIPTION OF BASIC CUE GENERATOR CIRCUIT

(a) Symbol Group Generation

The electronic visual cue generator (FIGURE 12) for generating basic cues relative to azimuth, altitude, pitch and speed, as shown in FIGURES 14, 15, 16 and 17, is controlled in its operation by the pulse output of a television timing pulse generator 100, which may be of the type commercially available as a Hickock Model 650C universal video generator, and which provides a set of horizontal sync impulses at the rate of 15,750 pulses per second, and a set of vertical sync impulses at the rate of 60 pulses per second. Other types of timing pulse generators of a more simplified construction which may be used in such arrangement will be readily apparent to parties skilled in the art.

The horizontal sync output of the timing pulse generator 100 is coupled over terminal 100H to the input circuit for the flight path generator 160 (FIGURE 13); to the input circuit for each of the group generators 1, 2, and 3 (FIGURES 14, 15); and over terminal 100V–H to the deflection circuitry 421 (FIGURE 16) of the TV monitor 146. The vertical sync output of the timing pulse generator 100 is coupled over conductor V100 to the horizon generator 138.

Each of the group generators 1, 2, 3 provides a pulse once for each horizontal trace of the display screen, the position of the pulse determining the position of a corresponding portion of a symbol in the ground pattern of the display device. Thus in the illustrated embodiment, the first group generator 1 provides a pulse for each horizontal trace which determines the position of a portion of a symbol of the first path (FIGURE 5) of the three groups on the display device; the second group generator 2 provides a pulse output for each horizontal trace delayed in time relative to the output of the first group generator 1, to thereby determine the position of a portion of a symbol in the second path (FIGURE 5), and the third group generator 3 provides a pulse for each horizontal pulse delayed in time relative to the first time pulses to provide a portion of a symbol of the third path (FIGURE 5). Thus, the number of groups of symbols to be provided in the ground texture of the ultimate display is determined by the number of group generators which are included in the system, the number of generators illustrated in the present arrangement being limited to three for purposes of simplicity of disclosure. Although each group of symbols provided by each group generator 1, 2, 3 in the example of the present disclosure, are aligned in rows, it will be apparent from the teaching of the manner in which the flight path is adjusted to different shapes hereinafter that such principle may be utilized to adjust the shapes of the path of FIGURE 5, and thereby provide a random texture pattern in lieu of the rows of symbols shown herein.

Each of the group generators 1, 2, 3 are similar in structure, and accordingly only group generator 1 has been shown in detail. With reference thereto, (FIGURE 14) group generator 1 may comprise a pulse delay circuit 101 and a triangle generator 105. Pulse delay generator 101 may comprise a twin triode tube 202, commercially available as a 12AU7, connected in a univibrator circuit, and may include anodes 203, 206, control grids 204, 207, cathodes 205, 208. Anode 203 of the first section is coupled to a 300 volt B+ source over load resistor 209; control grid 204 is coupled to the input circuit over capacitor 210, and control grid 204 is additionally connected over negative clipper circuit comprised of diode 211 and resistor 212 to ground; and cathode 205 is connected over cathode resistor 213 to ground.

Figure 14:
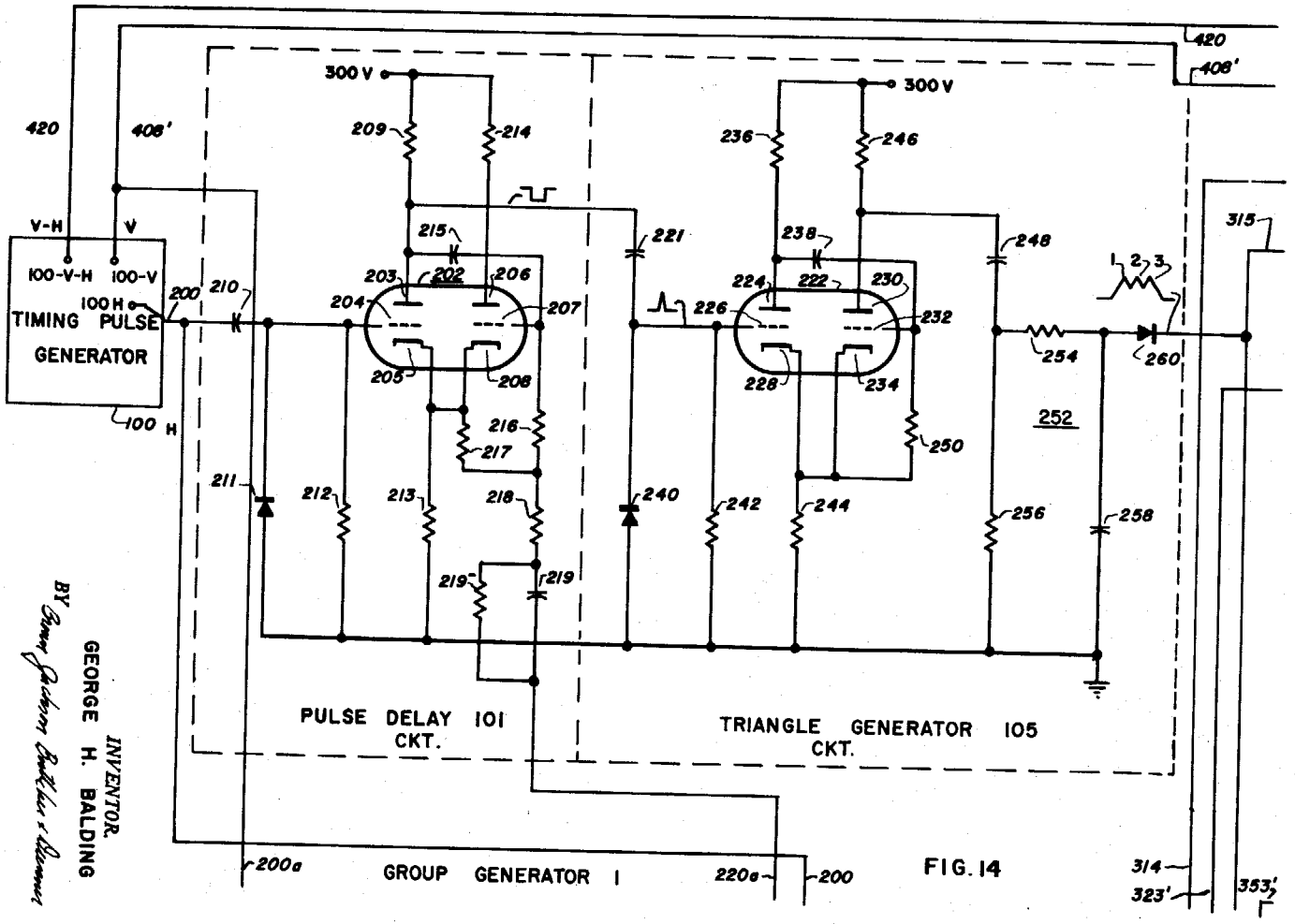

Anode 206 of the second section is coupled over load resistor 214 to 300 volt B+ supply; control grid 207 is coupled over capacitor 215 to the plate circuit of the first section of tube 202, and additionally over the voltage divider network comprised of resistor 216, 217, 218 and 219' and capacitor 219 to a resistance section on the azimuth positioner potentiometer 300 in the cue symbol positioner 104 to ground. As each horizontal sync impulse output of timer 100 is coupled to the pulse delay circuit 101, the circuit is operative in the manner of a conventional univibrator circuit to generate the leading edge of a square wave pulse (as shown in FIGURE 14). The square wave impulse thus generated is coupled to the triangle generator, the duration of the pulse being determined by the value of the signals (representative of azimuth, pitch and altitude) which are coupled thereto over conductor 220a (such control signals being described in more detail hereinafter).

Briefly as each horizontal sync pulse is coupled over capacitor 210 and rectifier 211, resistor 212 to the control grid 204 of the first section of tube 202, the first section of tube 202 is rendered conductive and the decreasing potential which appears in the anode circuit thereof is coupled over capacitor 215 to drive control grid 207 negative relative to cathode 208 and thereby decrease the conductivity of the second section of tube 202. Capacitor 215 charges during the period of the pulse, and as the incoming sync pulse is terminated to terminate the change of potential in the anode circuit of the first section capacitor 215 discharges over [resistor] *resistors* 216, 217 and 213 to ground. The negative potential which appears at the grid 207 maintains the second section nonconductive, and the negative potential which appears at the cathodes 205, 208 maintains the first section conductive subsequent to the discharge of capacitor 215 through resistors 216, 217 to cathode 208, and for a time period determined by the value of the control signals coupled to the timing circuit by cue symbol positioner 104. This is done by mixing the control signal with the discharge voltage at grid 207.

The decreasing potential which appears in the anode circuit of the first section of tube 202 is also coupled over capacitor 221 to the triangle generator 105 to provide the leading edge of a negative square wave pulse as shown in FIGURE 14 adjacent the anode output circuit for the first section of tube 202.

As capacitor 215 discharges to complete the timing cycle (which is of a duration determined by the control signal output of cue symbol positioner 104) cathodes 208 and 205 return to their normal positive biassed condition, and the first tube section is once more biassed to cutoff. The rising potential which now appears in the anode circuit of the first section constitutes the trailing edge of the negative square wave output pulse shown in FIGURE 14.

It is apparent therefore that as each sync pulse is coupled to the pulse delay circuit, a negative square wave output pulse having a duration determined by the altitude, pitch and azimuth of the aircraft is generated and coupled to the triangle generator 105.

Triangle generator 105, which is coupled over capacitor 221 to the output circuit of the pulse delay generator 101, comprises a twin triode tube 222 which may be of the type commercially available as a 12AU7 having anodes 224, 230, control grids 226, 232, *and* cathodes 228, 234. Anode 224 of the first section is coupled over resistor 236 to 300 volt B+ supply, control grid 226 is coupled over capacitor 221 to the output side of the pulse delay circuit 101, and also over negative clipping circuit comprised of diode 240, and grid resistor 242 to ground; and cathode 228 is coupled over cathode resistor 244 to ground. Anode 230 of the second section of tube 222 is coupled over load resistor 246 to 300 volt B+ supply, and over capacitor 248 to the input side of the integrating circuit 252 which includes resistor 254 and capacitor 258 (FIGURE 14); control grid 232 is coupled over capacitor 238 to anode 224 of the first section and also over resistor 250 to cathode 234, which is in turn coupled with cathode 228 over resistor 244 to ground.

As the negative square wave impulse generated by the pulse delay circuit 101 is coupled to the triangle generator circuit 105, the positive-going portion of the pulse is integrated by capacitor 221, rectifier 240, and resistor 242 to control the tube 222 which is connected as a univibrator to provide a square wave output pulse, it being apparent that as the incoming impulse changes in duration as the result of the control signal coupled to the pulse delay circuit 101 by the cue symbol positioner 104, the trailing edge of the negative square wave pulse output thereof will likewise change in time relative to the horizontal sync pulse, and a like change in the time of generation of the output pulse during a horizontal line trace by the triangle generator circuit 105 will result.

The univibrator circuit including tube 222 in triangle generator 105 is operative in the manner of the univibrator circuit including tube 202 of the pulse delay circuit 101, the time duration of the output pulse however being fixed in the illustrated embodiment and the output pulse being derived from the second section of tube 222, whereby a positive square wave pulse is coupled to the succeeding stage.

Since the univibrator stage is operative responsive to the trailing edge of each impulse coupled thereto by the pulse delay circuit 101, it is apparent that the positive square wave output of the triangle generator is delayed in time relative to each horizontal sync pulse of the system, and by a value determined by the control signal output of cue symbol generator 104, and the amplitude thereof.

Figure 16:
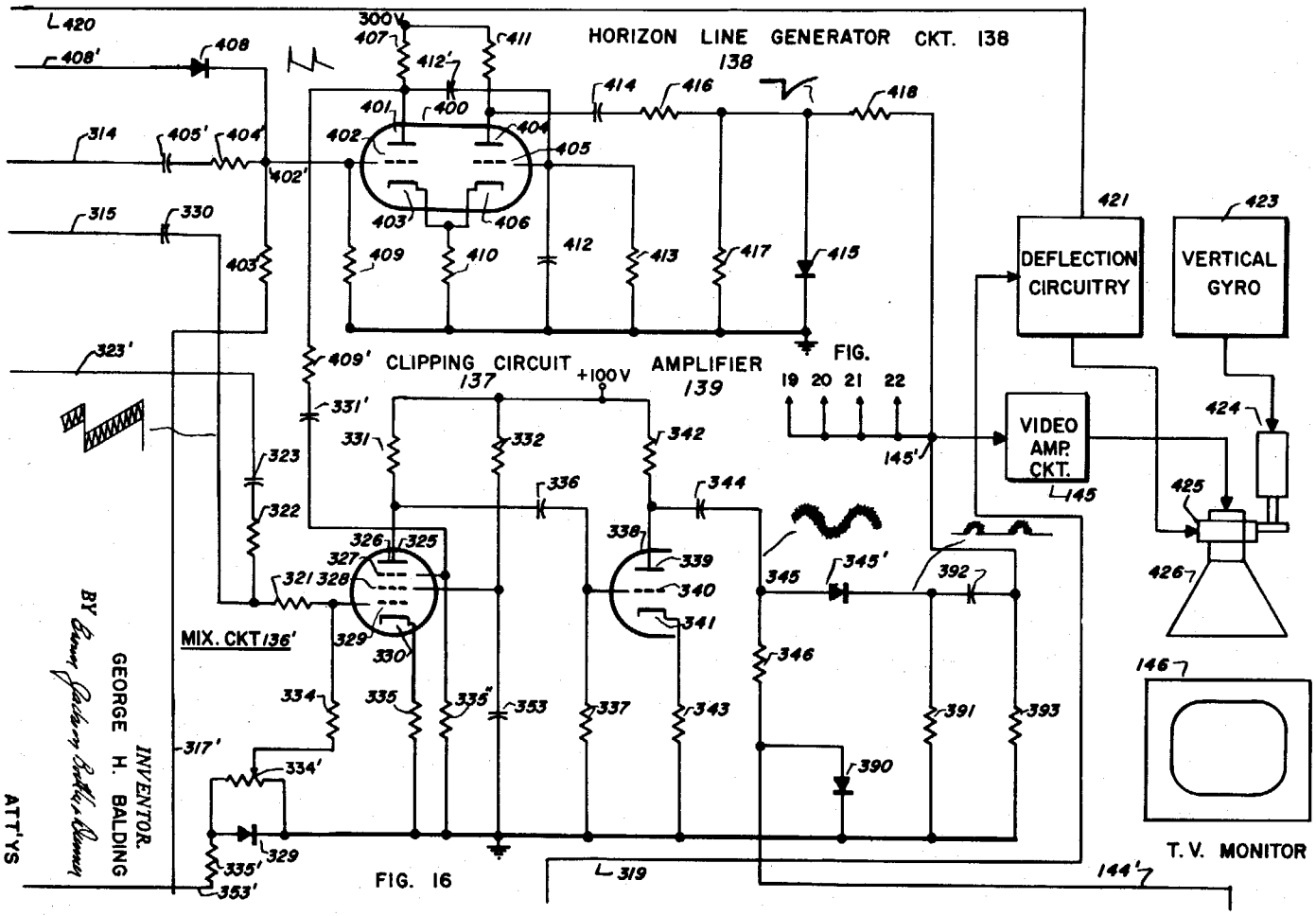
Figure 17:
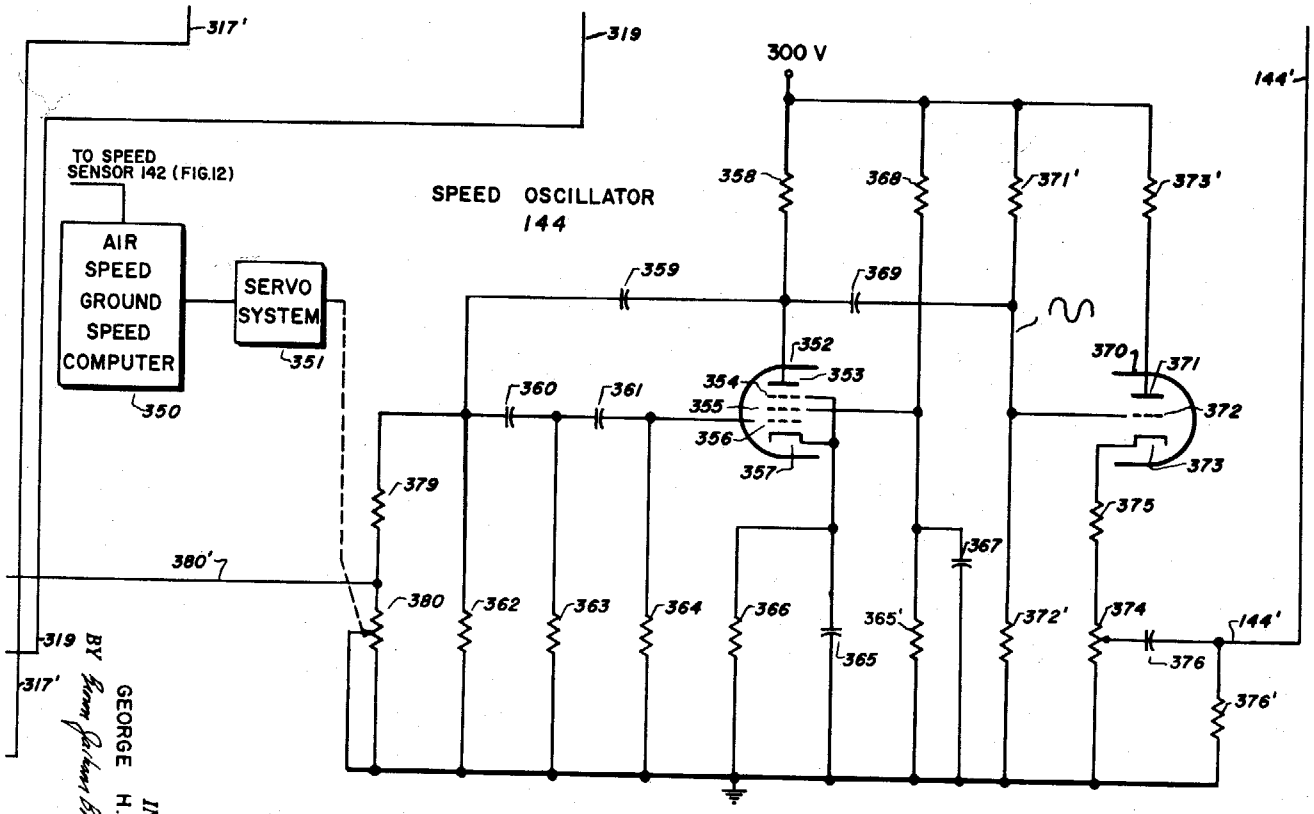

Integrating circuit 252 includes resistor 254 connected in series with capacitor 258 to ground, and resistor 256 connected with capacitor 258 and resistor 254 to provide a discharge path for capacitor 258. With the application of each square wave impulse to the integrating circuit 252, an output sampling signal comprising a triangular shaped impulse is coupled over a diode 260 and mixing circuit 136' to the input side of the clipping circuit 137 (FIGURE 16).

Each of the group generators 1, 2, 3 comprise a similar set of equipment, and are operative to provide a triangular impulse at the output side thereof for mixing in the clipping circuit 137. Since the signals coupled to the respective inputs of the pulse circuits 101–103 are of different values, the triangular waveform pulse output of the group symbol generators are out of phase with one another by a corresponding time period, whereby a composite waveform of the shape indicated in FIGURE 14 is coupled to the clipping circuit 137 by the three [generator] *generators* during each horizontal line trace of the raster.

(b) Integration of Sensed Information Into Cues

The cue symbol positioner 104 couples signals over conductors 220a–220c to each of the pulse delay circuits 101–103 of the group generators 1–3 to adjust the time period between the triangle pulses in the composite output pulse of the three generators to different values in accordance with changes in values of the pitch, azimuth and altitude as detected by the pitch sensor equipment 109, azimuth sensor equipment 111, and altitude sensor 113. As will be shown hereinafter, variation in the time or distance between the successive peaks in the composite wave effects a corresponding adjustment in the distance between the rows or groups of symbols which appear on the display screen.

More specifically, the cue symbol positioner 104 (FIG. 15) comprises a vertical sawtooth generator stage 274 and a phase inverter stage 275 and an azimuth positioner stage 276. The vertical sawtooth generator stage 274 may comprise a twin section tube 277 commercially available as a 6U8 in which the first section comprises an anode 278, a control grid 279, cathode 280, and the second section includes an anode 281, suppressor grid 282, screen grid 283, control grid 284, and cathode 285. Anode 278 of the first section is connected to 300 volt B+ supply, control grid 279 is connected over capacitor 286 to the vertical sync output of the timing pulse generator 100, and also over resistor 287 to ground. Cathode 280 is coupled to the plate 281 of the second section of tube 277 and also to the phase inverter stage 275 and capacitor 291 to ground. Suppressor grid 282 is connected internally to the cathode 285, and screen grid 283 is connected over voltage divider circuit 283', 290, control grid 284 is connected over adjustable resistor 289b' to ground, and also over adjustable arm 315b to the resistance segment 289b of pot 289, the junctions 316b, 317b on pot 289b being connected to ground and —50 v. respectively; and cathode 285 is connected over resistor 288 to ground. Resistor 289' having an adjustable arm thereon for coupling the signals representative of the pitch of the aircraft (as determined by the position of the arm 315b on resistor 289b) to the control grid 284 in the second section of tube 277.

Pitch sensor 273 may comprise conventional sensor equipment coupled to the vertical attitude gyro of the aircraft, and connected in the manner set forth in the above identified copending application, which controls a conventional servo system 272 over section 289b of the four section potentiometer 289 to adjust the potential which is coupled to the control grid 284 of second section of tube 277 which is connected as a vertical sawtooth generator. The indications of changes in pitch attitude of the aircraft as derived by the pitch sensor equipment 273 are also represented by changes in the value of the potential which is coupled over potentiometer section 289a to the speed oscillator equipment 144; over potentiometer 289c to the clipping circuit 137; and over potentiometer section 289d to the horizon line generator circuit 138. More specifically, signals representing changes in pitch are coupled to the system by adjusting the four wiper arms 315a–315d respectively to different positions, the servo unit 272 and vertical gyro sensor 273 controlling the wiper arms in such operation as the pitch of the aircraft is varied. The first section 289a of pitch potentiometer 289 is coupled over two terminals 316a, 317a respectively to ground, and is coupled over wiper arm 315a and conductor 380' to the speed oscillator 144 as more fully described hereinafter. Each of the arms 315a–315d are in the illustrated position with the aircraft in a normal level flight condition. With variations in the pitch attitude the wiper arm 315a is adjusted in the indicated directions to correspondingly adjust the value of resistance in the oscillator circuit 144, and thereby the relative speed of movement of the ground cue symbols across the display as the pitch of the aircraft is varied.

As the aircraft is maneuvered into a dive attitude of increasing value, the value of the resistance connected in the speed oscillator circuit 144 by potentiometer arm 315a and section 289a is correspondingly decreased to decrease the rate of movement of the symbols across the display. As the aircraft is placed in a vertical dive, the wiper arm 315a will have been moved to the terminal 317a, and zero resistance will be connected in the speed oscillator circuit 144, whereby the ground cue symbols are maintained stationary on the display device. Other relative conditions of operation will be apparent therefrom.

The second section 289b of pitch potentiometer 289 is coupled over terminal 316b to ground and over terminal 317b to the negative terminal of the 50 volt potential source. Wiper arm 315b for the second section 289b is connected to the vertical sawtooth generator stage 274. With variations in the pitch attitude of the aircraft from level flight, the wiper arm 315b is adjusted in the alternative directions indicated in FIGURE 15 to correspondingly adjust the value of the potential signal coupled to the vertical sawtooth generator stage 274. Thus a more negative signal is coupled to stage 274 as the plane is placed in the dive condition, and a less negative signal is coupled to stage 274 as the plane is placed in a climbing condition. As shown in more detail hereinafter, as the plane is placed into a diving condition, the resultant increase in the value of the negative-potential signal coupled to stage 274 will correspondingly reduce the amplitude of the vertical sawtooth output signal of stage 274, and thereby the degree of skewing of the cue symbol paths in the ground texture of the display.

The third section 289c of pitch potentiometer 289 is coupled over terminals 316c to the positive terminal of the 50 volt potential source and over terminal 317c to the negative terminal of the 50 volt potential source. Wiper arm 315c is coupled over conductor 353' to the clipping circuit 137. In the level flight condition of the aircraft, potentiometer arm 315c is in the illustrated position, whereby substantial zero voltage signal is coupled to the clipping circuit. With variations in the pitch attitude of the aircraft, wiper arm 315c is adjusted in the directions indicated in FIGURE 15 to correspondingly adjust the value of the potential signal coupled to the clipping circuit, and thereby the horizontal line in the raster trace at which generation of the first ground cue symbol is initiated. Ostensibly, as the plane is placed into a condition of increasing climb attitude, wiper arm 315c will be adjusted to provide a signal of an increasingly positive value to the clipping circuit, and the ground portion of the pattern on the display screen will become smaller and smaller. As the true vertical climb position is reached, the wiper arm 315c will be on terminal 316c and only the sky portion will be shown on the display. As a true vertical dive condition is reached wiper arm 315c will be on terminal 317c and only the ground pattern will be shown on the display.

The fourth section 289d of pitch potentiometer 289 is coupled over terminals 316d and resistance 317e to the positive terminal of the potential source; and over terminal 317d, resistance 317f to the negative terminal of the potential source. In normal level flight, wiper arm 315d associated with the fourth section of pitch potentiometer 289 is in the illustrated position, and a signal of substantially zero value is coupled over conductor 317' to the horizon line generator circuit 138 to control the horizon line generator to provide a horizon line to appear at the approximate midpoint of the raster trace. With variations of the pitch attitude of the aircraft, the wiper arm 315d is adjusted in the alternative directions indicated in FIGURE 15 to correspondingly adjust the value of the potential signal which is coupled to the horizon line generator circuit 138 and thereby the position of the horizon line on the display. Ostensibly with maneuvering of the aircraft to a dive position, wiper arm 315d is adjusted in the direction of terminal 317d to couple a signal of increasing negative value over conductor 317' to the horizon generator circuit to adjust the point of occurrence of the horizon line at a position closer to the upper margin of the display as more fully described hereinafter.

It is apparent from the foregoing description that signals indicative of the change of the pitch attitude of the aircraft are coupled by the pitch sensor equipment 273, 272, and potentiometer 289 to the system to effect a corresponding adjustment of (a) the relative speed of movement of the ground symbol cues; (b) the skew of the paths of ground symbol cues; (c) the initial point of occurrence of the first ground symbol cue of each path; and (d) the relative position of the horizon line.

The specific manner in which the changes in pitch attitude effect these different adjustments is set forth in more detail in the further discussion of the several stages of the system.

Briefly, as the vertical sync output pulses which trigger each frame scan are also coupled over capacitor 286 to the vertical sawtooth generator stage 274, and specifically to the control grid 279 of the first section of tube 277 at the rate of 60 pulses per second, the positive-going portion of each pulse renders the first section of the tube 277 conductive and capacitor 291 is charged positively over the circuit extending from 300 volt positive source over the conducting first section of tube 277 and capacitor 291 to ground. As the trailing edge of the incoming vertical sync pulse is coupled to the vertical sawtooth generator 274, control grid 279 is driven negative relative to cathode 280 and capacitor 291 discharges over the circuit including the second section of tube 277, resistor 288 to ground, the rate of discharge being determined by the value of the resistance connected in such circuit and the pitch control voltage on grid 284.

In that the position of the adjustable arm 315b resistance 289b is determined by the pitch attitude of the aircraft, the rate of discharge of capacitor 291, and therefore the amplitude of the vertical sawtooth wave which is coupled to the input circuit of the phase inverter stage 275 is related to the pitch of the aircraft. In the present arrangement as the craft is nosed downwardly in the direction of the earth, the wiper arm 315b is adjusted in the direction of terminal 317b and a more negative voltage is coupled to control grid 284 of the vertical sawtooth generator stage 274, whereby the amplitude of the vertical sawtooth wave is successively decreased. As the plane reaches a vertical dive condition, the signal output of the stage is of zero amplitude. In a similar manner, the amplitude of the vertical sawtooth wave is correspondingly increased as arm 315b is moved in the direction of terminal 316b as the pitch of the aircraft increases in a climbing maneuver. As the aircraft is maneuvered in a loop pattern, a switch is operative at the 90° mark to reverse the vertical sweep on the monitor, and as the plane continues over at 270° the switch operates to return the sweep to an upright position.

The phase inverter stage 275 comprises a triode tube which may, in the present embodiment, comprise one section of a tube commercially availabe as a 12AU7, including anode 293, control grid 294, cathode 295. Anode 293 is connected over load resistor 296 to 300 volt B+ supply; control grid 294 is connected to the output circuit of the vertical sawtooth generator stage 274, and cathode 295 is connected over cathode resistor 297 to ground. A pair of output circuits for the phase inverter stage include capacitor 298 connected to the plate 293 and capacitor 299 connected to the cathode 295 for the purpose of coupling the signal outputs of opposite polarity to the azimuth positioning stage 276. The shape of the signal which appears in the plate and cathode circuits of the tube 292 is similar to that of the input signal, the signal in the plate circuit however being of an opposite polarity as indicated. The output signals are coupled to the two sections of a split section azimuth potentiometer 300 which includes first resistance section having terminals 301, 302, 303, and a second resistance section having terminals 304, 305, 306. Terminals 305 and 302 are coupled to ground, and terminal 301 is coupled over resistance 310, 311 to ground and cross-connected with terminal 304 of the second resistance section. Terminal 303 of the first resistance section is coupled over resistances 312 and 313 to ground and is cross-connected to terminal 306 of the second resistance section. Adjustable arms 307, 308, and 309 are mechanically intercoupled for simultaneous adjustment over 360 degrees of the azimuth positioning potentiometer 300.

Resistances 311 and 313 are mechanically controlled in their adjustment by the altitude sensor equipment 113 which includes a signal derivation unit 270 which continually couples a signal which is indicative of the altitude of the plane to a conventional servo loop 271 to control the same in the positioning of the adjustable resistors 311 and 313 to in turn adjust the value of the D.C. signals input to the terminals 301 and 303. In the illustrated embodiment, the resistors 311, 312 were of equal value and connected to potentials of opposite polarity.

The azimuth sensor equipment 114 includes heading sensor device 269 which couples a signal derived from the directional gyro which is indicative of the heading of the aircraft over a conventional servo loop 268 to control same in the adjustment of the position of the adjustable resistance arms 307, 308, 309. The signal output derived by adjustable arms 307, 308, 309 is coupled to the input circuits of pulse delay generators 101–103 of the group generators 1, 2 and 3. Ostensibly, the value of the signals thus derived from the potentiometer 300 and coupled to the group generators 1, 2, 3 are determined by the amplitude of the pitch representative signals coupled to the potentiometer 300 by the phase inverter 275; the value and polarity of the altitude differential signal coupled to the potentiometer 300 by the resistors 311, 313; and the position of the arms 307–309 on the potentiometer 300 as determined by the azimuth heading equipment.

Thus, in the illustrated position of the azimuth adjusting means, arm 307 couples a direct current voltage to the pulse delay generator 101 of group generator 1 which is of a value determined by the settings of the resistor 311 (which is continually related to the altitude of the aircraft), as modulated by the vertical sawtooth output waves of the phase inverter stage 275 (continually related to the pitch of the aircraft). As the horizontal sync output pulses of timing generator are applied to the group generator 1 with the initiation of successive line traces, the duration of the square wave output pulse of pulse delay generator 101 is determined by the value of the combined altitude, pitch and azimuth signal coupled over conductor 220a to control grid 207 (FIGURE 14) thereof. The time of occurrence of the trailing edge of the square pulse relative to the horizontal line trace on the display screen is manifestly adjusted to different values with the changes in the value of the combined signal coupled to the pulse delay generator 101.

Figure 1:
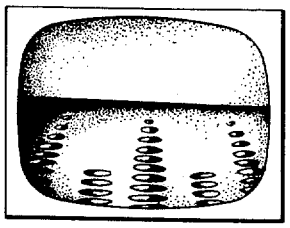
FIGURE 1 is a showing of the presentation of the novel display device with the aircraft at a relatively high altitude.
Figure 2:
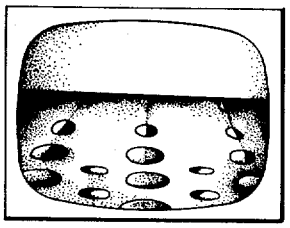
FIGURE 2 is a showing of the presentation of the display device with the aircraft at a relatively low altitude.
Figure 6:
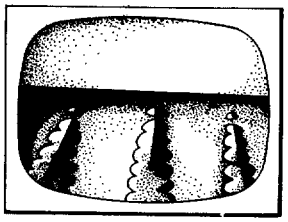

Assuming that the potentiometer is in the illustrated position, the middle arm 308 is connected over terminal 302 to ground, and the output pulse of the pulse delay generator 102 will effect a triangular pulse output by group generator 2, the apex of which coincides with the middle or center of each horizontal line trace (see the middle row in FIGURES 1, 5, 6, etc., for example). In that arms 307, 309 are equally spaced on opposite sides of arm 308 to derive a signal of equal and opposite polarity, the resultant paths are equally spaced from and will be to the right and left of the center path as shown in FIGURES 1, 5, 6, etc.

As successive lines of the raster are scanned, the value of the sawtooth signals applied to the azimuth positioner potentiometer 300 increases (a successive sawtooth waveform being applied with the initiation of each vertical frame scan). As a result a signal of successively increasing positive value during a frame scan is applied over resistance section 301 and arm 307 to the pulse delay generator 101, and the time of generation of an output pulse thereby is advanced relative to each successive line scan. The trailing edge of the output pulse which triggers the triangle generator 105 likewise advances in time in each succesisve line trace of a scan, and the resultant left hand path on the display is therefore skewed to the left as shown in FIGURES 1, 5, 6, etc.

Since the middle arm is connected to ground in the present example, there is no change in the timing of the pulse output of the group generator 1 and the outer path extends down the middle of the display. The right hand path however is skewed to the right by reason of the negative going signal which is coupled over the resistance section 303 and arm 309 to the third pulse generator 103 as each raster scan is effected. That is, as the raster scan proceeds and the negative going signal increases in value, the pulse output of pulse delay generator 103 is increasingly delayed on each successive trace, and the trailing edge of the pulse occurs at a later interval of each successive trace to control the triangle generator 107 to delay the pulse output generated for each successive line trace by a corresponding time interval. As a result the right hand path is skewed to the right as shown in FIGURES 1, 5, 6, etc. It is apparent that a change in the degree of skew may be provided by changing the separation between arms 307–309 on the potentiometer 300.

Adjustment of arms 307, 308, 309 which is effected by the azimuth sensor 101 with change of heading of aircraft will result in a change of the amplitude of the signals coupled to the pulse delay generators 101–103 of the group symbol generators 1, 2, 3, by a related amount (in the illustrated arrangement in which the three arms are connected together on a common drive shaft) and accordingly effect a lateral shift of the paths across the face of the display device. Assuming for exemplary purposes, that the potentiometer is moved in a counterclockwise direction the rows of guide circles will move to the left across the screen. As the arm 307 approaches terminal 301 the left hand path will have moved off the left hand margin of the display screen. As the arm 307 now advances to terminal 306 (which is of an opposite polarity) the rows of guide circles which disappeared at the left hand margin of the display device will now reappear at the right hand margin of the display device and move in the direction of the left hand margin with the other rows of guide circles on the screen. As arm 308 now reaches the terminal 301, the row of guide circles previously in the middle of the display disappear at the left hand margin and reappear at the right hand margin as the arm 308 moves to terminal 306. Thus, for the period of change of the aircraft heading a continuous lateral shifting of the rows of guide circles is effected across the display screen to provide the illusion of a changing heading.

The value of the composite signal which is coupled to the pulse delay circuits 101–103 is also representative of the altitude of the aircraft. That is, as the altitude of the aircraft changes the altitude sensor 113 including signal derivation device 270, and servo unit 271 adjust the potentiometers 311, 313 to different positions to correspondingly adjust the value of the D.C. voltage applied to the azimuth position potentiometer 300. Manifestly, potential coupled over the adjustable arms 307–309 to the group symbol generators 1–3 will be altered by a corresponding value and the triangular pulses will be laterally displaced relative to each other.

CLIPPING CIRCUIT

The signal output of the group generators 1, 2, 3 is coupled over a diode, such as illustrated diode 260, in the triangle generator 105, and a common load resistor 261 (FIGURE 15) the composite waveform thus produced being coupled over capacitor 330 to the input side of the mixing circuit 136' (FIGURE 16). The composite wave output of the three group generators is mixed in mixing circuit 136' with the wave form derived from the positive-going vertical sawtooth output of the phase inverter stage 275 (FIGURE 15) as coupled to the mixing circuit 136' over resistor 324, conductor 323', capacitor 323 and resistance 322, 321 of the mixing circuit 136' to the input side of the clipping circuit 137.

The pitch attitude of the aircraft as represented by such signal effects a corresponding adjustment of the location of the first guide circle of each row to be shown in the display. More specifically, the signal coupled to the potentiometer 324 from the phase inverter stage 275 is coupled in a modified form to the output conductor 323', the amplitude of such signal being controlled by the value of the signal coupled to the vertical sawtooth generator stage 274 by the pitch sensor equipment. That is, as noted heretofore, with changes in the pitch attitude of the aircraft, pitch sensor equipment 273, 272 adjusts wiper arm 315b to different positions on the second section 289b of pitch potentiometer 289, to vary the signal input to the vertical sawtooth generator stage 274 and thereby the amplitude of the vertical sawtooth generated thereby. Briefly, as the aircraft is placed in a dive attitude the amplitude of the vertical sawtooth waveform is correspondingly reduced, and a smaller value signal is coupled over conductor 323' and capacitor 323 and resistor 322 to the mixing circuit 136'. A reduced value signal effects a change in the delay in the time of energization of the clipping circuit 137 during the trace, and a corresponding adjustment of the initial point of occurrence of the first ground symbol cue closer to the upper margin of the display, as shown in more detail hereinafter.

Clipping circuit 137 may comprise a pentode tube 325 (which may be of the type commercially available as a 6BN6) including anode 326, suppressor 327, screen 328, control grid 329, cathode 330'. The anode 326 may be coupled over resistor 331 to a 100 volt B+ power supply, suppressor grid 327 may be connected over resistor 335'' to ground; screen grid 328 is coupled over resistor 332 to the 100 volt power supply and over capacitor 353 to ground; control grid 329 is coupled over grid-return resistors 334, 334', 335' to pitch control signal 289c, and to grid resistor 321 in the mixer circuit 136'; and cathode 330' is coupled over cathode resistor 335 to ground. Anode 326 is also coupled over capacitor 336 to the input circuit of the amplifier stage 139. Suppressor grid 327 is also connected over capacitor 331' and resistor 409' to horizon line generator 138.

As noted heretofore, the composite wave output of the group generators 1, 2, 3, and the signal output of pitch signal set 389c are combined in the mixing circuit 136', with incoming vertical sawtooth through resistor 322 and capacitor 323, and the resultant waveform is shown adjacent the input of the clipping circuit 137. As the amplitude of the resultant vertical sawtooth pulse is reduced or the negative voltage is increased (by reason of the plane being in a diving or climbing attitude) the initial symbol of each group (and the horizon line) is traced on the screen at a horizontal position which is closer to one of the margins of the display thereof. Thus if the plane is in level flight with arm 315c half way between 316c and 317c and is placed in a climbing position, the negative bias signal is increased by values related to the angle of climb, and the conductivity of the clipping circuit tube 325 is delayed by a related time factor, whereby the initial guide circle of each row (and horizon line) appear at a position which is proportionately displaced below the apparent center of the screen, and in a direction toward the lower margin of the screen. Similarly if the plane is placed in a dive condition, the amplitude of the vertical sawtooth signal is decreased by a corresponding value, and since the leading edge of the sawtooth signal drives the clipper tube 325 nonconductive, the sawtooth signal of reduced amplitude will return to the conductive level of the clipper tube more quickly than a waveform of greater amplitude, and the initial symbols of each group which appear adjacent and below the horizon line are proportionately displaced in the direction of the upper margin of the display. Upside down flight is presented on the display device by reversing the phase of the vertical deflection circuitry by way of switch 318 and conductor 319, the switch being operated by the pitch sensing equipment 273, 272 responsive to operation of the aircraft in a maneuver beyond the true vertical dive and climb positions.

It will be apparent from the foregoing description that the composite wave output of the group generators which is coupled to the mixing circuit 136' during each horizontal trace is of a value to determine (a) the number of groups or rows of guide symbols (basically determined by the number of generators); (b) the disposition of the groups or rows relative to each other and the position thereon on the display device (basically determined by the azimuth and pitch of the aircraft); (c) the spacing of the symbols (basically determined by the altitude of the aircraft); and the signal output of the pitch potentiometer 289c basically determines the vertical position at which the first set of guide symbols are displayed.

Ostensibly, if it is desired to blank, for example, one group of symbols in each of the three groups of symbols, it is only necessary to couple a negative blanking signal to the suppressor grid 327 of the clipping circuit tube 325 for a predetermined time period in each horizontal trace which is related to the time period of generation of the symbol during such trace.

The output of the clipping circuit 137 is coupled to amplifier stage 139 which may be conventional in nature, and which may include one section of a triode tube 338 commercially available as a 12AU7, such tube including an anode 339, a control grid 340, and a cathode 341. As the output signals of the clipping circuit 137 are coupled over the capacitor 336 to the control grid 340, the signals are amplified in the conventional manner and appear in the plate circuit thereof for coupling over capacitor 344 to mixing terminal 345.

SPEED MODULATION

As noted above, if the output signals which appear at mixing terminal 345 were coupled to the display device 146 directly the resultant display would be a series of three major paths as shown in FIGURE 5. At this time therefore the signal output of the amplifier circuit 139 is mixed with a sine wave signal from speed oscillator 144 making the paths into rows of shaped symbols having a rate of motion related in their movement across the display device to the speed of the aircraft. For this purpose, speed sensor equipment 142, which may comprise equipment for deriving a signal related to the speed of the aircraft from the air speed indicator, ground speed indicator or other similar speed indicating devices, as shown at 350 (FIGURE 17), is coupled over servo system 351 to adjust the frequency output of a variable sine wave oscillator 144, a variation in the speed of the aircraft effecting a variation in the frequency of the operation of the oscillator, and thereby the frequency sine wave of the signal output thereof. At slower speeds, the oscillator is adjusted to operate at a slower frequency, and for an increase in speed the oscillator is adjusted to operate at a relatively increased frequency. The output of the sine wave oscillator is coupled over terminal 345 to modulate the output of the amplifier circuit 139 and thereby provide a waveform output of the type shown by the illustration adjacent point 345.

In one particular embodiment including speed modulation circuitry, oscillator 144 (FIGURE 17) comprises a conventional phase-shift oscillator which may include a pentode tube 352 of the type which is commercially available as a 6U8 including an anode 353, a compressor grid 354, screen grid 355, a control grid 356, and a cathode 357.

The anode 353 is connected over load resistor 358 to the 300 volt B+ supply source, and over capacitor 359 to feedback circuit comprising capacitor 360, resistor 362; capacitor 361, resistor 363; and resistor 364 to the control grid 356; suppressor grid 354 is coupled directly to the cathode 357; screen grid 355 is coupled over resistor 368 to the 300 volt B+ supply source and over capacitor 367 and [parallelly-connected] *parallel-connected* resistor 365' to ground. Cathode 357 is coupled over resistor 366 and capacitor 365 to ground. The output signals of the speed sensor equipment 142 are coupled over ground speed computer 350, servo system 351 and resistor 380 to resistor 379 to vary the value of resistance in the phase shift circuit, and thereby the frequency of operation of the oscillator unit 144, the change in frequency of the oscillator, in turn, changing the rate of movement of the guide symbols across the display as shown hereinafter. As noted heretofore with the changes in the pitch of the aircraft the signals indicative to the degree of change are derived by pitch sensor 273 and coupled to servo 272 which effects a corresponding adjustment of the wiper arms 315a–315b on the pitch potentiometer 289. In the event that the aircraft is maneuvered in a downward direction from level flight the arms are adjusted counterclockwise (FIGURE 15), and arm 315a is adjusted to reduce the value of resistance in the speed oscillator control circuit, whereby the oscillator frequency is correspondingly varied to reduce the rate of movement of the ground cue symbols across the display (*i.e., from the horizon to the lower marginal edge of the display*). In a similar manner, with maneuvering to the aircraft to a climbing position from level flight, the resistance in the speed oscillator control circuit is reduced, and the rate of movement of the ground cue symbols across the display is correspondingly reduced. In each instance, the degree of adjustment of the arm 315 is related to the degree of change of pitch. Thus in a true vertical dive, arm 315a will be adjusted to terminal 317a whereby zero resistance is coupled in the control circuit for speed oscillator 144, and the ground cue symbols appear to be stationary on the display. Ostensibly, there will be no ground symbols on the display. If sky symbols are used the sky symbols will be rendered stationary in a like manner with maneuvering of the craft to a true vertical climb.

Oscillator 144 operates in the manner of a conventional phase shift oscillator, such as described, for example, in the handbook entitled Electronics for Engineers, Markus & Zeluff, McGraw-Hill, 1945, 1st edition, page 193, the frequency of operation being directly related to the speed representative signals which are coupled to the oscillator input circuit by the speed sensor equipment.

The output of the speed oscillator, which comprises a conventional sine wave output at a frequency determined by the speed of the aircraft and a wave shape shown adjacent the oscillator circuit, is coupled over capacitor 369 to a cathode follower stage 370, which may comprise the second section of a 6U8 tube, and which may include an anode 371, a control grid 372 and cathode 373. Anode 371 is connected through resistor 373' to a 300 volt power supply source; control grid 372 is coupled to the output of the speed oscillator circuit and over grid resistor 372' to ground; and 371' to 300 volt power supply. Cathode 373 is connected over resistors 375, 374 to ground. Tube 370 thus operates in the manner of a cathode follower to match the output of the speed oscillator tube 352 to the low impedance of resistor 346 to mixing point 345.

Diode 390 is connected between the output circuit of the speed oscillator 144 and ground to prevent the sine wave signal output of the variable oscillator 144 from going positive and thereby possibly introducing distortion into the display presented on the display device.

In the event that the output of the amplifier circuit 139 is coupled directly to the display device, the display on the screen would comprise three paths substantially of the shape shown in FIGURE 5, and of a substantially lighter texture than the shaded showing of the drawing. As the sine wave output of the oscillator 144 is mixed with the amplifier circuit signal output, a resultant signal of the shape shown adjacent the input side of the diode 345' is provided. As the mixed signal is coupled to the display device, the paths of FIGURE 5 are modified to the semicircular symbols of the shape shown in FIGURE 6. A gradual transformation from the semicircular symbols of FIGURE 6 to the circular symbols of FIGURE 1 is in turn effected by increasing the amplitude of the sine wave pulse output of the oscillator by a corresponding value.

The oscillator, as noted above, is adjusted to operate at a frequency related to speed sensor equipment 142 and will be operative in an embodiment, such as shown herein, at approximately 700 cycles per second, the frequency adjustments to either side of such frequency being of a comparatively small value to effect the desired change in the rate of movement of the symbols across the display device.

The use of a variable oscillator 144 which has a square wave output (in lieu of the sine wave output of the present illustration) will provide resultant signals on the display device which are of a square shape, and in the event of the use of a variable oscillator 144 having a triangular shaped output pulse, the resultant symbols on the display will be of a diamond shape, etc.

In the event that it is desired to effect nonlinear movement of the dots in successive increments of the progressive movement thereof from the horizon line, a vertical sawtooth wave which is synchronized with the vertical sync output of the timing pulse generator 100 may be coupled over a conventional cathode follower tube to the phase shift network of the speed oscillator 144, such arrangement constituting one modification which may prove desirable in certain applications of the display device in which a more realistic movement of the guide circles is needed.

The signal output of the amplifier circuit (which is at 15 kc.) is mixed with the sine wave output of the variable oscillator 144 to provide a waveform of the type shown adjacent terminal 345 at the input side of the diode 345', the diode 345' being operative with resistor 391 to pass only the portions of the modulated signal which are positive with respect to ground, whereby the signal input to capacitor 392 assumes the wave shape shown adjacent thereto. The symbols are now shaded in texture as shown in FIGURES 1–6, etc., by passing the signal through a differentiating circuit containing capacitor 392 and resistor 393.

The signal waveform output at this stage of the circuitry is thus representative of the ground texture of the display including the number of rows of grid symbols, the number of symbols, the rate of motion of the symbols across the display, the disposition of the rows of symbols on the display and relative to each other, and the point of convergence of the rows. The zener action of diode 345' permits passage of the negative portion of the signal at terminal 345 to the video amplifier and as a result minor paths resembling holes are created between major paths which appear as mounds (see FIGURES 1–4).

HORIZON LINE GENERATION

The horizon or reference line of the display at which the guide symbols tend to converge is generated by a horizon line generator 138 (FIGURE 16) which basically comprises a univibrator circuit, which is connected for adjustment by the pitch sensor device 109 responsive to changes in the aircraft pitch attitude to provide correspondingly different signal outputs, and thereby the displacement of the horizon line to different positions on the display. Ostensibly as the pitch attitude of the aircraft changes from level flight to a dive attitude, the horizon line must be adjusted in the direction of the upper margin of the display, and as the aircraft changes from level flight to a climbing attitude, the horizon line must be adjusted toward the lower margin.

Briefly, the horizon line generator 138 includes a two-section triode tube 400 which may be of the type commercially available as a 12AU7, including anodes 401, 404, control grids 402, 405, and cathodes 403, 406. Anode 401 of the first section is coupled over resistor 407 to a 300 volt B+ supply source; control grid 402 is coupled over diode 408 to the vertical sync output of the television timing pulse generator 100 (FIGURE 14); over grid resistor 409 to ground; resistor 404' and capacitor 405' to the vertical sawtooth generator stage 274; and over resistor 403' to arm 289d of pitch potentiometer 289 and the potential output thereof. Cathode 403 is connected over resistor 410 to ground.

Anode 404 of the second section is coupled over load resistor 411 to 300 volt B+ supply source; control grid 405 is coupled over capacitor 412 to the anode 401 of the first section, and also over capacitor 412 and resistor 413 to ground. Cathodes 403, 406 are coupled over resistance 410 to ground.

The position of the horizon line is determined by the value of the input signals coupled to control grid 402 of the first section of tube 400, the control signals including (a) a vertical sync [impulse] *pulse* output of the timing generator 100 (FIGURE 14) which is coupled over conductor 408' and diode 408 to mixing point 402'; (b) the output signal of the phase inverter stage 275 (FIGURE 15) which is coupled thereto over conductor 314, capacitor 405', resistance 404' to mixing point 402'; and (c) the pitch control signal which is coupled thereto by the pitch signal equipment 273, 272 in its adjustment of wiper arm 315d of the fourth section 289 of pitch potentiometer 289 over conductor 317' and resistor 403' to the mixing terminal 402'. The combined signals are mixed and coupled to the control grid 402 of the first section of tube 400.

With the coupling of a vertical sync impulse to mixing terminal 402' simultaneous with the initiation of each frame scan of the display device 146, the first section of tube 400 is rendered conductive. The potential at the anode 401 of the first section is correspondingly reduced as the tube conductively increases, and the negative-going signal is coupled over capacitor 412' to grid 405 of the second section to bias the second section to cut-off. The potential at the anode 404 of the second section rises to effect the coupling of a positive value signal over capacitor 414 and resistor 416 as shown in the waveform adjacent thereto. As the second section of tube 400 is biassed nonconductive cathode 405 goes negative, and by reason of the intercoupling, resistance 410 drives cathode 403 negative to maintain the first section of tube 400 conductive.

It will be recalled that the phase inverter stage 275 effects the generation of a negative-going vertical sawtooth wave which is transmitted over conductor 314 and capacitor 405' and resistor 404' to mixing terminal 402' at a rate synchronized with the raster scan and the leading edge of the sawtooth wave drives the first section of tube 401 conductive. As the waveform thus coupled to terminal 402' becomes increasingly negative, the first section of tube 400 is biassed to cut-off during the frame scan at a point partially determined by the value of the negative-going sawtooth wave (which is in turn determined by the value of the signal coupled to the vertical sawtooth generator stage 274 by the second section 289b of the pitch potentiometer 289). Ostensibly, as the aircraft is maneuvered in a downward condition a vertical sawtooth of reduced amplitude will be coupled to the horizon line circuit 138, and the first section will be maintained conductive for a substantially shorter period. Simultaneously the signal output of the fourth section 289d of pitch potentiometer 289 becomes increasingly more negative as the dive condition of the plane is increased, and the negative-going signal is coupled over conductor 317 and resistance 403' and mixing terminal 402' to control grid 402 to drive the first section nonconductive at a correspondingly earlier time period in the frame scan. As the first section is rendered nonconductive, the positive-going voltage of the anode circuit thereof is coupled over capacitor 412' to the control grid 405 of the second section of tube 400 to render same conductive and a negative-going signal appears in the anode circuit of the second section to provide the negative-going portion of the pulse shown adjacent the output circuit of the horizon line generator. The tube 400 remains in such condition pending receipt of a subsequent vertical sync impulse from the timing generator 100 indicating initiation of a subsequent frame scan.

The negative-going impulse which appears at the anode 401 of the first section of tube 400 immediately subsequent to receipt of a vertical sync impulse and biasing of the section to increased conductivity, is coupled over resistor 409', capacitor 331', to suppressor 327 of the clipping circuit control tube 325 to bias the same to cut-off during such period that the negative impulse occurs. Since such period is coextensive with the period of generation of the sky pattern of the display, it is apparent that a positive means is provided for effecting cut-off of the clipping circuit 137 during the period of generation of the sky cues whereby the impulses which effect generation of ground symbol cues on the display tube 426 are effectively blocked from the display tube 426 during the period that the sky pattern is being generated.

The square wave output pulse of the horizon line generator 138 is coupled to a differentiating circuit including capacitor 414 and resistors 416, 417. The leading edge of the differentiated signal appears, in accordance with known differentiating principles, as a positive pulse, and the trailing edge appears as a negative-going pulse, the time difference between the pulses being related to the duration of the square wave pulse (which is in turn related to the value of the D.C. voltage received from pitch control 289d as determined by the pitch attitude of the aircraft). As shown in the waveform adjacent the differentiating circuit, the positive half of the signal is clipped by crystal diode 415, as indicated, and the negative half of the output signal is coupled over the voltage network 418 to the video amplifier 145, the amplitude thereof being reduced to the order of the composite output signal of the amplifier circuit 139. The video amplifier 145 may comprise a conventional video amplifier circuit (such as explained in Television Engineering, 2nd edition, by Fink, 1952) and is operative to amplify and couple the signal output of amplifier circuit 139 and the horizontal line generator 138 to the grid video gun of a conventional cathode ray display tube 426.

The clipped portion of the differentiated signal (the straight line portion which precedes the negative-going pulse) is mixed with the signal output of amplifier circuit 139 to provide a sky portion of relatively light intensity which extends downwardly from the upper margin of the display to the horizon line. As the negative-going portion of the pulse is mixed with the output signal of the amplifier stage 139 to the video amplifier 145, the negative-going pulse effects the trace of dark horizon line across the screen. As the pulse then slowly proceeds in a positive direction the texture of the ground pattern traced below the horizon line becomes gradually lighter as the trace approaches the bottom of the raster. Thus by adjusting the voltage into the square wave generator 138 to a different value, the trailing edge of the square wave is generated at different time periods relative to the vertical sync pulse which triggers each raster trace, and a corresponding adjustment of the displacement of the horizon line from the top marginal edge of the display device is effected.

GENERATION OF ROLL CUES

With variation in the roll attitude of the aircraft, roll sensor equipment 148 including vertical gyro sensor unit 423 is operative to derive a signal indicative of the roll attitude of the aircraft from the vertical gyro of the aircraft, and to couple same over a servo link 424 to control corresponding adjustment of the deflection yoke 425 on the neck of the cathode ray tube 426 of the display device 146. As the yoke is adjusted about the neck of the display device 426, the raster trace is adjusted through a corresponding angular displacement.

Thus in the bank to the right, the deflection yoke is adjusted about the neck of the cathode ray tube 426 to effect a corresponding adjustment of the raster on the screen, and tilting of the display presentation including the horizon line to the left, as shown in FIGURE 3. One set of equipment for effecting such adjustment has been described in more detail in the aforeidentified copending application to Aid and Balding.

With a loop of the aircraft, the vertical sweep polarity is changed by switch 318 which extends ground over connector 319 to thereby turn the picture upside down.

Each raster trace is controlled by the horizontal *and vertical* [adjustment] sync output of the television pulse generator 100, the pulses being coupled from the timing pulse generator 100 for the system over conductor 420 to the deflection circuitry 421 for the deflection yoke 425. Energization of the tube 426 in a raster trace is effected in accordance with well known television practices.

In that the timing pulse generator 100 triggers the display tube circuitry 421 in initiating each raster trace and simultaneously with the vertical sawtooth generator 274 and the group generators 1, 2, 3 which are operative in the generation of cues which change with the pitch, azimuth and altitude of the aircraft, and the horizon line generator 138 which determines the position of the horizon line, it is apparent that each pulse generator unit in the system is synchronized with each other in its operation, and each visual cue in the display is synchronized with each other visual cue therein.

FLIGHT PATH GENERATOR 160

In a preferred embodiment of the device, a flight path is superimposed on the basic visual cues described above, for the purpose of guiding the pilot to a desired destination. In one embodiment the flight path comprised a ribbon-like road having a center dividing line and a series of crosslines spaced at successive increments along the path (FIGURES 7–12). As shown hereinafter, the flight path is adjustable to different desired shapes, and to different desired positions on the display.

The flight path is generated and superposed upon the basic display or background cues comprised of the sky horizon, and ground texture by a flight path generator 160 which, as shown in FIGURE 13, may basically comprise a horizontal sawtooth generator 161, a delay circuit 162 including path control 167 which couples the signals to the delay circuit for determining the skew of the path, the relative position of the path on the display, and the curvature of the path; a triangle generator 163, a clipping circuit 164, an amplifier circuit 165, a speed oscillator 169 and a program speed unit 170.

Figure 18:
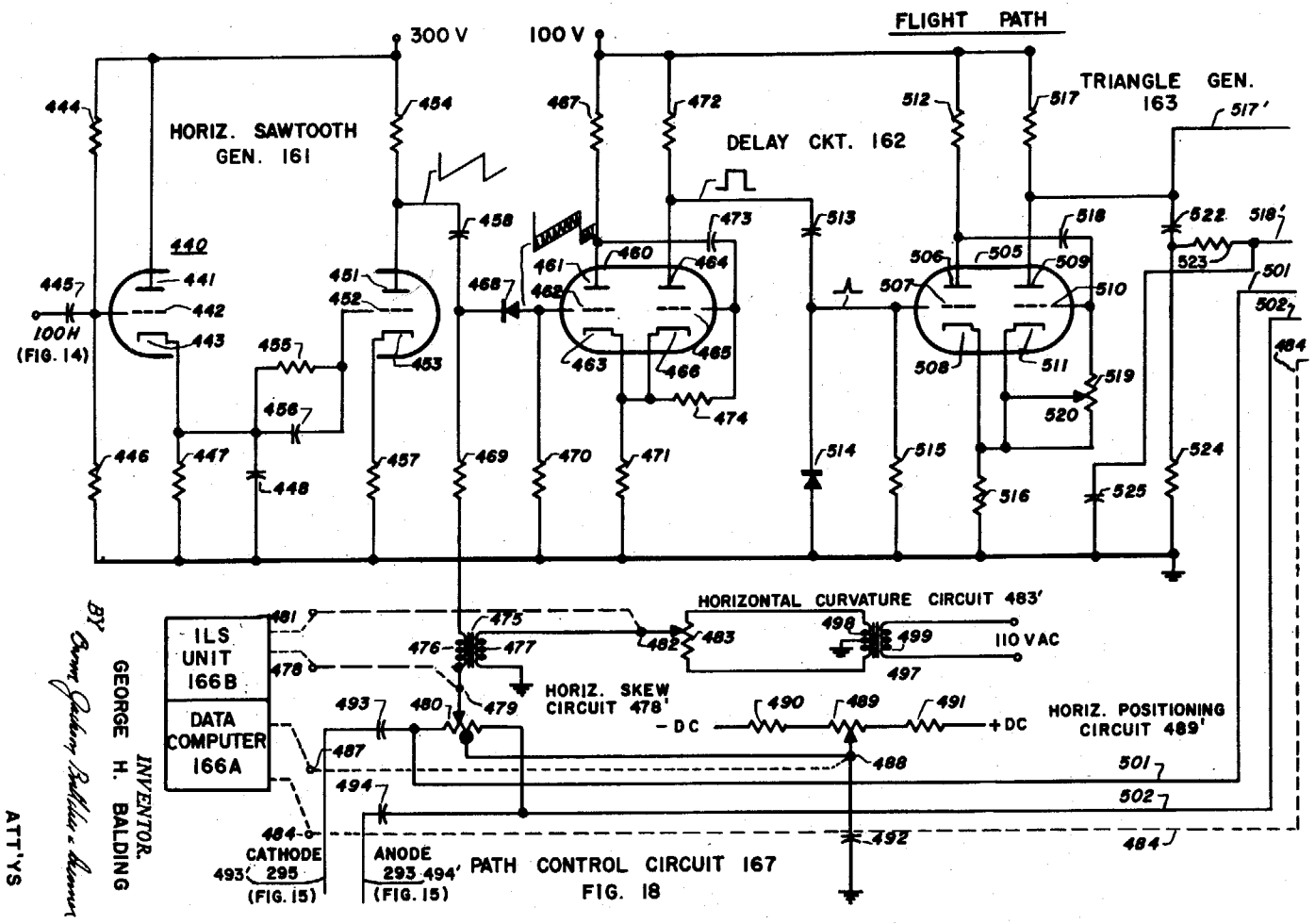
Figure 19:
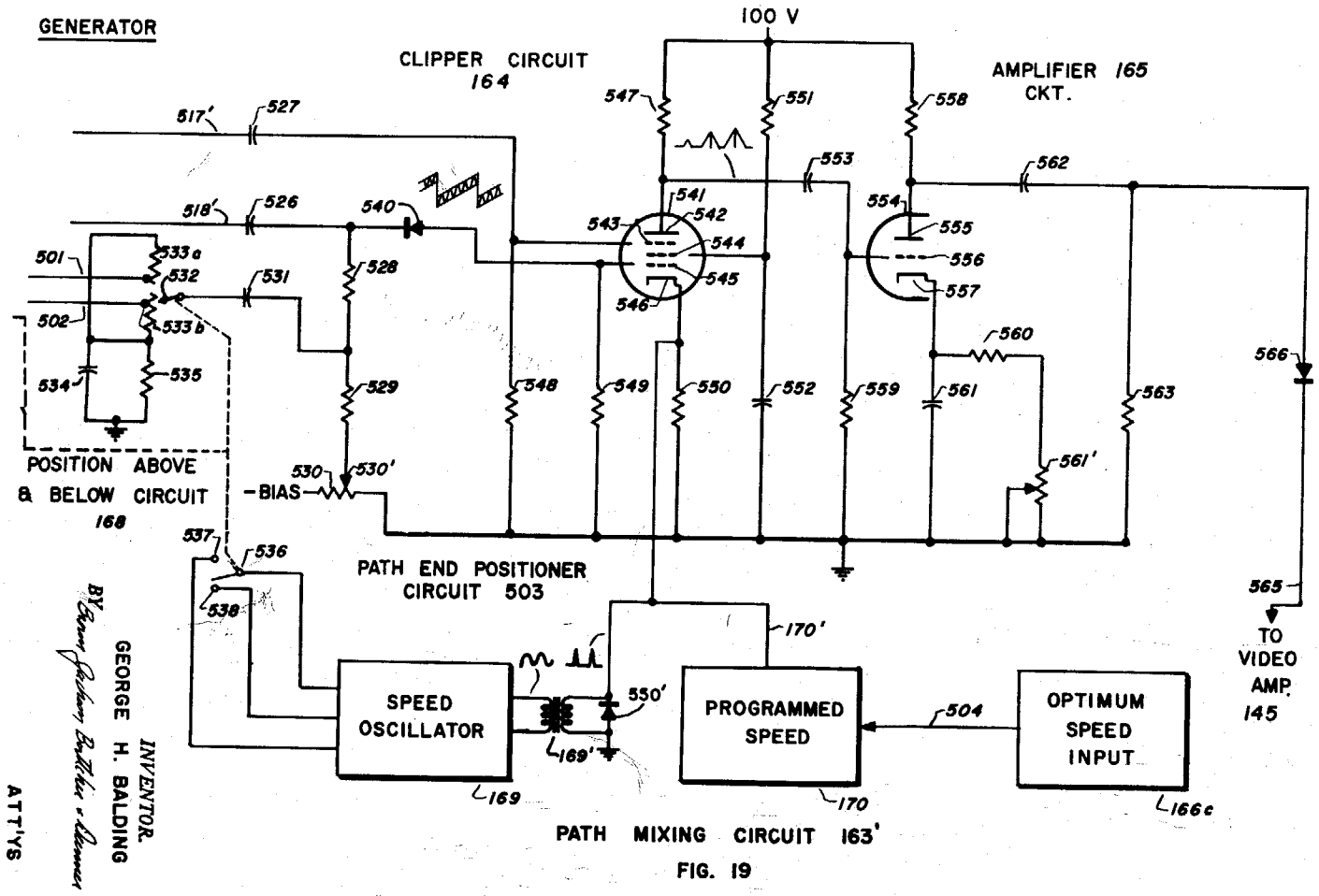

More specifically, with reference to FIGURES 18 and 19, horizontal sawtooth generator 161 may comprise a twin section triode tube 440 including anodes 441, 451, control grids 442, 452, and cathodes 443, 453. Anode 441 of the first section is coupled to B+ 300 volt supply source; control grid 442 is coupled over capacitor 445 and conductor 200 to the horizontal sync output circuit of the timing pulse generator 100 (over conductor 200), and also over voltage divider network 444, 446 which is connected between B+ and ground; and cathode 443 is connected over cathode resistor 447 to ground and to the control grid of the second section of the tube 440, whereby the first section of tube 440 is operated in the manner of a cathode follower.

As each horizontal sync incoming pulse is coupled over cathode 443, capacitor 448 connected in the cathode circuit thereof is charged, and during the period of nonconductivity following the coupling of the horizontal sync impulse to such section, the capacitor 448 discharges over the grid-cathode circuit of the first section of tube 440 and resistor 447 to ground, whereby a negative-going sawtooth wave is coupled to the input circuit to the second section of tube 440.

Anode 451 of the second section is coupled over load resistor 454 to B+ 300 volt supply source; control grid 452 is coupled over resistor 455, capacitor 456 to the cathode circuit of the first section of tube 440; and cathode 453 is coupled over resistor 457 to ground. Thus as each negative-going output impulse of the first section of tube 440 is coupled to the input circuit of the second section of tube 440 as each line trace of the raster on the monitor 146 is initiated, a positive-going waveform appears in the anode circuit of the second section of tube 440 (as shown) and is coupled over capacitor 458 to delay circuit 162.

Delay circuit 162 may comprise a twin section triode vacuum tube 460, such as the type commercially available as a 6111, including anodes 461, 464, control grids 462, 465, and cathodes 463, 466. Anode 461 is connected over load resistor 467 to a 100 volt B+ supply source and over capacitor 473 to the control grid 465 of the second section; control grid 462 is connected over diode 468 to the anode load circuit of the horizontal sawtooth generator 161 and over resistor 469 to the signal output of the path control circuit 167; and also over grid resistor 470 to ground; and cathode 463 is connected over resistor 471 to ground.

The anode 464 of the second section of tube 460 is connected over plate load resistor 472 to the 100 volt B+ supply source; control grid 465 is coupled over capacitor 473 to the anode 461 of the first section, and over resistor 474 to the cathode 466, which is in turn connected over resistor 471 to ground, whereby the tube 460 is connected in the manner of a well-known univibrator unit.

The path control circuit 167 is connected to supply a composite circuit to the delay signal 162 which effects the adjustment of the position of the flight path on the final display, the degree of skew of the flight path relative to the vertical dimension of the display, and shape of the flight path. The composite signal output of the path control circuit 167 is basically controlled by a set of mechanically adjustable shafts 478, 481, and 487 which, it will be appreciated, may be adjustably controlled to different positions by suitable means, such as an ILS unit 166b; a data computer 166a; a simulator unit, such as flight, submarine, helicopter, tank and other known types of simulator units; or if desired, by manual adjustment of the shafts.

The shaft members 478, 487, 481, in turn, determine the individual signal output of a horizontal skew circuit 478', a horizontal positioning circuit 489', a horizontal curvature circuit 483', the output signals of each of these circuits being coupled to the basic control circuit which extends between the delay circuit 162 and the path control circuit 167. The basic circuit extends from the input circuit for control grid 462 of the univibrator tube 460 over diode 468, resistor 469, the secondary winding 476 of transformer 475, resistor arm 479, resistor 480 and capacitor 492 to ground.

The signal output of the horizontal skew circuit 478' is controlled by adjustment of shaft 478 and adjustable arm 479 on resistor 480. Resistor 480 is connected over capacitors 493, 494, respectively, to the two output circuits of the phase inverter stage 275. In the illustrated position, the resistor arm is in a null position, and no skew signal is coupled to the main circuit. With adjustment of the arm 479 from the mid-position on the resistor 480 to the left, a negative-going sawtooth signal is coupled to the arm 479 to the delay circuit 162 to effect skewing of the *near end of the* flight path to the right, the degree of skew being determined by the amplitude of the skew signal, which is in turn determined by the extent of movement of arm 479 from the mid-position. In a similar manner adjustment of the shaft to move arm 479 from the mid-position to the right effects coupling of a positive-going sawtooth signal to the main path to effect skewing of the *near end of the* path in the opposite direction by an amount which is related to the extent of movement of the arm 479 to the right, and the value of the D.C. bias which is thus coupled over the main control path to the delay circuit 162 (FIGURE 8).

In the illustrated arrangement with adjustment of control arm 487 to the illustrated position, a balanced condition obtains in the voltage divider network 489, 490, and 491, and the flight path is positioned on the display *approximately in its normal position* as shown in FIGURE 7. Adjustment of control knob 487 (manually or by associated equipment as described heretofore) to the left effects application of a more negative signal to the control path extending to the delay circuit 162, and the *entire* flight path is adjusted to the right of the control row of guide symbols on the display unit by a distance related to the value of the signal. Adjustment of the control knob 487 to the right of its illustrated position effects coupling of a more positive signal over the control path to the delay circuit 162, and adjustment of the *entire* path to the left of the center position.

The shape of the flight path is controlled by horizontal curvature circuit 483' which basically comprises a transformer 497 having a primary winding 499 coupled to a conventional 110 volt A.C. source, and a secondary winding 498 which is center tapped to provide 6.3 volts across a resistor 483. Adjustable shaft 481 adjusts arm 482 to different positions on resistor 483, the arm 480 being connected in series with the primary winding 477 of transformer 475 to ground. The horizontal curvature circuit 483' thus effects the application of a sine wave output signal across the secondary winding 476, the amplitude and phase of which is adjusted to different values by the positioning of control shaft 481, and the consequent adjustment of adjustable arm 482 on resistor 483, and as shown hereinafter in more detail adjusts the path to a curved shape as shown in FIGURE 10, the different positions of the arm 482 effecting curving of the path at correspondingly different amounts along its length.

Thus, the D.C. bias signal generated by the horizontal positioning circuit 489', the sawtooth wave (if any) provided by the horizontal skew circuit 479, and the sine wave output of the horizontal curvature circuit 483' are coupled over the main control path of the path control stage 167 and resistor 469 for mixing with the output signal of the horizontal sawtooth generator 161 and coupling over diode 468 to the control grid 462 of the first section of the tube 460 in the univibrator tube unit of delay circuit 162.

As the signal output of path control 167 is mixed with the horizontal sawtooth waveform output of the sawtooth generator 161, the nature of the waveform being shown adjacent diode 468, the univibrator device is triggered to a condition of increased current conductivity. The first section of the univibrator tube 460 conducts, and the negative-going waveform which is generated in the circuit of anode 461 is coupled over capacitor 473 to the control grid 465 of the second section to bias same to cut-off whereby the leading edge of a square wave pulse appears in the anode circuit thereof for coupling to the triangle generator 163. It will be apparent that variation in the value and waveform of the input signals coupled by the path control unit 167 to the delay circuit 162 will result in a corresponding variation in the time of conduction of the first section of tube 460, and the time of generation of the leading edge of the square wave impulse relative to the incoming horizontal sync pulse.

As the trailing edge of the composite signal output of the horizontal sawtooth generator 161 and delay circuit 162 is coupled over the diode 468 to the control grid 462 the first section of the tube 460 is rendered non-conductive, and the rising potential in the anode circuit thereof is coupled to the control grid 465 of the second section of tube 460 to render same more conductive. With increased conductivity of the second section, the potential of the anode circuit is reduced, and the trailing edge of the square wave pulse is coupled to the input circuit of the triangle generator 163. Thus the time of generation of the square wave pulse relative to each horizontal sync pulse is determined by the signal output of the path control circuit 167.

The triangle generator 163 may include a twin triode tube 505 of the type which is commercially available as a 6111, anodes 506, 509, control grids 507, 510, and cathodes 508, 511 and circuitry for connecting the device as a conventional univibrator. More specifically, anode 506 is connected over load resistor 512 to 100 volt B+ supply; control grid 507 is connected over capacitor 513 to the output side of delay circuit 162, and over negative clipping circuit comprising diode 514 and grid resistor 515 to ground; and cathode 508 is connected over cathode resistor 516 to ground.

Anode 509 of the second section of tube 505 is connected over load resistor 517 to the 100 volt B+ power supply and capacitor 527 (FIGURE 19) to the path clipper circuit 164 and over capacitor 522 to an associated integrating circuit including resistor 523 and capacitor 525; the control grid 510 is connected over capacitor 518 to the anode 506 of the first section, and also over resistor 519 including adjustable arm 520 to the cathode 511 which is in turn connected over resistor 516 to ground.

With the coupling of each successive square wave impulse at the horizontal sync rate to the input circuit of the triangle generator 163, and more specifically over capacitor 513 to the control grid 507 of the first section of tube 505, the leading edge is coupled to the control grid 507 and the trailing edge is clipped by the rectifier 514 to thus provide a waveform shown in the illustration adjacent the control grid 507 of the first section of tube 505 for each square wave impulse output from the delay circuit 162.

The first section of tube 505 is rendered more conductive as the impulse is coupled thereto, and the decreasing potential in the anode circuit is coupled over capacitor 518 to control grid 510 of the second section to bias the second section to cut-off and thereby generate the leading edge of a square wave output pulse, the duration of which is determined by the value of the resistor 519 in the control grid of the second section of tube 505. That is, as the change of potential in the anode circuit of the first section is terminated subsequent to receipt of the incoming pulse, capacitor 518 which charged during such period, now discharges over resistor 519, and 516 to ground. The [negaitve] *negative* potential which is coupled to the cathode 508 of the second section maintains the cathode 508 negative relative to control grid 507 and the first section is held conductive until the capacitor 518 is dicharged to a lever sufficient to permit cathode 508 to become positive relative to grid 507. As the first section is now cut off, the rising potential on the anode circuit of the first section is coupled to the control grid 510 of the second section to bias same to increased conductivity, and a reduced potential occurs in the anode output circuit of the second section, which constitutes the trailing edge of the square wave impulse being generated. Adjustment of the arm 520 on the adjustable resistor 519 ostensibly changes the discharge time of capacitor 518, and thereby the width of the square wave pulse output of the second section of tube 505, and as will be more apparent hereinafter, the width of the flight path as it appears on the display screen.

The square wave output of the second section of tube 505 is coupled to the integrating circuit comprised of resistor 523 and capacitor 525 to effect the charging thereof, the capacitor 525 discharging over resistor 524 to ground during the period of conductivity of the second section of tube 505. In accordance with well known pulse integration principles, a triangular shaped impulse is coupled over the output side of the integrating circuit comprised of resistor 523 and capacitor 525, conductor 518', and capacitor 526 to the input side of the clipper circuit 164 (FIGURE 19).

In a number of applications the flight path may be used to guide the aircraft along an approach path of predetermined altitudes, and the system will then preferably include a visual cue to the pilot indicative of departures of the aircraft from the path altitude. In the present embodiment, the width of the flight path is relatively narrow as the aircraft is at increasingly larger distances above the desired path. The path provided whereon the aircraft is at the desired altitude is shown in FIGURE 7. In the event that the aircraft descends below the desired altitude, the path is inverted as shown in FIGURE 9. The flight path thus visually informs the pilot at all times of his altitude *in* relation to preferred path. Audio means may also be included in the system to further inform the pilot simultaneously with inversion of the flight path in the screen whenever descent below the preferred approach path occurs.

The sawtooth output of the phase inverter stage 275 (FIGURE 15) is connected over a pair of conductors 493', 494' and over capacitors 493, 494, to conductors 501 and 502, respectively, the conductor 501 being coupled to one end of resistance section 533a and conductor 502 being coupled to the one end of resistance section 533b (FIGURE 19). The opposite ends of resistance sections 533a, 533b are commonly coupled over the RC network comprised of capacitor 534 and resistance 535 to ground. An adjustable arm 532 which is adjusted in its movements by control shaft 484, samples the signals on resistance sections 533a, 533b and couples same over capacitor 531 and voltage divider 528, 529, 530 to a mixing section for clipper circuit 164.

The position above and below circuit 168 is controlled with adjustment of the control shaft 484 to adjust resistor arm 532 to different positions. With adjustment of the arm to the illustrater position, a sawtooth wave of a positive polarity, and an amplitude related to the position of the arm, the resistance section 533b is coupled to the mixing circuit, and with adjustment of the arm to come into contact with the resistance 533a, a sawtooth wave of a negative polarity is coupled to the clipper circuit 164, the amplitude of which is related to the position of the arm on the resistance section. Maximum amplitude is provided with adjustment of the arm 532 to either of [hte] *the* two adjacent terminals of the resistance 533a and 533b. A positive waveform output by the position above and below circuit 168 effects the adjustment of the path to a position superposed on the ground texture and to converge at a point on the horizon, and a negative waveform adjusts the path to an inverted position superposed on the sky texture and converging at a point on the horizon. Changes in amplitude of the output signal of the altitude above and below circuit 168 vary the path width, the path width being reduced as the aircraft departs more and more from the altitude of the path.

The signal output of the above and below circuit 168 is coupled to the mixing stage for the clipper circuit 164 over a path end positioner circuit 503 including a voltage divider circuit comprised of resistances 528, 529 and 530, the resistance 530 having an adjustable arm 530' which is operable to different positions to vary the bias voltage which is applied to the input path of the clipper circuit 164, and to correspondingly adjust the point of convergence (or far end) of the path on the display. This may be controlled by hand or by a suitable computer. The output signals of the triangle generator 163, the path end positioner circuit 503, and the position above and below circuit 168 are coupled over diode 540 to the input circuit for clipper circuit 164.

Clipper circuit 164 may comprise a pentode vacuum tube 541 of the type commercially available as a 6BN6, and may comprise an anode 542, a suppressor grid 543, a screen grid 544, a control grid 545 and a cathode 546. Anode 542 may be connected over load resistor 547 to 100 volt B+ battery supply and over capacitor 553 to the input side of the amplifier stage 165; suppressor grid 543 may be connected over capacitor 527 to the triangle generator circuit 163 over resistor 548 to ground. Screen grid 544 may be connected over resistor 551 to 100 volt power supply source, and capacitor 552 to ground; control grid 545 may be connected to the output side of the triangle generator 163, the position above and below circuit 168 including path end positioner circuit 503, and also over grid resistor 549 to ground, and cathode circuit 546 is connected over cathode resistor 550 to ground, and to the speed oscillator 169 and over conductor 504 to the programmed speed equipment 170 which controls certain characteristics of the flight path as described more fully hereinafter.

In operation, as the value of the combined signal outputs of the position above and below indicator 168 and including path positioner 503 and the triangle generator 163 (the combined waveform being shown adjacent diode 540) exceed the bias value of adjustable resistor 530 for the clipper tube 541, the tube 541 is rendered more conductive and triangularly shaped waves of progressively increasing amplitude (as shown adjacent the output circuit of tube 541) are generated for each successive horizontal line trace and are coupled over capacitor 553 to the input circuit of the amplifier circuit 165. With the increasing width of the triangular pulses for each successive horizontal trace on the display device the *successive lines of the* flight path [is] *are* ostensibly increased

*in length and the path is increased* in width in a related manner.

In a preferred embodiment of the device, a series of cross lines are superposed on the flight path at successively spaced intervals thereon, and are moved along the path from the horizon in the direction of the bottom margin of the display at a rate of movement which is related to the speed of the aircraft. A speed oscillator 169, which is of the structure of the variable speed oscillator 144 described heretofore, is operative to couple to a saturable transformer 169' which changes the incoming sine wave signal to sharp pulses (as shown above transformer 169'), the negative portion being clipped off by diode 550', the positive pulses being operative to blank the tube during a time period of one or more horizontal traces on the display raster to thereby provide a dark cross line on the path. The movement of the lines along the path is effected by adjustment of the oscillator frequency in the manner of the description set forth relative to oscillator 144 (i.e., by adjusting the value of resistance members similar to 380 in the phase shift circuit thereof). In the preferred embodiment the rate of movement of the cross lines in flight is faster than the rate of movement of the ground symbols to display the condition of closer proximity of the aircraft to the flight path than to the ground.

In the event of the inclusion of a position above and below circuit 163 in the system, it is apparent that the cross lines of the path must be reversed simultaneously with inversion of the path. An extension 484' of adjustable shaft 484 which controls path inversion may also operate switch 536 between contacts 537 and 538 to effect such adjustment.

In a further preferred arrangement of the invention, a dividing line, or center line, is provided on the flight path to divide the path into two lanes, and thereby provide two lane traffic for a given approach course. In such arrangement the trailing edge of the output of the anode circuit of the second section of tube 505 in the triangle generator is coupled over conductor 517' and capacitor 527 to the suppressor grid 543 of the clipper tube 541. In that the trailing edge of the square wave pulse output of the second stage of tube 505 occurs simultaneously with the occurrence of the peak of the triangle output of the triangle generator 163, the conductivity of tube 541 will be momentarily interrupted during the period of occurrence of the peak of each of the triangles which appear in the output circuit thereof and a center line is thus established in the flight path. It is obvious that coupling of a pulse of a different time period or several pulses at different time periods may be provided to effect division of the path in a correspondingly different manner.

The signal output of the clipper tube 541 is coupled over capacitor 553 to the input side of amplifier 165. Such output in each frame scan, as set forth above, provides a flight path superposed on the display which is adjustable to different shapes and positions, and which includes a center line trace and cross line reference marks which are related to the speed of the aircraft.

In a further embodiment programmed speed may be included in the display as an aid to the provision of maximum safe flight conditions. In such arrangement, a set of symbols are presented along the center line of the flight path to illustrate the speed of the aircraft relative to a preferred speed for the existing conditions. A program speed oscillator 170 is connected to control the clipping circuit 164 to modulate the flight path signal in a manner to incorporate such symbols therein. Suitable means for providing the data indicative of the optimum speed for the prevailing flight conditions may be provided to the program speed circuit 170 by a computer device, such as 166a, or by a separate package 166c which is preset to provide an indication of the preferred speed for predetermined conditions.

The program speed oscillator 170 is identical in structure to the speed oscillator 169 or the variable oscillator 144 previously described herein, and the signals indicating the value of the preferred speed are applied to the input of 170 in the same manner as oscillators 144 and 170. The output circuit 170' of the program speed oscillator 170 (which corresponds to conductor 144' of oscillator 144) is coupled to the cathode 546 of the clipper tube 541 in clipper circuit 164.

It will be recalled that the center line is provided on the flight path by blanking the output signal of the tube 541 in each horizontal line trace as the trace proceeds over the point where the center line is to appear. The program speed oscillator 170 is connected, therefore, to disable the blanking for a momentary period at different increments along the path to introduce a symbol at such increments on the center line of the flight path. Movement is provided for such symbols by adjusting the frequency of the output of the program speed oscillator 170 relative to a multiple of the vertical sync rate of the system, the frequency adjustment being effected by adjustment of resistance member in the oscillator circuit 170 similar to resistances 380 in the oscillator 144.

In one embodiment the speed sensor device 142 for the aircraft is connected with the optimum speed indicator 166c to a resistor comparison circuit to determine the actual speed of the aircraft relative to the program speed. In operation, if the speeds are equal and zero output results, the program speed oscillator 170 couples symbol generating signals to the clipper circuit 164 at a rate related to the vertical trace so that the symbols appear on the flight path as stationary cues. In the event the resultant signal indicates that the actual speed which is faster than the optimum speed, the frequency of oscillator 170 is adjusted to a rate which effects movement of the guide symbols on the flight path in a direction toward the lower margin of the screen. If the actual speed of the aircraft is slower than the optimum speed, the frequency of oscillator 170 is adjusted to a rate which effects movement of the guide symbols on the flight path in a direction toward the horizon. Other methods of providing relative motion of the symbols to indicate variation of the actual aircraft speed from an optimum speed will be apparent to parties skilled in the art. If desired, the symbols which are illustrative of the relative speed of the aircraft, or of variation of the aircraft speed from a preferred optimum speed may be provided along the marginal edges of the flight path rather than along the center line, such arangement merely involving the coupling of the oscillator signals to the clipper circuit 164 over capacitor 526 and coupling diode 540. Other such modifications of the device to incorporate cue symbols on the flight path at correspondingly different positions will be obvious from the foregoing description. Further, as set forth in the earlier description, the shape of the symbols may be suitably varied, it being obvious that symbols consisting of vertical poles disposed adjacent the flight path margins in the manner of telephone poles may be readily provided.

Amplifier stage 165 may comprise a triode section of a twin triode tube commercially available as a 12AU7, and may comprise an anode 555, control grid 556, cathode 557. The anode 555 is connected over load resistor 558 to 100 volt power supply; control grid 556 is coupled over capacitor 553 to the output side of clipper circuit 164 and over resistance 559 to ground; and cathode 557 is coupled over resistor network 560, 561' to ground and capacitor 561 to ground.

In operation, as the pulse output of the clipper circuit 164 is coupled to the control grid 556 of the amplifier stage 165, the amplified output pulses appearing at the anode circuit thereof are coupled over the RC coupling circuit comprised of capacitor 562 and resistance 563, coupled over diode 566 and conductor 565 to the input terminal of video amplifier stage 145 and the control gun of the cathode ray display tube 426 (FIGURE 16). It is noted that the resistance 561' connected in the cathode circuit of amplifier stage 165 is adjustable to permit the user of the device to adjust the degree of amplification of the stage, and thereby the brightness of the flight path as superposed on the display device.

TERRAIN CUE GENERATION

As noted heretofore, a terrain generator 171 may be included for the purpose of providing cue generations in the sky texture of the device, and more specifically cue generations indicative of the landscape or terrain which lies in the forward path of the aircraft in any given position of the aircraft. Such arrangement as shown in FIGURE 24 may comprise radar receiver equipment 173, which is adapted to scan the terrain in the path of the aircraft and to provide signals which vary in amplitude with variations in the contour or profiles of the landscape in the path thereof. Such signals are coupled to a sampler switch 174 which converts the low scanning frequency signal output of the radar device 173 to a high frequency signal of similar informative characteristics, and such signal is fed to the input side of the clipper circuit 175. Vertical sawtooth generator 176 is operative to couple a vertical sawtooth signal to the clipper 175 (to operate same in the manner of the clipper circuit 164 in the flight path generator unit 160), and the output thereof is coupled over amplifier 177 to the input side of the video amplifier stage 145 for presentation on the display device 146.

With specific reference to FIGURE 20, it will be apparent that the low frequency signal output of the radar receiver 173 is coupled by stepping switch 575 which may be of the electronic type having a series of sampling circuits, each of which may comprise an electronic sampler switch 575 adapted to couple the signal output of the radar receiver 173 successively over input circuits 576–581 to a storage device 582, which is comprised of a series of capacitors 583–588, the number of input circuits and storage capacitors being related to the degree of detail of information which is to be shown on the display device 146. The capacitors of the storage device 582 are operative to store the signals which are coupled to the input circuits by the radar receiver 173 for a predetermined period of time subsequent to the sampling of its associated input terminal by the radar receiver 173. Each storage capacitor 583–588 has an associated coupling resistor 589–594, and an associated capacitor member 595–600 for extending the output thereof to an associated univibrator circuit 601–606. The univibrator circuits 601–606 may be similar in structure to the univibrator unit used in the triangle generator 163 in the flight path generator circuit 160. The input circuit for the univibrator circuit 601 of the series is coupled over conductor 200 to the horizontal sync output of the timing generator 100, and is energized responsive to the coupling of each horizontal output impulse thereto (which pulse also horizontally initiates each line trace of the raster on the display device 146). The output side of the first univibrator circuit 601 is in turn coupled over capacitor 608 to the second univibrator 602.

Univibrator circuit 601 operates in the manner of the univibrator circuit of triangle generator 163 responsive to each receipt of the horizontal sync impulse over input conductor 200 to initiate the generation of a square wave output pulse having a duration which is determined by the preselected time constants of the univibrator. The square wave output pulse as generated is coupled over its output circuit over capacitor 608 to the second univibrator circuit 602 and also over capacitor 595 to diode mixer circuit 610.

As the trailing edge of the square wave pulse appears at the output side of univibrator 601, such waveform is coupled over capacitor 608 to effect the energization of the univibrator 602, which in turn operates to provide a square wave impulse at its output side. The trailing edge of the output pulse of univibrator 602 is, in turn, coupled over capacitor 609 to the subsequent univibrator 603 in the series, the univibrators being thus operative in sequence and being energized as a train once for each horizontal sync input pulse coupled over conductor 607 to the first univibrator 601 of the series.

As each of the univibrators 601–606 are operated in sequence, a square wave output is coupled over the associated capacitors 595–600 to the input side of a diode mixer 610, each pulse as coupled to the diode mixer being mixed with the signal which is stored on its associated storage capacitor in the storage group 582. Thus as the square wave output of the univibrator 601 is coupled to the first input lead to the diode mixer 610, the potential signal stored on capacitor 588 is mixed therewith to accordingly modify the amplitude of the pulse appearing on the output side of the diode mixer 610. It is apparent that the output signals of the diode mixer 610, as the successive signals on the storage device 582 are sampled by the sequentially operating univibrators 601–606, will reproduce the signal which was coupled to the storage device 582 by the radar receiver 173, the frequency of the signals having been increased substantially for purposes of use with the display device. The wave output form of the diode mixer 610 may be directly coupled to the clipper circuit 175, or in the event that a more smooth profile waveform output is desired, an integrating circuit 613' comprised of resistor 611 and capacitor 612 may be connected between the diode mixer 610 and the clipper 175 for such purpose.

Timing generator 100 couples vertical sync pulses over conductor 613' to the vertical sawtooth generator 176 which is mixed with the output signals of diode mixer 610 in clipper circuit 175 which may be of the structure of clipper circuit 164 in the flight path generator 160 and which is operative in a like manner to readout the signal output of the diode mixer for extension over the amplifier 177 to the video amplifier stage 145 and reproduction on the TV monitor 146. The profile of the terrain detected by radar receiver 173 is thus readily reproduced as an additional cue on the display device 146.

CUE GENERATION OF SKY TEXTURE

Figure 15:
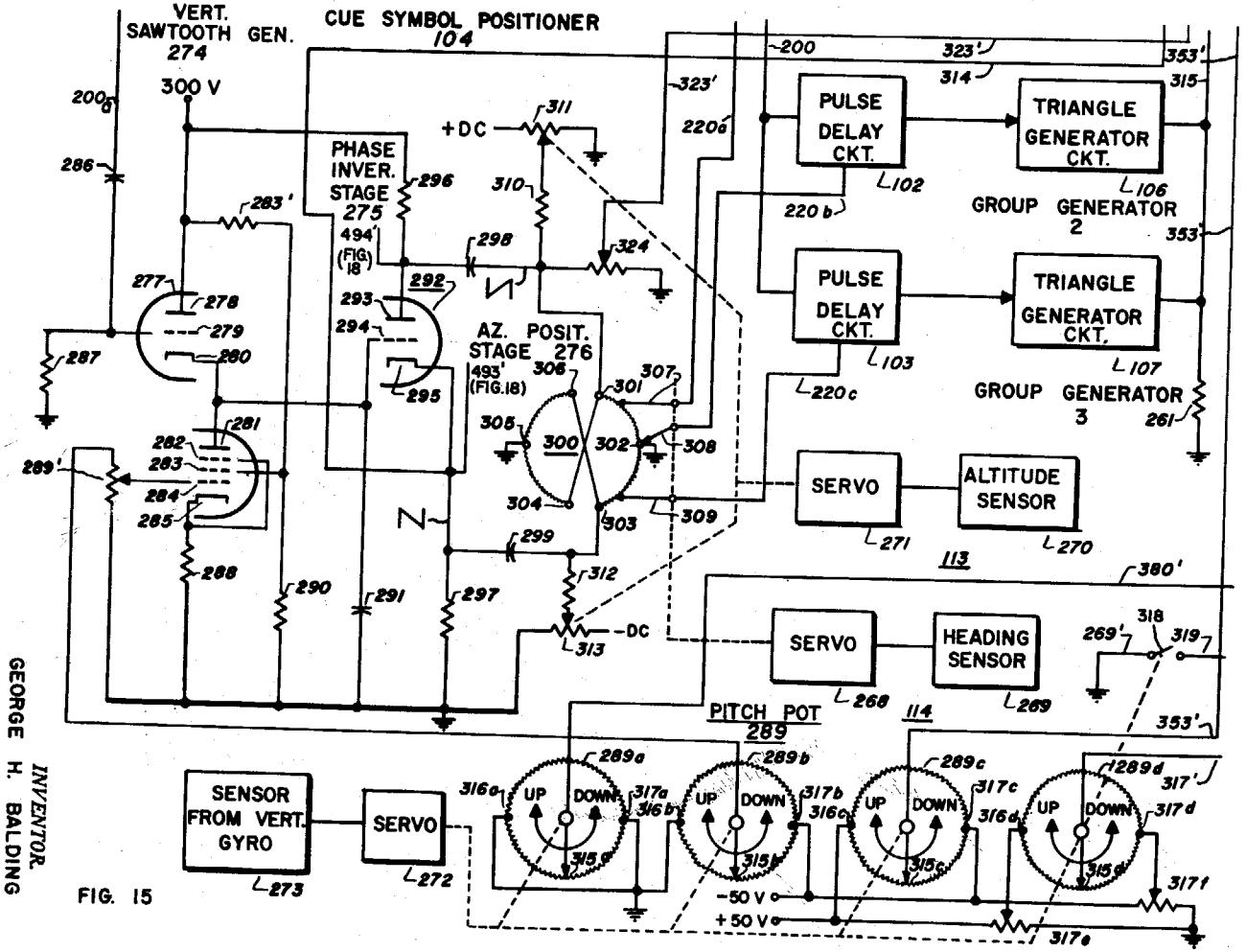

In a preferred embodiment of the system, it is considered preferable to provide a series of horizontal lines in the sky texture which are spaced relative to one another, whereby an adequate cue is provided for the pilot in the event of the loss of the horizon line in maneuvering of the aircraft to a climbing attitude. In such arrangement a sky texture generator 640 (FIGURE 21) is connected in the system, the generator basically comprising a multivibrator unit 641 which may be of the type set forth in the textbook "Electronics," Elmore and Sands, of the National Nuclear Energy Series, Division 5, Volume 1, 1949, pp. 81 and 82. As shown in FIGURE 21, the input circuit of the multivibrator is coupled over conductor 642 to the vertical sync output of timing pulse generator 100 (FIGURE 14). The control circuit for the multivibrator 641 is coupled over a variable resistance member 644 having adjustable arm 643, the resistance 644 being connected over conductor 645 to the output side of the vertical sawtooth generator 274 (FIG. 15). The output side of the multivibrator 641 is connected over conductor 646 to the video amplifier 145 (FIGURE 16) for the display device 146.

The multivibrator 641 is free running in nature, and is synchronized in the system by the vertical sync pulses which are coupled over conductor 642 to the input circuit therefor. The adjustable arm 643 associated with resistor 644 is adjusted to different positions by the pitch sensor means 109, the arm in such adjustment varying the amplitude of the vertical sawtooth input signal. As the amplitude of the vertical sawtooth input to the multivibrator is adjusted to different values with variations of the pitch attitude of the aircraft, the spacing between the horizontal lines in the sky texture is varied accordingly.

The multivibrator input circuit is also coupled over conductor 647 to the anode circuit of the second section of tube 400 (FIGURE 16) in the horizon line generator 138, whereby the line texture is limited to the portion of the display which sets forth the sky texture.

In operation, with the receipt of each vertical sync pulse, the multivibrator 641 operates in a free running manner, the output pulses thereof being adjusted in spacing by the pitch representative vertical sawtooth wave being coupled thereto. Thus the lines which appear in the display adjacent the top margin thereof are further apart than the successive lines in the display in the direction of the true horizon line. The manner in which other cues may be generated for display in the sky texture will be readily apparent from the foregoing description.

According to a further modification of the arrangement, the apparatus may be adapted to provide cue generations in the sky texture. In the provision of such cues in one embodiment shown in FIGURE 22, an additional impulse generating circuit series similar to the series used in the flight path generator 160 is coupled to the input circuit for the video amplifier 145 of the display device 146, such circuitry being modified in its signal application by the sensor equipment including an antenna 624, weather radar 625, and XY positioner 626.

More specifically, impulse generators 619–623 include, as in the case of the flight path generator 160, a horizontal sawtooth generator 619, a variable delay circuit 620, a triangle generator 621, a clipping circuit 622, and an amplifier 623, the output of which is coupled to the video amplifier stage 145 for the display device 146. The group generators 619–623 are connected for operation in synchronization with the equipment of the system, the groups being operative in the manner of the flight path generator circuitry 160, responsive to the coupling of each horizontal sync pulse over conductor 200 to the horizontal sawtooth generator 619 of the group by the timing pulse generator 100.

Variation in the signal output of the generator group 619–623 is controlled by the weather radar equipment, including radar antenna 624 and weather radar circuitry 625, which couples signals indicative of the weather conditions to the XY positioner 626, the XY positioner in turn being operative to couple signals indicative of the X coordinate of a weather condition in the sky to the variable delay generator 620 and being operative to couple signals indicative of the Y coordinate of the cloud in the sky to the clipping circuit 622.

The XY positioner circuit may comprise a first and a second adjustable potentiometer member which are adjustable to different positions to vary the amplitude of the output signals to the variable delay generator 620 and the clipping circuit 622, respectively, in accordance with the change in the relative position of the weather condition in the sky. The operation of the group of circuit generators to effect such cue generation will be obvious from the description set forth relative to the operation of the flight path generator 160.

GENERATION OF DIFFERENT CUES IN COLOR DISPLAY

The novel cue generator arrangement is also particularly well adapted for use in presenting the visual cues in color, and one method of adapting such arrangement for use with a color display device having a transparent phosphor type screen is set forth in FIGURE 23. As there shown the system basically comprises a pair of multivibrators 652, 654 intercoupled by capacitor 653 connected over conductor 651 to the timing generator 100 for control by the sync output pulses. The multivibrator units 652 and 654 are connected to be normally nonoperative, and accordingly there is an absence of a signal in the control conductors 655, 656 which extend to associated color mixer electronic switch 657. With receipt of a first vertical sync pulse, the first multivibrator 652 is energized and a control signal is coupled over conductor 655 alone to the color mixer switch 657. With the receipt of a second impulse, the multivibrator 654 and the nonenergization of the first multivibrator 652, whereby a control signal is extended over conductor 656 alone to the color mixer 657; and immediately prior to the receipt of the third vertical sync pulse multivibrator 654 is operative to block the multivibrators 652 and 654 from response to the third incoming vertical sync pulse, such control operation being effected over feedback circuit 662 and being maintained effective for approximately the period of one pulse. As the fourth incoming impulse is received the cycle of the multivibrator is reinitiated.

Color mixer electronic switch 657 may comprise a set of input terminals, each of which is preassigned for use with a predetermined one of the colors. Terminals 663 may be preassigned to receive pulses which are to be displayed in the white color, terminal 664 may be preassigned for connection of the pulses thereto which may also be assigned for colors to be displayed in white, terminal 665 may be preassigned for use with pulses which are to be displayed in brown or green, and terminal 666 may be preassigned for use with information pulses which are to be displayed in blue. Additional terminals may be preassigned for use with pulses to be displayed in correspondingly different colors.

As a vertical sync pulse is received over the incoming conductor 651, the electronic mixer switch 657 is operative responsive to the resulting absence of a pulse on conductors 655, 656 to enable the coupling of the pulses which are associated with one color, such as for example the color of blue to the video amplifier. Thus, each of the circuits which is connetced to terminal 666 will be coupled over the video amplifier 145 to the video gun for display on the phosphor screen during the period that the blue color is to be traced. In the case of certain of the colors which are the result of the mixture of several different colors as for example, in the presentation of a white display, (which requires energization of each of the targets red, blue and green to provide a white spot), the terminals (such as terminals 663, 664) are sampled by the color mixer switch 657 during the raster sweeps which are made in the red, blue and green traces.

Simultaneously, with the control of the mixer switch 657 to cut through the particular pulses which must be coupled to the gun during the period of the display of a predetermined color, the multivibrators 652, 654 are also operative to control mixer circuit 660 in the selection and energization of a corresponding one of the screens in the transparent phosphor target. More specifically, in the absence of the signal on conductor 655, 656, the output of the mixer circuit 660 is at a first level; as the signal appears on conductor 655 alone, the output signal on mixer circuit 660 is raised to a second level, and as a signal appears on conductor 656 alone, the signal advances to a third level, whereby a step function of the type set forth adjacent the output side of the mixer circuit 660 is coupled to the high voltage power supply 661 for the display device 670. The high voltage power supply 661 is operative in the manner of high voltage power sources to provide a signal output of like step characteristics and of increased voltage amplitude to effectively energize each of the screens of the phosphor target in succession and in synchronization with the signal pulses for such color as coupled to the video gun by the color mixer switch 657 and video amplifier 146.

The deflection circuitry 659 is controlled by the sync output pulses of timing generator 100 in the manner of a conventional television tube, and the changes in the roll attitude of the craft are coupled to the system by means of the roll sensor equipment 148 described in connection with the black and white embodiment.

GENERATION OF OBJECT CUES

It will be apparent from the foregoing description, and particularly the portions thereof which are directed to the manner in which the output of the group generators is modulated by the speed oscillator circuit 144 to provide a series of circles and mound cue symbols on the display device, that other forms of cue symbols may be readily provided through the provision of similar circuitry. Briefly stated, with modulation of the output sampling pulses which are generated at the rate of the horizontal sync pulse by a group generator circuit, such as group generator 1, (FIGURE 14) by a readout pulse or a set of readout pulses which are generated at the rate of the vertical sync pulse, cue symbols having shapes consistent with the contour of the sets of readout impulses thus provided will be presented on the display screen.

Figure 25:
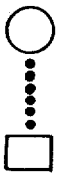
Figure 26:
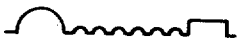

By way of specific example, reference is made to FIGURES 25, 26 which indicate the manner in which a set of readout pulses generated at the vertical sync rate may be mixed with the output pulses of a group generator to provide a cue symbol having the shape of a submarine mine (FIGURE 25). It is apparent with reference to FIGURE 26, which illustrates the pulse train set to be generated at the vertical sync rate, that the contour of the cue symbol shape presented on the display device (FIGURE 25) includes the contour of the pulse train and a mirror image thereof. As a simple guide to determination of the pulse train to be generated, it is only necessary to draw a picture of the desired cue symbols; divide the picture with a center line, and rotate the picture through ninety degrees. The portion appearing above the center line (now horizontal) indicates the nature of the waveform required for each vertical trace.

Figure 27:
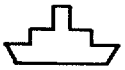
Figure 28:
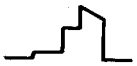

By way of further example, FIGURE [27] *28* illustrates the nature of the pulse waveform required for the provision of a cue symbol having a shape of a ship (*FIGURE 27*). The manner in which cue symbols of different types and shapes may be provided will be obvious from such description.

CONCLUSION

There has been set forth hereinbefore, an novel electronic visual cue generator device which is operative to provide visual cues for facilitating the presnetation of different forms of information on an electronic display device. In its most basic form the device permits the presentation of two different background cue sets in adjacent relation on a display device for comparison purposes, and a third cue set superposed on a portion of at least one of the background cues.

In one specific embodiment disclosed herein, the arrangement is utilized in the presentation of information relating to the flight condition of an aircraft, the background cues in such arrangement comprising a sky portion, a horizon and a ground portion. An additional set of cue symbols are superposed on the ground portion to provide an indication of the ground texture with movement of the aircraft thereover. The various cue displays including the background cues are animated represent changes in the pitch, altitude, azimuth, roll and speed of the aircraft. Such cues in themselves constitute a specific advantage in guidance systems. With the addition thereto of the novel flight path in superposed relation with the basic cues, an unparalleled amount of information is presented in a single integrated display.

While such arrangement has particular utility in aircraft units, it will be apparent to parties skilled in the art that similar advantages attain in the use of the equipment in numerous other applications, including submarines, tanks, ships, missile and torpedo guidance, automobiles, simulator units and other types of equipment. The flight path set forth in the foregoing description may, for example, be utilized as a guide path for tanks or submarines through a mine field, or to guide a missile toward a desired target, or a driverless industrial truck through a factory, or many other similar applications. In its use in a submarine, the horizon line may be designated as the dividing line between the surface and the water, or alternatively the horizon line may be indicative of the depth of the submarine or some predetermined reference level or plane, and the portions above and below the horizon line may be used to indicate the conditions of the water in the path of the ship. In other uses of the system it may be desirable to provide a reference line which is not related to the horizon, as for example in outer space, and the symbols are caused to move from the reference line on the display to the lower margin for motion reference purposes. Thus, although the terms "sky portion," "horizon line," and "ground portion" have been utilized to describe the basic background cues, it is to be understood that the terms are considered to be descriptive of further related uses in which cue sets of different elements are to be provided. In a similar manner the different variations of the flight path and the ground texture symbols are considered to generically comprise "paths of symbols" which provide guide information on the display device.

Ostensibly the provision of these basic cues greatly facilitate operation of many different types of equipment. The additional provision of terrain, object and weather cues, the position of the unit relative thereto, and the optimum path for avoiding same in conjunction with the basic cues which are related to the condition of the unit in terms of pitch, altitude (or depth), roll, speed and azimuth, is considered to constitute a definite and important step forward in the art.

While we have illustrated and described what is regarded as the preferred embodiment of the invention, nevertheless it will be understood that such illustration is merely exemplary and that numerous modifications may be made therein without departing from the essence of the invention.

What is claimed is:

1. In a visual cue system for displaying different items of information for viewing purposes on a video display unit, a first cue generator circuit operative to generate a first discrete group of signals for coupling to said display device to provide a set of background cues on said display unit including signal means for adjusting the signal output the generator circuit to vary given characteristics of the background cues responsive to changes in a first data set which is coupled thereto, and a second cue generator circuit operative to generate a second group of signals for coupling to said display device to provide a second discrete cue set on said display device in superposed relation with said background display comprised of at least one path which has characteristics related to a second set of data, including means for adjusting the signal output of said second cue generator circuit to vary given characteristics of the superimposed cue set to indicate changes in the information represented thereby relative to said first cue set, whereby the information represented by said two independently adjustable sets of visual cues is simultaneously presented on a common display for comparison purposes.

2. In a visual cue system for displaying different items of information on a display unit relating to [relative] movement of an object *relative to a desired path,* a first cue generator circuit operative to generate a first group of signals for coupling to said display unit to provide a first cue set thereon comprising a horizon, and an above horizon and a subhorizon portion on the display unit, and a second cue generator circuit *including path generator means normally* operative to generate a second group of signals for coupling to said display unit to provide a [second cue set] *flat wedge-shaped path* for display in superposed relation with at least one portion of said first cut set on said display device, *the base of said path with the object on the desired path being located at the lower edge of the display and the apex of said path being located*

*said horizon,* including means for adjusting various characteristics of the signals of *said path generator means* the second cue set to indicate changes on said display unit in the information represented thereby relative to said first cue set.

3. In a visual cue system for displaying different items of information on a display unit relating to relative movement of an object, a first cue generator circuit operative to generate a first group of signals for coupling to said display device to provide a first cue set thereon comprising a sky, a horizon, and a sub-horizon portion on the display unit, means for adjusting the signal output of said generator circuit to alter the relative amount of each of said portions displayed, and the position thereof relative to the horizontal axis of the unit; a second cue generator circuit operative to generate a second group of signals for coupling to said display device to provide a second cue set thereon in superposed relation with at least portion of said sky horizon and ground cues, including means for adjusting various characteristics of the second group of signals to indicate changes in the information represented thereby and means for coupling the discrete sets of output signals of said first and second cue generator circuits to said display device for display purposes.

4. In a visual cue system for displaying different items of information on a display unit relating to [relative] movement of an object *relative to a desired path,* a first cue generator circuit operative to generate a first group of signals for coupling to said display device to provide a first cue set comprising a sky, a horizon, and a ground portion on the display unit, and a second cue generator circuit operative to generate a second group of signals for coupling to said display device to provide a second cue set thereon comprising a path of symbols disposed in *non-superposed relation with each other and in* superposed relation with at least a portion of said first cue set, *successive symbols with said object on the desired path being wider to provide a path having a wedge-shaped outline,* including means for adjusting various characteristics of the second group of signals to vary corresponding characteristics of the path of symbols on the display to indicate changes in the information represented thereby relative to and independent of said first cue set.

5. In a visual cue system for displaying different items of information on a display unit relating to relative movement of an object, generator circuit means operative to generate a first set of signals for effecting a display of a cue set on the display unit comprising a path extending across at least a portion of the display unit, marking means for generating marking signals which are operative to divide said path into segments which move across the face of the display device at a given rate of speed, and means for coupling said first set of signals and said marking signals to the display unit for display thereon.

6. In a visual cue system for displaying different items of information on a display unit relating to relative movement of an object, generator circuit means operative to generate a first set of signals for coupling to said display unit having waveforms of a shape to provide a display of a cue set thereon comprising a path extending across at least a portion of the display, and path control means having skew position circuit means operative to adjust the characteristics of the wave-form of said signals to different values and thereby *adjust* the direction of the path to correspondingly different angles relative to the vertical axis of the display portion of the display unit.

7. In a visual cue system for displaying different items of information on a display unit relating to [relative] movement of an object *relative to a desired path,* generator circuit means operative to generate a first set of signals for effecting display of a cue set on said display device comprising a *flat wedge-shaped* path extending across at least a portion of the display *with said object on the desired path, the basic end of the path on the display being located below the wedge shaped end of the path to display a path in perspective,* and path control means including horizontal positioning means operative to couple [different] output signals to said generator circuit means to move the path on the display laterally [to correspondingly different positions] to cross the horizontal axis of the display portion of the display unit at correspondingly different positions selectively independent of changes in the information provided by other cues on the display.

8. In a visual cue system for displaying different items of information on a display unit relating to relative movement of an object, generator circuit means operative to generate a first set of *waveform* signals for effecting display of a cue set comprising a *flat wedge-shaped* path extending across at least a portion of the display, path control means including a path-end positioning circuit means operative to provide signals for adjusting *the timing of the waveform* signal output of said generator circuit means to adjust one end of the path on the display unit to different horizontal and vertical coordinate positions, and means for coupling the signal output of said generator circuit means [and] *as adjusted by* said path control means to said display unit.

9. In a visual cue system for displaying different items of information on a display unit relating to relative movement of an object *to a desired path* including means for providing a horizon line in said display, generator circuit means operative to generate a first set of signals for effecting display of a cue set comprising a path extending across at least a portion of the display, path control means having a positioning circuit including means for positioning the vertical path end at the horizon line with the path extending in the direction of the bottom margin of the display unit *with the object on the desired path,* and means for inverting the path to extend from the horizon in the direction of the upper margin of the display unit selectively independent of any movement of said horizon line *with movement of the unit to a below-path condition,* whereby relative movement is effected between the horizon line cue and the path cue on the display.

10. In a visual cue system for displaying different items of information on a display unit relating to relative movement of an object, generator circuit means operative to generate a first set of signals for effecting display of a cue set on said display device comprising a path extending across at least a portion of the display, and path control means including path curvature means operative to adjust the outline of the path to different curved configurations.

11. In a visual cue system for displaying different items of information on a display unit relating to relative movement of an object, generator circuit means operative to generate a first set of signals for coupling to said display device having wave-forms of a shape to provide a display of a cue set thereon comprising a path extending across at least a portion of the display, and path control means including generator means for generating signals of different characteristics to adjust the path outline to widths of correspondingly different values.

12. In a visual cue system for displaying different items of information on a display unit relating to relative movement of an object, generator circuit means operative to generate a first set of signals of a character to establish the display of a cue set comprising a path extending across at least a portion of the display as coupled thereto, marking means including means for generating signals which establish cross lines at successive intervals of said path and which have motion along said path, and means in said marking means for adjusting the rate of motion of the lines along the path to different values.

13. A visual cue system as set forth in claim 12 in which said path marking means includes signal generator means for generating signals to effect display of at least one line which extends along the length of the path.

14. In a visual cue system for displaying different items of information on a display unit relating to relative movement of an object, generator circuit means operative to generate a first set of signals having electrical characteristics of a value to establish the display of a cue set comprising a path extending across at least a portion of the display, marking means including signal generator means for generating signals operative to effect a display of a series of shaped symbols which move along said path at a given rate of speed, and control means for adjusting the rate of motion of the shaped symbols to different values.

15. In a visual cue system for displaying different items of information on a display unit relating to relative movement of an object, generator circuit means operative to generate a first set of signals of a characteristic to establish the display of a cue set on said display unit as coupled thereto comprising a path extending across at least a portion of the display, and path marking means including means for generating marking signals having a waveform which divides the path into a series of separate, distinctly shaped symbols which move across the screen at a given rate of speed, and means for coupling said first signal set and said marking signals to said display unit.

16. In a visual cue system for displaying different items of information on a display unit relating to relative movement of an object, generator circuit means operative to generate a first set of signals of a characteristic to establish the display of a cue set on said display device comprising a path extending across at least a portion of the display, a first marking means for generating a first set of symbols disposed in superposed relation with at least a portion of said first cue set and having motion relative thereto, including means for adjusting the rate of movement thereof along the path, and a second marking means for generating a second set of symbols including means for adjusting the rate of movement thereof independently of the adjustment of the rate of movement of the symbols provided by said first marking means.

17. [In a] *A* visual cue system as set forth in claim 16 which includes means operative to generate a set of background signals of a characteristic which establishes a set of background cues on a display unit, at least a portion of which is of a waveshape to establish a set of symbols having a rate of movement across the display device in successive displays thereof including means for independently adjusting the rate of generation of said background signal to different values whereby at least three different rates of movement representative of three different sets of information may be displayed on a single visual unit for comparison purposes.

18. In a visual cue system for displaying different items of information on a display unit relating to relative movement of an object, generator circuit means operative to generate a first set of signals of a waveform to establish the display of a cue set comprising a path extending across a portion of the display, a first generator means for generating a set of signals of a waveform to establish cross lines spaced at successive increments in the display which move along the path at a rate related to be speed of the object relative to such path, a second generator means for generating a set of signals of a waveform to establish the display of a set of shaped symbols at successive increments along the path which indicate the rate of speed of the object relative to a preferred optimum speed, and a third generator means operative to provide signals of a waveform to establish a background cue including symbols in motion at a rate of speed related to the speed of the object relative to the earth.

19. In a visual cue system for displaying different items of information on a display unit relating to relative movement of an object, a plurality of cue generator means, each of which is operative to generate a discrete set of signals of a character to establish a correspondingly different path of symbols on said device, azimuth means including signal generating means for adjusting the position of the paths of the display device relative to each other, and means operative to adjust the paths laterally across the display responsive to the change of heading of the object, and pitch means operative to generate signals to adjust the skew of the paths relative to each other responsive to changes in the pitch attitude of the device.

20. A visual cue system as set forth in claim 19 which includes attitude means for generating signals to adjust the paths to different widths to represent changes in altitude of the object.

21. A visual cue system as set forth in claim 19 which includes speed means operative to generate signals for shaping each path into a series of shaped symbols, each set of symbols in a row having a rate of movement along the path which is related to the speed of the object relative to the earth's surface.

22. In a visual cue system for displaying different items of information on a display unit relating to movement of an object, a first cue generator circuit operative to generate signals of a character to normally establish a horizon, an above horizon and a subhorizon cue on the display unit including signal input means for adjusting the signal output of the generator circuit to vary the position of the respective cues on the display device to represent changes in the pitch attitude of the object, and a second cue generator circuit operative to generate a set of signals for superposing a set of symbols on at least the subhorizon portion of the display having movement across the display relative to the horizon including means for adjusting various characteristics of the superimposed subhorizon symbols to indicate changes in the information represented thereby.

23. In a visual cue system for displaying different items of information on a display unit relating to movement of a mobile unit, a first cue generator circuit operative to generate signals for coupling to said display device to provide a set of basic cues on said display device including a horizon cue, an above horizon cue, and a subhorizon cue on the display unit, and a second cue generator means operative to generate a set of signals for coupling to said display device to display, in superposed relation to a portion of at least one of said basic cues, the position of objects which lie in the path of the mobile unit.

24. In a visual cue system for displaying different items of information on a display unit relating to movement of a mobile unit, a first cue generator circuit operative to generate signals of a character to normally establish a first set of basic cues including a horizon cue, an above horizon cue, and a subhorizon cue on the display unit terrain sensor means for providing sensing signals related to the contour of the terrain in the path of the unit, and a second cue generator means including means operative responsive to the coupling of said sensor signals thereto to provide signals to effect the display of the terrain contour cue in superposed relation with at least one of the basic cues of the display.

25. In a visual cue system for displaying different items of information on a display unit relating to movement of a mobile unit, a first cue generator circuit operative to generate signals of a character to normally establish a set of basic cues including a horizon cue, an above horizon cue, and a subhorizon cue on the display unit, weather radar means for providing sensor signals indicative of the weather conditions which lie in the path of the unit, and a second cue generator means operative responsive to the coupling of the weather information to said second cue generator means to provide cues thereof in superposed relation with the basic cues on the display.

26. In a visual cue generator for generating signals for reproduction as visual cues on the display area of a display device including control means for effecting a raster trace on said display area, pulse shaping means operatively controlled to provide an output sampling signal ıeans operative to couple control signals to said pulse haping means of a value to operate same during at least ertain ones of the line traces of said raster, readout pulse enerator means operatively controlled to provide at least ne pulse of a predetermined shape during at least a por- ion of said ones of said line traces, and means operative ɔ couple the readout pulse with the output sampling sig- als of the pulse shaping circuit means to said display evice as said ones of said line traces of the raster are aced to provide a cue symbol on said screen having a ontour outline which includes the shape of said readout ulse.

27. In a visual cue generator for generating visual ues on the display device of a display device including ontrol means for providing a raster trace on said display rea, and modulation means for controlling the display n said raster, pulse shaping circuit means operatively ontrolled to provide an output sampling signal, means perative to couple operating signals to said pulse shaping ıeans during at least certain ones of said lines traces, eadout generator means operative to provide a set of dif- erently shaped pulses contemporaneously with at least portion of said certain line traces, the shapes of said ulses in said set being at least partially indicative of the ontour of the resultant visual cue on the display device, nd means for coupling said readout pulses with the out- ut sampling pulses of the pulse shaping means to said ıodulation means to provide a cue symbol having an utline including the shape of said readout pulse is repro- uced by the display device.

28. In a visual cue generator device for generating ignals for reproduction as visual cues on the display area f a display device which includes control means for pro- iding a raster trace on the display area, and modulation ıeans for modulating a raster trace, said visual cue gen- rator device including signal generator circuit means peratively controlled to generate an output sampling ignal, means operative to couple operating signals to said ignal generator circuit means during at least certain ones f the line traces of said raster, a readout circuit for gen- rating a substantially sawtooth waveform readout pulse f a duration of at least a portion of said certain line aces, and mixer means for coupling said readout pulse nd said sampling pulses to said modulation means for aid display device, to provide a cue symbol having an utline which includes the shape of said readout pulse on ıe display area of the display device.

29. In a visual cue generator device for generating ignals for reproducion as a cue symbol on the display rea of a display device including control means for pro- iding a raster trace on the display area, and modulation ıeans for modulating the raster trace, said visual cue enerator device including signal generator circuit means peratively controlled to provide an output sampling ignal of a predetermined shape, means operative to ouple operating signals to said signal generator circuit ıeans during certain ones of said line traces, a readout ircuit for generating a sawtooth waveform readout pulse f a duration of at least a portion of said certain line aces, means including a mixing circuit for coupling said eadout pulse with said shaped sampling pulse to said ıodulating means of the display device to provide a cue ymbol having an outline which includes the shape of aid shaped pulse on the display device, and cue symbol ositioner means for coupling bias signals of different mplitudes to said signal generator circuit means respon- ive to changes in certain data to be represented by the ue symbol, to thereby correspondingly adjust the cue ymbol laterally to different horizontal coordinates on ıe screen.

30. A cue generator as set forth in claim 29 which is dapted for use in displaying the relative flight condition n an aircraft unit, and which includes sensor means for roviding signals of different potential values indicative f the relative altitude of the aircraft, and means for coupling the different value signals to said signal generator circuit to correspondingly alter the time of occurrence of a shaped pulse during a line trace, and thereby the horizontal coordinates of the cue symbol on the screen.

31. In a visual cue generator device for generating signals for reproduction as visual cues on the display area of a display device including control means for providing a raster trace on the display area having synchronization means for providing horizontal and vertical synchronization pulses for use in the timing of said raster, and modulating means for modulating a raster trace on the display area, a plurality of signal generator circuit means, each of which is operative to provide an output sampling signal of a predetermined shape, means operative to couple operating signals to said signal generator circuit means during certain successive ones of said line traces, different ones of the generators providing shaped signals at different relative times, a readout circuit for each signal generator means operative to generate a readout pulse of a duration of at least a portion of the signal output of its associated signal generator means, means including a mixing circuit connected to couple the readout pulse with its shaped sampling signals to said modulation means of the display device, and positioning means including control means coupled to said signal generator circuit means for simultaneously adjusting the time period of generation of said shaped sampling signals to vary the horizontal coordinates of the cue symbols on said display device relative to each other.

32. A cue generator as set forth in claim 31 in which said cue symbols are generated to indicate a change in altitude of a flight unit, and which includes sensor means for coupling a potential signal of different amplitudes and polarities to said signal generator means responsive to changes in the altitudes of the flight unit, the signal changes for certain of the signal generators being of equal amplitudes and opposite polarity to effect lateral adjustment of the cue symbols produced thereby toward and away from a given reference cue on the display device in a related manner.

33. In a visual cue generator device for generating signals for reproduction as visual cues on the display area of a display device which includes control means for providing a raster trace on the screen, and modulation means for modulating the raster trace, said visual cue generator device including a plurality of signal generator circuit means, each of which is operatively controlled to provide an output sampling signal of a predetermined shape, means operative to couple operating signals to said signal generator circuit means during each one of certain ones of said line traces, different signal generator means being operative to provide shaped sampling signals at different relative times, a readout circuit for each signal generator means operative to provide a readout pulse of a duration of at least a portion of said certain line traces, means including a mixing circuit and a clipping circuit for coupling each readout pulse with said certain shaped sampling signals to said modulation means, and cue symbol positioning means including control means operative to alter the time of generation of each of the shaped sampling signals simultaneously to thereby adjust each of the cue symbols laterally across the screen in a related manner.

34. A visual cue generator device as set forth in claim 33 in which said display device is connected to represent changes in the conditions of a flight unit, and which includes azimuth sensor means operative responsive to a given heading of the object to couple signals of correspondingly different values to each of the signal generators to initially space the cue symbols relative to each other, and to provide signals of correspondingly different values simultaneously to each of the signal generators responsive to a change in heading to shift the cue symbols laterally across the screen in a related manner.

35. An arrangement as set forth in claim 34 in which said azimuth sensor means includes a two section potentiometer member, each section having two end terminals connected to opposite polarity potentials and a predetermined point between its end terminals connected to ground, and a plurality of wiper arms mounted in fixed, spaced relation for movement on said sections, each of which is coupled to an associated one of the signal generating devices; sensor means for detecting changes in heading of the flight unit, and means operatively controlled by said sensor means to actuate said wiper arms along said potentiometer member in said fixed relation responsive to changes in heading to adjust said symbols laterally across said screen.

36. In a visual cue generator device for generating signals for reproduction as visual cues on the display area of a display device comprising control means for providing a raster trace on the display area, said visual cue generator device including signal generator circuit means operatively controlled to provide an output sampling signal of a predetermined shape, means operative to couple operating signals to said signal generator circuit means during each of a plurality of said line traces, a readout circuit for generating a readout pulse of a duration of at least a portion of said plurality of line traces, means including a mixing circuit for coupling said readout pulse with said certain shaped sampling signals to the display device for display thereon, and cue symbol positioner means including means for adjusting the time of generation of successive ones of the shaped sampling signals relative to each other to skew the resultant symbol relative to the vertical axis of the screen.

37. In a visual cue generator device for generating signals for reproduction as visual cues on the screen of a display device comprising control means for providing a raster trace on the display area, and modulation means for modulating the raster trace, a plurality of signal generator circuit means, each of which is operatively controlled to provide an output sampling signal of a predetermined shape, means operative to couple operating signals to said signal generator circuit means during each of certain ones of said line traces, a readout circuit for generating a readout pulse for at least a portion of said certain line traces, a mixing circuit for coupling each readout pulse with said certain shaped sampling signals to said modulation means, whereby a plurality of cue symbols are reproduced by the display device, and cue symbol positioner means including means for providing sawtooth waves of a positive and negative polarity at the rate of said vertical sync pulses, and means for coupling different ones of the polarity signals to different ones of the signal generator means to adjust the time of generation of successive ones of the shaped sampling signals of each generator in a raster trace to different relative intervals, to thereby skew the symbols generated thereby relative to the vertical axis of the screen, the different polarity pulses effecting different directions of skew for the cue symbols which are generated by the different signal generators.

38. In a visual cue generator device for generating signals for reproduction as visual cues on the display area of a display device including control means for providing a raster trace on the display area and modulating means for modulating the raster trace, said visual cue generator device comprising synchronization means for providing horizontal and vertical sync pulses which are synchronized with the horizontal and vertical rates of said raster trace, signal generator circuit means operatively controlled to provide an output sampling signal of a predetermined shape, means operative to couple operating signals to said signal generator circuit means during certain successive ones of said line traces, readout means for generating a readout pulse of a duration of at least a portion of said certain line traces, means including a mixing circuit for coupling said readout pulse with the certain shaped sampling signals to said modulation means, to provide a cue symbol having an outline which is determined by the shape of said shaped pulse and said readout pulse on the display device, and cue symbol positioning means for coupling sawtooth signals of different amplitudes to said signal generator means to vary the initial vertical coordinate of the visual cue symbol.

39. A visual cue generator device as set forth in claim 38 which includes pitch sensor means for determining the relative pitch altitude of an object, signal means for generating a positive going and a negative going sawtooth wave at the horizontal line trace rate which are related in amplitude to the degree of pitch of the object, and means for coupling one of said signals to said signal generator means, the amplitude of the wave determining the initial vertical coordinate of the cue symbol, and the slope of the sawtooth signal determining the skew of the cue symbol.

40. In a visual cue generator device for generating signals for reproduction as visual cues on the display area of a display device for use in providing visual cues of the flight conditions of an aircraft including control means for providing a raster trace on the display area and modulation means for modulating the raster trace, said visual cue generator device comprising synchronization means for providing horizontal and vertical sync pulses synchronized with the horizontal and vertical frequency rates of the raster trace, signal generator circuit means [operator circuit means] operatively controlled to provide an output sampling signal of a predetermined shape, means operative to couple operating signals to said signal generator circuit means during certain successive ones of said line traces, readout means for generating a substantially sawtooth waveform readout pulse of a duration of at least a portion of said certain line traces, a mixing circuit for coupling said readout pulse with said shaped sampling signals to said modultion means, whereby a cue symbol having an outline which is the shape of said shaped pulse is reproduced by the display device, a cue symbol positioner means including means for coupling signals indicative of the aircraft pitch, altitude and azimuth to said signal generator circuit means to correspondingly adjust the relative time of generation of said shaped sampling signals in each of said certain line traces; and means for adjusting the amplitude of said sawtooth waveform signal to different values, and thereby the initial vertical coordinate if said cue symbol on the screen.

41. In a visual cue generator device for generating signals for reproduction as a cue symbol on the screen of a display device comprising synchronization means for providing horizontal and vertical sync pulses at a raster trace rate, a variable delay generator circuit coupled to said synchronization means including a univibrator circuit operatively controlled to provide an output signal at a predetermined period of time subsequent to coupling of a horizontal sync pulse thereto by said synchronization means, a pulse shaping generator circuit coupled to said variable delay generator circuit operatively controlled by each output pulse of said variable delay generator to provide a sampling pulse of a predetermined shape, readout means for generating a readout pulse for a set of said shaped sampling pulses, and a mixing circuit for coupling each readout pulse with its associated shaped sampling pulses to the video presentation elements of the display tube as successive increments of the raster trace are effected by the vertical sync pulse, whereby a cue symbol having an outline including the shape of said readout pulse is reproduced by the display device.

42. A visual cue genertaor as set forth in claim 41 in which said univibrator circuit provides a negative square wave output pulse, and which includes a control section operative responsive to the application of signals of different amplitude thereto to vary the duration of the negative square wave output pulse.

43. A visual cue generator as set forth in claim 42 in which said display device is operative to display cues relating to flight conditions of an aircraft which includes sensor means for determining changes of the pitch, altitude and azimuth of the aircraft, and a cue symbol positioner means which is coupled to said sensor means to provide output signals indicative of said changes, and means for coupling the output signals of said cue symbol positioner means to the control section of said univibrator circuit.

44. In a visual cue generator device for generating signals for reproduction as a cue symbol on the screen of a display device comprising synchronization means for providing horizontal and vertical sync pulses at a raster trace rate, a variable delay generator circuit coupled to said synchronization means comprising a univibrator circuit operatively controlled to provide an output signal having a trailing edge which occurs at a predetermined period of time subsequent to coupling of a horizontal sync pulse thereto, a differentiating circuit coupled to said univibrator circuit including means for deriving a signal from the trailing edge of said output signal, a pulse shaping generator circuit coupled to said differentiating circuit operatively controlled by each differentiated signal to provide a sampling pulse of a predetermined shape, and a mixing circuit for coupling a substantially sawtooth readout pulse with a given set of the output sampling pulses of the pulse shaping generator to the display device for reproduction thereby, whereby a cue symbol having an outline including the shape of the readout pulse is reproduced on the display screen.

45. A visual cue generator as set forth in claim 44 in which said pulse shaping generator circuit comprises a univibrator circuit for providing a square wave output pulse, and an integrating circuit coupled to the output circuit of said univibrator circuit to provide a triangular shaped output pulse to said mixing circuit.

46. In a visual cue generator device operative to generate signals for presentation on the screen of a display means comprising group generator means for generating a basic signal set of a character as coupled to said display device to effect reproduction of a first set of background cues on said screen, horizon generator means, means operative to control said horizon generator means to generate a second signal set of a character to provide a second set of background cues on said screen which are spaced from said first set of cues, and means connected to operate said horizon generator means to generate a signal of a character to provide a sharp line of demarcation between the first and second set of cues on said screen.

47. A visual cue generator device as set forth in claim 46 which includes cue symbol positioning means operative to couple signals to said last means in said horizon generator means to adjust the signal output thereof to different values to thereby adjust the time of demarcation to different horizontal positions on the display device.

48. A visual cue generator device operative to generate signals for presentation as cues on the screen of a display means during a raster trace comprising cue symbol means for providing a set of signals of a character to establish ground cue symbols on at least a lower portion of said screen as coupled to said display means, a horizon generator means including means for generating a set of sky trace signals of a character to establish the trace of a sky portion on at least an upper portion of said screen, means for coupling a control signal to said horizon generator means to control same to generate a signal set of a character to establish a sharp horizon line between said sky and ground portions, and means in said horizon generator means operative to couple a blocking signal to said cue symbol means to block the signal output of said cue symbol means from said display device during the period of generation of the set of sky trace signals.

49. In a visual cue generator device operative to generate signals on a display device representative of the flight condition of an aircraft comprising group generator means for providing a basic signal set for effecting reproduction of a set of group cue symbols on at least a portion of said screen, and horizon generator means, means for controlling said horizon generator means to generate a set of signals of a character as coupled to said display device to effect reproduction of a sky cue portion on the screen including a signal portion which provides a horizon line dividing said sky and said ground portions, means operative to couple a signal indicative of the aircraft pitch attitude to said horizon generator means to effect a corresponding adjustment of the relative size of the sky portion, and the relative position of the horizon line.

50. A visual cue generator device as set forth in claim 49 in which said signal set includes a first waveform portion of a character to establish a sky portion trace of a relatively light pattern on the display means, a second portion of said signal set which is of a character to establish a sharp dark line at the meeting point of the sky and ground symbols, and a third portion of said signal which is of a character to provide a background which becomes progressively lighter in the direction of the bottom margin of the ground portion.

51. In a visual cue generator device for generating signals for reproduction as visual cues on the screen of a display device comprising control means for tracing a raster on said screen synchronization means for providing horizontal and vertical sync pulses at a raster trace rate for said control means, and modulation means for modulating the raster trace, said visual cue generator device including, signal generator means operatively controlled to provide an output signal at predetermined periods of time subsequent to generation of each of a certain set of the horizontal sync pulses in a raster trace, readout means for generating a readout pulse for said certain signal set, means including a mixing circuit means for mixing the readout pulse with said certain output pulses of the signal generator means, and signal modulating means operative to generate a set of shaped signals, and means for modulating the mixed signal output of said mixing circuit with said set of shaped signals prior to coupling thereof to the display device to provide a set of modulated signals which establish cue symbols on said screen which include the contour of the modulating signals.

52. A visual cue generator as set forth in claim 51 in which said readout means includes means operative to generate a pulse of a substantially sawtooth wave form at the rate of the vertical sync pulse, whereby the width the cue symbol on successive lines as generated in a raster trace is correspondingly different.

53. A visual cue generator as set forth in claim 51 in which the signal as modulated includes positive and negative components, and which includes rectifier means connected to directly couple only the portions of each signal which is of one polarity, whereby one portion of each symbol on the display screen is shaded relative to other portions of the symbol.

54. A visual cue generator device as set forth in claim 51 which includes a first rectifier means connected between the output circuit of said signal modulating means and ground, and a second rectifier means connected between said output circuit and the modulating means for said display device to provide an additional set of cue symbols on said screen.

55. In a visual cue generator device for generating signals to establish visual cues on the screen of a display device including control means for establishing a raster on said screen and synchronization means for providing horizontal and vertical sync pulses at the raster trace rate, signal generator means operatively controlled to provide an output signal at predetermined periods of time subsequent to generation of each of a certain set of the horizontal sync pulses in a raster trace, readout means operative to generate a readout pulse during the period of generation of said pulses in said certain set, mixing circuit means for mixing the readout pulse with said certain set of pulses generated by the signal generator means, and signal modulating means comprising a sine wave oscillator circuit operative to generate a set of sine wave signals, and means for modulating the mixed signal output of said mixing circuit with said set of sine wave signals to provide a set of signals which establish circle cue symbols which are spaced at successive increments on said screen.

56. In a visual cue generator device for generating signals for reproduction as video cues on the screen of a display device which includes synchronization means for providing horizontal and vertical sync pulses for use in the provision of a raster trace on said screen, said visual cue generator device comprising signal generator means operatively controlled to provide an output signal at predetermined periods of time subsequent to receipt of each of a certain set of said horizontal sync pulses in a raster trace, readout means for generating a readout pulse for said certain signal set, mixing circuit means for mixing the readout pulse with said certain output pulses of the signal generator means, and signal modulating means including an oscillator circuit operative to generate a set of shaped signals, and means connected to modulate the mixed signal output of said mixing circuit with said set of shaped signals to provide a set of signals which establish cue symbols on said screen which include the contour of the modulating signals, and frequency adjustment means operative to adjust the frequency of the oscillator circuit to different values relative to the vertical trace rate to thereby provile movement of the cue symbols across the screen at a related rate of speed.

57. A visual cue generator as set forth in claim 56 which is adapted to represent changes in the flight conditions of an aircraft, and which includes speed sensor means operative to provide signals which vary with the aircraft speed, and means operatively controlled by said variable signals to control said frequency adjustment means in the adjustment of said oscillator circuit to correspondingly different values to thereby vary the rate of movement of the cue symbols across the display device in a related manner.

58. A visual cue generator device as set forth in claim 57 which includes pitch sensor means for providing signals of different values to indicate changes in the pitch of the aircraft, and means operable to couple the variable signal output of said pitch sensor means to said frequency adjustment means to control same to provide correspondingly different frequencies with changes in pitch of the aircraft, whereby the speed of movement of the cue symbols is related to and indicative of the changes in pitch of the aircraft.

59. In a visual cue generator device for generating signals to create a cue path on the screen of a display device comprising control means for establishing a raster on said screen and synchronization means for providing horizontal and vertical sync pulses for use in the establishment of said raster trace, and modulation means for modulating said raster trace, said visual cue generator device including signal generating means operatively controlled to provide an output signal at a predetermined period of time subsequent to receipt of each one of a set of said horizontal sync pulses, readout means operative to provide a readout pulse of a given shape simultaneously with the generation of the set of output signals by said signal generating means and mixing circuit means for mixing said readout pulse and said set of output pulses of the signal generating means to said modulation means of the display device during a raster trace, whereby a cue symbol path having a shape related to the shape of said output signals and said readout pulse is reproduced on said screen.

60. In a visual cue generator device for generating a cue path on the screen of a display device comprising synchronization means for providing horizontal and vertical sync pulses at a raster trace rate, signal generating means operatively controlled to provide an output signal at a predetermined period of time subsequent to receipt of each one of a set of said horizontal sync pulses, readout means operative to provide a read-out pulse of a given shape simultaneously with the generation of the set of output signals of said signal generating means, mixing circuit means for mixing said readout pulse with the set of output pulses of the signal generating means to the display device during a raster trace, whereby a cue symbol path having a shape related to the shape of said output signals and said readout pulse is reproduced on said screen, and an oscillator circuit operative to generate a set of blanking signals for blanking different ones of said output signals of said set prior to coupling thereof to said display device to establish a corresponding set of cross lines on said path, and means for couplng said blanking signals to said mixing circuit.

61. A visual cue generator device as set forth in claim 60 which includes means operative to couple signals to said oscillator circuit of a value to control same to operate at a frequency which is related to the vertical sync pulse frequency to thereby effect apparent motion of the cross-lines along the path.

62. In a visual cue generator device for generating signals for reproduction as a cue path on the screen of a display device comprising control means for establishing a raster on said screen, synchronization means for providing horizontal and vertical sync pulses for use in the operation of said control means to provide said raster trace, and modulation means for modulating said raster trace, said visual cue generator device comprising a variable delay generator circuit operatively controlled to provide an output signal at a predetermined period of time subsequent to receipt of each of a set of said horizontal sync pulses, a pulse shaping generator circuit operatively controlled by each output pulse of said variable delay generator to provide a pulse of a predetermined shape, means for generating a readout pulse, a mixing circuit for coupling said readout pulse with the set of said output pulses to said modulation means of the display device, whereby a cue path is reproduced on the display device, and path curvature means operative to couple signals of different values to said variable delay generator circuit to adjust the path to correspondingly different curvatures at different points along its length.

63. A visual cue generator as set forth in claim 62 in which said path curvature means comprises a center-tapped transformer connected to a sinewave source to couple sine wave signals of changing polarity over a set of associated terminals, and an adjustable resistor member connected to said terminals operative to couple signals of different values and polarities from said transformer terminals to said variable delay generator circuit.

64. In a visual cue generator device for generating signals for reproduction as a cue path on the screen of a display device including synchronization means for providing horizontal and vertical sync pulses for use in establishing a raster trace on said display device, said visual cue generator device comprising a variable delay generator circuit operatively controlled to provide an output signal at a predetermined period of time subsequent to generation of each of a set of said horizontal sync pulses, a pulse shaping generator circuit operatively controlled by each output pulse of said variable delay generator to provide a pulse of a predetermined shape, readout means operative to generate a readout pulse during the period of generation of at least certain of said pulses of said predetermined shape, a mixing circuit connected to couple said readout pulse and the set of said output pulses to said modulation means of the display device, whereby a cue path is reproduced on the display device, and path skewing means for skewing said path relative to the vertical axis of the display screen including means for deriving a first sawtooth signal of one polarity and a second sawtooth signal of a second polarity which are generated in phase with the vertical sync signal, and a resistor member for coupling signals selectively derived from said first and second signals to said variable pulse generator, the polarity and amplitude of the derived signal determining the degree and direction of skew of the path.

65. In a visual cue generator device for generating signals for reproduction as a cue path on the screen of a display device including synchronization means for providing horizontal and vertical sync pulses for use in the provision of a raster trace, and modulation means for modulating said raster trace, said visual cue generator device comprising a variable delay generator circuit operatively controlled to provide an output signal at a predetermined period of time subsequent to generation of each of a set of said horizontal sync pulses, a pulse shaping generator circuit operatively controlled by each output pulse of said variable delay generator to provide a pulse of a predetermined shape, readout means operative to generate a readout pulse during the period of generation of at least a plurality of the shaped pulses, a mixing circuit for coupling said readout pulse with the set of said output pulses to said modulation means of the device, whereby a cue path is reproduced on the display device, and path control means including a first circuit for coupling bias signals of different values to said mixing circuit to correspondingly adjust the point of occurrence of the far end of said path, and path inversion means connected to a source of sawtooth signals operative to couple sawtooth signals of variable amplitude and polarity to said mixing circuit to adjust the path to extend alternatively in the direction of the upper and lower margin of said screen.

66. In a visual cue generator device for generating a cue path on the screen of a display device comprising synchronization means for providing horizontal and vertical sync pulses at a rate related to the frequency of a raster trace on said display device, a variable delay generator circuit operatively controlled to provide an output signal at a predetermined period of time subsequent to generation of each of a set of said horizontal sync pulses, a pulse shaping generator circuit operatively controlled by each output pulse of said variable delay generator to provide a pulse of a predetermined shape, a mixing circuit for coupling a readout pulse with the set of said output pulses to the video presentation elements of the device, whereby a cue path is reproduced on the display device, and program speed means comprising an oscillator circuit operative to couple signals at spaced time intervals to said mixing circuit during the period of generation of said readout pulse to effect the display of symbols at corresponding increments along the flight path.

67. A visual cue device as set forth in claim 66 which is adapted to provide visual cues of the flight condition of an aircraft including optimum speed means for preestablishing a preferred aircraft speed, sensor means for determining the actual speed of the aircraft, and means for coupling a signal indicative of the difference of the preferred speed and the actual speed of the aircraft to said oscillator circuit to vary the frequency thereof relative to the frequency rate of the vertical sync pulses, whereby said symbols are moved across the display device in successive raster traces.

68. In a visual cue generator device for displaying items of information on a display device relating to relative movement of a mobile unit, a first cue generator circuit operative to generate signals for normally presenting a first cue set comprising an above horizon, a horizon and a below horizon portion on the display unit, and a second cue generator circuit means operative to generate a second set of signals of a character to effect the display of cue symbols superposed in the sky portion of the display comprising a set of spaced horizontal lines extending between the horizontal line and the upper margin of the display.

69. In a visual cue generator device for displaying items of information on a color display device relating to relative movement of a mobile unit, said color device including different color producing elements, a first cue generator circuit operative to generate signals for normally presenting a first cue set comprising a sky, a horizon and a ground background portion on the display unit, and a second cue generator circuit means operative to generate a second set of signals for effecting the display of cue symbols in superposed relation on said first cue set including color switch means for coupling the different signal cues to the different color producing elements of the color display device.

70. In a visual cue generator system for displaying different items of information on a display unit relating to relative movement of an object, cue generator means including a first wave-form generator circuit operative to generate a first set of signals for effecting the display of a cue set comprising a sky, a horizon, and a sub-horizon portion, and a second wave-form generator circuit operative to generate a second set of wave-form signals for coupling to said display device to provide a plurality of different symbols on said sub-horizon portion in a given presentation of information on said display device, and means for adjusting the time of coupling of said second set of signals to the display in successive presentations on said display device to different values, to thereby provide a series of symbols which proceed in time to successive positions in a direction away from said horizon to thereby provide the illusion of relative motion of the object to the sub-horizon portion.

71. The method of generating signals of a shape which produce a desired symmetrical cue symbol on a display device of the type which is capable of providing a modulated raster comprising the steps of making an outline of the cue symbol to be produced on said raster, rotating the symbol as outline through ninety degrees, bisecting said symbol horizontally, generating a waveform having a contour of the outline which occurs above the horizontal bisecting line at the vertical frequency rate of said raster, generating sampling pulses at the horizontal rate of said raster, and coupling the waveform and said sampling pulses to the modulation means of said display device.

72. In a visual cue generator device for generating signals for reproduction as visual cues on the display area of a display device which includes control means for providing a raster trace on the display area, and modulating means for modulating the raster trace, said visual cue generator device including signal generator circuit means operative to provide a sampling signal of a symmetrical shape, a first means for coupling sync pulses to said signal generator circuit means to operate same at the rate of generation of the horizontal lines in said raster, a readout circuit for generating a substantially sawtooth waveform readout pulse, a second means for coupling sync signals to said readout circuit to operate same at the vertical trace rate of said raster, and mixer means connected to couple said readout pulse and said symmetrically shaped sampling pulses to the modulating means for said display device, whereby a cue symbol having an outline which includes the shape of said readout pulse is reproduced on the screen of the display device.

73. In a visual cue generator device for generating signals for reproduction as visual cues on the display area of a display device which includes control means for providing a raster trace on the display area, and modulation means for modulating the raster trace, said visual cue generator device including signal generator circuit means operatively controlled to provide an output sampling signal of a predetermined shape during each of a plurality of the line traces in said raster, a readout circuit for generating a substantially sawtooth waveform readout pulse during the period of generating of at least a portion of said output sampling signals in each raster, and means connected to couple said readout pulse with said shaped sampling signals to the modulating means for said display device, including clipping means operative to prevent coupling of a readout pulse and a sampling signal to the display device independently of each other.

74. In a visual cue generator device for generating signals for reproduction as visual cues on the display area of a display device which includes control means for providing a raster trace on the display area, and modulation means for modulating the raster trace, said visual cue generator device including signal generator circuit means including generator means for generating a sampling signal, control means operative to couple control signals to said signal generator circuit means to control pulse generation during at least certain ones of the line traces of said raster, a readout circuit for generating a readout pulse of a duration of at least a portion of said certain ones of said line traces, a clipping circuit operative to establish a conducting level, a first means for coupling said readout pulse and said sampling pulses to said clipping circuit, and a second means for coupling the output of said clipping circuit to said modulation means, whereby a cue symbol having an outline which includes the shape of said readout pulse is reproduced on the screen of the display device.

75. A visual cue generator device as set forth in claim 74 which includes means operative to couple different value signals to said clipping circuit to adjust the conducting level of said clipping circuit to different values.

76. A visual cue generator device as set forth in claim 74 in which said generator means includes means for generating triangle-shaped sampling pulses, and said control means includes means operative to provide control signals at the horizontal rate of the raster trace, and in which said readout circuit includes generator means operative to generate sawtooth waveform signals at the vertical rate of the raster trace.

77. A visual cue generator device as set forth in claim 74 which includes an oscillator circuit, and means for connecting the output of said oscillator circuit to said second means to modulate the output of said clipping circuit.

78. A visual cue generator device as set forth in claim 74 which includes an oscillator circuit, means for connecting the output of said oscillator circuit to said second means to modulate the output of said clipping circuit, and means for adjusting the frequency output of said oscillator circuit to different values.

79. A visual generator device as set forth in claim 74 in which said control means includes means for controlling generation of output pulses by said generator means at the horizontal trace rate of said raster, and means for adjusting the time of operation of said generator means to different times during the trace of a horizontal line of said raster.

80. A visual cue generator device as set forth in claim 74 in which said readout circuit includes a sawtooth generator circuit, means for controlling said sawtooth generator circuit to provide a sawtooth waveform signal at the vertical rate of said raster, and means for adjusting the amplitude of said sawtooth waveform to different values.

81. In a visual cue generator device as set forth in claim 74 which includes positioner means for adjusting said cue symbol to different positions on said screen including a first means for coupling signals of variable values to said control means to adjust the horizontal coordinates of the symbol to correspondingly different values, and a second means for coupling signals of variable values to said clipping circuit to adjust the vertical coordinates of said symbol to correspondingly different values.

82. In a visual cue generator device for generating signals for reproduction as visual cues on the display area of a display device which includes control means for providing a raster trace on the display area, and modulation means for modulating the raster trace, said visual cue generator device including a signal generator circuit including generator means for generating a sampling signal, control means operative to couple control signals to said signal generator circuit means to control generation of a sampling signal at least once during at least certain ones of the line traces of said raster circuit, means operative to conduct only signals which are of an amplitude in excess of a predetermined value, means for coupling said sampling signals to said circuit means, bias means for coupling signals of different values to said circuit means to adjust the conducting level to different values, and means for coupling the output of said circuit means to said modulation means.

83. A visual cue generator device as set forth in claim 82 in which said control means includes means for providing said sampling signals during at least certain of the horizontal traces of said raster, and means for adjusting the time of occurrence of each sampling signal relative to the horizontal line trace.

84. A visual cue generator device as set forth in claim 82 in which said control means includes means for adjusting the duration of each sampling pulse during a horizontal line trace.

85. In a visual cue system for displaying different items of information on a display unit relating to movement of an object, signal generator means including horizon line circuit means operative to provide a signal set for coupling to the display unit to establish a reference line on the display, and cue generator circuit means operative to generate pulses for coupling to said display unit to provide a plurality of symbols on said display including means for varying the time of generation of the pulses for said symbols in successive displays to effect movement of the symbols across the display between said reference line and at least one marginal edge of the display.

86. In a system as set forth in claim 85 which includes signal input means for varying the time of transmission of said signal set to said display unit by said horizon line means to vary the position of said reference line on said display, and means for controlling coupling of said pulses generated by said cue generator circuit means to said display unit only after the generation of the reference line on the display.

87. In a visual cue system for displaying different items of information on a display unit relating to movement of an object, signal generator means including horizon line circuit means operative to generate a signal set for coupling to the display unit to establish a reference line on the display, and cue generator circuit means including pulse generator means operative to generate pulses for coupling to said display unit to provide a plurality of multidimensional symbols on said display between said reference line and at least one marginal edge of the display including means for adjusting the time of generation of said pulses to vary the position of the symbols on the display, variation of the time of generation in successive displays thereby imparting motion to the symbols on the display.

88. In a visual cue generator device for generating signals which provide a path on the display area of a display device which includes control means for providing a raster trace on the display area, and modulation means for modulating the raster trace in the presentation of a display thereon, said visual cue generator device including signal generator circuit means including a variable-delay circuit for generating a square wave signal at the rate of the horizontal line frequency of said raster, means for deriving a triangular-shaped pulse from said square wave signal, a readout circuit for generating a sawtooth waveform signal at the vertical trace frequency of said raster, a clipping circuit having means for establishing a conducting level, a first means for coupling said sawtooth signal and said triangular-shaped pulses to said clipping circuit, and a second means for coupling the output of said clipping circuit to said modulation means, and means for adjusting said conducting level of said clipper circuit to a value to effect the display of a path on said display area.

89. A visual cue generator device as set forth in claim 88 which includes path control means including a positioning circuit for coupling signals of different values to said clipping circuit to correspondingly vary the vertical coordinate of the initial display of the path on the display area.

90. A visual cue generator device as set forth in claim 88 which includes path control means including a positioning circuit for coupling potential signals of different values to said variable delay circuit to effect a corresponding adjustment in the time of generation of said triangular-shaped pulse in each horizontal line trace, and a corresponding variation in the horizontal coordinate of the initial point of the path which is provided thereby.

91. A visual cue generator device as set forth in claim 88 which includes path skew means for applying sawtooth signals variable in polarity and amplitude to said variable delay circuit at the vertical trace frequency of the raster to adjust the time of generation of said square wave pulse to correspondingly different values.

92. A visual cue generator device as set forth in claim 88 which includes path control means including a sine wave generator connected to transmit signals to said variable delay circuit, and means for adjusting the amplitude and phase of said sine wave signals to different values to vary the shape of said path.

93. A visual cue generator device as set forth in claim 88 which includes path control means including means for adjusting the amplitude of said sawtooth waveform signal to different values to adjust the width of the path to correspondingly different values.

94. A visual cue generator device as set forth in claim 88 which includes a pulse modulation circuit for generating pulses at different frequencies, and means for coupling the signal output of said pulse modulation circuit to said clipper circuit to correspondingly vary the configuration of said path.

95. In a visual cue generator device for displaying items of information relative to movement of a mobile unit on a color display device having a plurality of color producing means, each of which is operative to generate a different color display as energized, a first cue generator circuit operative to generate signals to provide a background display, and a second cue generator operative to generate signals for effecting display of a cue set comprising a path extending across at least a portion of the background display including means for adjusting the path to different positions relative to said background display, control means for said display device operative to control display of different sets of signals by different ones of said color producing means, and cue switching means including means operative to selectively couple the signals for said background cues to said device for display by one of said color producing means, and the signals for said path for display by a second one of said color producing means, to thereby provide an adjustable path in one color on a background of a second color.

96. In a visual cue generator device for displaying items of information relative to movement of a mobile unit on a color display device having a plurality of color producing means, each of which is operative to generate a different color display as energized, a first cue generator circuit operative to generate signals for presenting cues on said display device comprising a reference line, a sub-reference display and an above-reference display, control means for selectively controlling operation of the different color producing means and cue switching means, including means operative to selectively couple the signals for said sub-reference to said device for display by one of said color producing means, and the signals for said above-reference portion to said device for display by a different one of said color producing means, to thereby provide a set of background cues in different colors which are separated by a reference line.

97. A method for generating symbols for display on a display device capable of presenting a raster trace which comprises the steps of generating a readout signal at the vertical rate of the raster which has a waveform which corresponds to the shape of the symbol on one side of the symbol median as oriented ninety degrees, generating a sampling pulse having a triangular waveshape at the frequency of the horizontal line trace of the raster, and coupling the readout signals and the sampling pulses to the raster modulation means for the display device.

*98. In a display system having display means for use in the presentation of information relating to movement of a mobile device in which said display means has a target display area, generator circuit means for generating a signal set which controls such display means to provide a path on said display area comprised of a plurality of parallel lines, successive ones of said parallel lines being of an increasing length to thereby define a path in perspective on said display means, and means for coupling said signal set to said display means for presentation of said path on said target display area.*

*99. In a display system having display means for use in the presentation of information relating to movement of a mobile device in which said display means has a target display area, generator circuit means for generating a signal set which controls said display means to provide a path on said display area comprised of a plurality of parallel lines, successive ones of said parallel lines being of an increasing length to thereby define a path in perspective on said display means, means for coupling said signal set to said display means for presentation of said path on said target display area, and means for selectively adjusting one end of said path, at least, to different horizontal positions.*

*100. In a display system having display means for use in the presentation of information relating to movement of a mobile device in which said display means has a target display area, generator circuit means for generating a signal set which controls such display means to provide a path on said display area comprised of a plurality of parallel lines, successive ones of said parallel lines being of an increasing length to thereby define a path in perspective on said display means, and means for modifying said signal set to adjust the mean length of said parallel lines to correspondingly different values, whereby paths of different widths are presented on the target display.*

*101. In a display system having display means for use in the presentation of information relating to movement of a mobile device in which said display means has a target display area, generator circuit means including a horizon generator circuit for generating a horizon line on said display and path generator means for generating a signal set which controls said display means to provide a path on said display area comprised of a plurality of lines parallel to said horizon line, successive ones of said parallel lines being of an increasing length to thereby define a path in perspective on said display means, means for coupling said signal set to said display means for presentation of said path on said target display area, and path control means for selectively adjusting at least one end of said path to different positions.*

*102. In a display system having display means for use in the presentation of information relating to movement of a mobile device relative to a desired path in which said display means has a display area, generator circuit means including a horizon generator circuit for generating a horizon line on said display, a path generator circuit operative with said mobile device on the desired path to provide a path on said display having a wedge-shaped outline, the narrow end of said path being located at and below said horizon line and extending downwardly in the direction of the lower marginal edge of the display area to the wider end, and means operative with departure of*

*said mobile device from the desired path to correspondingly vary the path presentation on said display means.*

*103. A display system as set forth in claim 102 which includes means for providing signals indicative of changes in the roll attitude of the mobile device, and roll means responsive to said signals to effect adjustment of said path to different positions of bank on the target display.*

*104. A display system as set forth in claim 102 which includes means for providing pitch representative signals indicative of changes in pitch of the mobile device, and means responsive to said changing pitch signals to effect variation of the position of the path apex on the target display area.*

*105. A display system as set forth in claim 102 which includes means for providing signals representative of changes in heading for said device, in which said last means includes means responsive to said signals to effect a corresponding adjustment of the far end of said path on said display.*

*106. In a display system having display means for use in the presentation of information relating to movement of a mobile device to a desired path in which said display means has a display area, generator circuit means including a horizon generator circuit for providing a horizon line on said display area, and a path generator circuit operative with said mobile device on the desired path to provide a path on said display having a wedge-shaped outline, one end of said path being located immediately adjacent said horizon line and the other end extending in the direction of the lower marginal edge of the display area, and attitude sensor means operative with at least one change of attitude of said mobile device to effect a corresponding change in the display of said horizon line and path, the related presentation of said horizon line and said one path end being maintained in said changed attitude condition.*

*107. In a display system having display means for use in the presentation of information relating to movement of a mobile device in which said display means has a target display area, generator circuit means for providing at least a horizon line on said target display area, and a path generator circuit means for generating a signal set which controls said display means to provide at least one path on said display area comprised of a plurality of symbols which emanate from the horizon line and move downwardly toward the lower edge of the display area, and means for controlling the rate of motion of said symbols in such movement.*

*108. In a visual cue system for displaying different items of information on a display unit relating to relative movement of an object, generator circuit means operative to generate a first set of signals for coupling to said display device having wave-forms of a shape to provide a display of a cue set thereon comprising a path extending across at least a portion of the display, means for indicating variance of pitch of said object, and path control means for adjusting the shape of said first set of signals with changes in pitch of said object and means in said generator circuit means for adjusting the path outline to widths of correspondingly different values.*

*109. In a visual cue system for displaying different items of information, a display unit for providing a display relating to movement of an object relative to a desired path, generator circuit means operative to generate a first set of signals for effecting the display of the cue set on said display unit comprising a directive symbol including at least one vertical line, one end of which is located at a given reference position with said object on said desired path, means for effecting adjustment of said one end of said vertical line laterally from said position to indicate different headings, and means for effecting vertical adjustment of, at least, said one end of said symbol relative to said reference position for different pitch attitudes of said object.*

*110. In a visual cue system for displaying different items of information, a display unit for providing a display relating to movement of an object relative to a desired path, generator circuit means operative to generate a first set of signals for effecting the display of the cue set on said display unit comprising a directive symbol including at least one vertical line, one end of which is located at a given reference position with said object on said desired path, means for effecting lateral adjustment of said one end of said vertical line laterally from said position to indicate different headings of said path, means for effecting vertical adjustment of, at least, said one end of said symbol relative to said reference position for different pitch attitudes of said object, and means for providing at least one line perpendicular to said vertical line including means for adjusting the length of said line to different values for different conditions.*

*111. In a visual cue system for displaying different items of information, a display unit for providing a display relating to movement of an object relative to a desired path, generator circuit means operative to generate a first set of signals for effecting the display of the cue set on said display unit comprising a directive symbol including at least one vertical line, one end of which is located at a given reference position with said object on said desired path, means for effecting lateral adjustment of said one end of said vertical line laterally from said position to indicate different headings of said path, means for effecting vertical adjustment of at least said one end of said symbol relative to said reference position to indicate different pitch attitudes of said object, and means for providing at least one line perpendicular to said vertical line including means for adjusting said perdendicular line to different positions on said display with said one end of said vertical line.*

References Cited by the Examiner

The following references, cited by the Examiner, are of record in the patented file of this patent or the original patent.

UNITED STATES PATENTS 2,027,530 1/36 Hammond ---------- 343—112

CHESTER L. JUSTUS, *Primary Examiner.*

FREDERICK M. STRADER, *Examiner.*